US012590569B2

(12) United States Patent
Davis

(10) Patent No.: US 12,590,569 B2
(45) Date of Patent: Mar. 31, 2026

(54) WIND TURBINE ASSEMBLY AND METHOD OF ASSEMBLING A WIND TURBINE ASSEMBLY

(71) Applicant: CAD Wind Turbines LLC, Fort Myers, FL (US)

(72) Inventor: Russell T. Davis, Fort Myers, FL (US)

(73) Assignee: CAD Wind Turbines LLC, Fort Myers, FL (US)

( * ) Notice: Subject to any disclaimer, the term of this patent is extended or adjusted under 35 U.S.C. 154(b) by 0 days.

(21) Appl. No.: 18/241,680

(22) Filed: Sep. 1, 2023

(65) Prior Publication Data

US 2025/0075680 A1     Mar. 6, 2025

(51) Int. Cl.
    *F03D 13/10*       (2016.01)
    *B66B 9/02*       (2006.01)
    *B66F 11/04*       (2006.01)

(52) U.S. Cl.
    CPC ............ *F03D 13/112* (2023.08); *B66B 9/022* (2013.01); *F03D 13/104* (2023.08); *F03D 13/139* (2023.08); *B66F 11/04* (2013.01); *F05B 2230/61* (2013.01)

(58) Field of Classification Search
    CPC . F03D 13/112; F05B 2240/9152; B66F 11/04
    See application file for complete search history.

(56) References Cited

U.S. PATENT DOCUMENTS

| | | | | |
|---|---|---|---|---|
| 6,357,549 | B1* | 3/2002 | Brennan | ................. F03D 13/10 |
| | | | | 182/103 |
| 6,522,025 | B2* | 2/2003 | Willis | ................... E02D 27/425 |
| | | | | 290/55 |
| 6,888,264 | B1 | 5/2005 | Willis et al. | |
| 6,979,170 | B2 | 12/2005 | Dery et al. | |
| 7,442,009 | B2* | 10/2008 | Arel | ........................ F03D 80/70 |
| | | | | 416/142 |
| 7,973,420 | B2 | 7/2011 | Scott | |
| 8,052,396 | B2 | 11/2011 | Wobben | |
| 8,083,212 | B2 | 12/2011 | Numajiri et al. | |
| 8,191,878 | B2* | 6/2012 | Pedersen | ................. F03D 80/50 |
| | | | | 269/71 |

(Continued)

FOREIGN PATENT DOCUMENTS

| | | |
|---|---|---|
| CN | 201485202 U | 5/2010 |
| CN | 107355347 A | 11/2017 |

(Continued)

OTHER PUBLICATIONS

Jan. 10, 2025—(WO) ISR and WO—App PCT/US2024/044489.

*Primary Examiner* — Jacob J Cigna
(74) *Attorney, Agent, or Firm* — Banner & Witcoff, Ltd.

(57) ABSTRACT

A wind turbine assembly includes a falling weight system to store potential energy within the wind turbine assembly. The falling weight system utilizes a pair of gears that can rotate to raise and lower weights within a cavity of the tower section. In addition, an assembly ring that is configured to climb a tower section of a wind turbine assembly may be used to assemble a wind turbine assembly or to perform maintenance on wind turbine assemblies. In some examples, a ballast weight system utilizing a ballast weight tank that lowers by being filled with water may be used to input rotational energy into a generator to create electricity.

15 Claims, 33 Drawing Sheets

(56)          References Cited

U.S. PATENT DOCUMENTS

| | | | |
|---|---|---|---|
| 8,353,141 B2 | 1/2013 | Berg | |
| 8,453,797 B2 * | 6/2013 | Iversen | F03D 80/50 |
| | | | 182/128 |
| 8,601,748 B2 | 12/2013 | Delago et al. | |
| 8,727,690 B2 * | 5/2014 | Springett | B63B 35/00 |
| | | | 414/10 |
| 8,939,299 B2 * | 1/2015 | Ahler | F03D 13/40 |
| | | | 212/270 |
| 9,016,029 B2 | 4/2015 | Wagner | |
| 9,238,923 B2 | 1/2016 | Arlaban Gabeiras et al. | |
| 9,982,408 B2 * | 5/2018 | Fennis | F16H 19/04 |
| 10,494,235 B2 * | 12/2019 | Nelson | B66C 23/207 |
| 10,550,825 B2 | 2/2020 | Borøy et al. | |
| 10,865,077 B2 * | 12/2020 | Garitaonandia Aramberri | |
| | | | B66C 23/185 |
| 10,919,585 B2 * | 2/2021 | Bagheri | B62D 55/14 |
| 11,231,015 B2 * | 1/2022 | Helmens | B66C 23/32 |
| 11,808,250 B2 * | 11/2023 | Garcia De La Pena | |
| | | | F03D 80/50 |
| 2002/0084142 A1 | 7/2002 | Brennan et al. | |
| 2008/0304962 A1 | 12/2008 | Arel | |
| 2009/0211174 A1 | 8/2009 | Henderson et al. | |
| 2009/0266648 A1 * | 10/2009 | Asensio Bazterra | B66B 9/187 |
| | | | 187/270 |
| 2009/0282776 A1 * | 11/2009 | Berg | |
| 2012/0003089 A1 * | 1/2012 | Byreddy | B08B 1/12 |
| | | | 416/61 |
| 2013/0228397 A1 * | 9/2013 | Horn | E04G 3/28 |
| | | | 414/800 |
| 2014/0286788 A1 | 9/2014 | Cho et al. | |
| 2018/0282134 A1 | 10/2018 | Lagerweij et al. | |
| 2019/0024638 A1 | 1/2019 | Sander et al. | |
| 2023/0003195 A1 * | 1/2023 | Geraets | F03D 13/10 |

FOREIGN PATENT DOCUMENTS

| | | | | |
|---|---|---|---|---|
| CN | 107882682 A | 4/2018 | | |
| CN | 108825436 A | 11/2018 | | |
| CN | 112031999 A | 12/2020 | | |
| CN | 216842030 U | 6/2022 | | |
| CN | 115288936 A | 11/2022 | | |
| CN | 115506946 A | 12/2022 | | |
| CN | 115653836 A | 1/2023 | | |
| DE | 20120381 U1 * | 3/2002 | | E04G 3/24 |
| GB | 2412697 A | 10/2005 | | |
| GB | 2540525 A | 1/2017 | | |
| KR | 10-2006-0083826 A | 7/2006 | | |
| KR | 101059442 B1 | 8/2011 | | |
| KR | 101353523 | 9/2013 | | |
| WO | WO-2013109720 A1 * | 7/2013 | | B66C 23/185 |
| WO | 2013/186423 A1 | 12/2013 | | |

* cited by examiner

100

120

125

110

200

214

216

210

310A     311
         314A
                                                                    200

302

310A

314A

200

214

302

310A

314A

200

214

302

WIND TURBINE ASSEMBLY AND METHOD OF ASSEMBLING A WIND TURBINE ASSEMBLY

FIELD

The present disclosure relates generally to a wind turbine assembly used to convert kinetic energy from the wind into electrical energy.

BACKGROUND

Wind turbine assemblies may be used to generate electricity. The blades of the wind turbine may be connected to a generator such that as the blades rotate the generator creates electricity that is transferred to a power grid for consumption or to a battery system for storage. In some cases, the electrical power output of the wind turbine is determined by the kinetic energy of the wind. As such, when the wind does not blow consistently, the electrical power output may not be reliable. In addition, the construction of the wind turbine assemblies may be difficult especially in harsh environments.

BRIEF SUMMARY

This Summary introduces some general concepts relating to this disclosure in a simplified form that are further described below in the Detailed Description. This Summary is not intended to identify key features or essential features of the disclosure.

Aspects of this disclosure herein may relate to a method of assembling a wind turbine assembly, comprising: (a) placing an assembly ring above a base platform of the wind turbine assembly, where the assembly ring comprises a ring-shaped frame member that defines a central opening and a support platform that extends outward from the ring-shaped frame member, and where the support platform is configured to engage and manipulate a plurality of tower sections: (b) moving a first tower section of the plurality of tower sections using the support platform of the assembly ring onto the base platform of the wind turbine assembly, where the first tower section is received within the central opening of the assembly ring: (c) securing the first tower section to the base platform of the wind turbine assembly: (d) moving a second tower section using support platform of the assembly ring, where the assembly ring climbs the first tower section, and where the assembly ring includes a climbing gear that engages a first rail positioned along an exterior of the first tower section: (e) aligning the second tower section over the first tower section: (f) securing the second tower section to the first tower section forming stacked tower sections: (g) moving a head platform to a top of the stacked tower sections using the assembly ring, wherein the head platform includes a generator and a transmission: (h) securing the head platform to the stacked tower sections, where the head platform is rotationally connected to the stacked tower sections: (i) moving a blade assembly using the assembly ring; and (j) connecting the blade assembly to the head platform.

Other aspects of this disclosure may relate to an assembly ring for assembling a wind turbine assembly comprising: (a) a ring-shaped frame member comprising a central opening, where the central opening is configured to receive a tower section of the wind turbine assembly: (b) a support platform pivotally engaged to the ring-shaped frame member: (c) a pivot cradle connected to the support platform, where the pivot cradle comprises an extension and a pivot member, and where the pivot member is pivotally engaged with the extension; and (d) a plurality of climbing gears arranged on an interior of the ring-shaped frame member, where each climbing gear of the plurality of climbing gears are configured to engage a rail that is located on the tower section of the wind turbine assembly.

Additional aspects of this disclosure may relate to a wind turbine assembly comprising: (a) a first blade assembly: (b) a second blade assembly: (c) a controller connected to the first blade assembly and the second blade assembly, where the controller includes a first controller gear and a second controller gear: (d) a transmission connected to the controller: (e) a first generator connected to the transmission: (f) a second generator connected to the transmission: (g) a head platform connected to a tower section, where the head platform supports the controller, the transmission, and the first generator; and (h) a falling weight system. The falling weight system may comprise: (1) a first gear, where the first gear is located in an upper portion of the tower section is connected to a first weight and an engaging portion of the first gear engages an engaging portion of the first controller gear; and (2) a second gear, where the second gear is located in the upper portion of the tower section is connected to a second weight and an engaging portion of the second gear engages an engaging portion of the second controller gear.

Still other aspects of this disclosure may relate to a wind turbine assembly comprising: (a) a blade assembly: (b) a controller connected to the blade assembly, where the controller includes a first controller gear and a second controller gear: (c) a transmission connected to the controller: (d) a generator connected to the transmission: (e) a head platform connected to a tower section, where the head platform supports the controller, the transmission, and the generator; and (f) a falling weight system. The falling weight system may comprise: (1) a first gear, where the first gear is located in an upper portion of the tower section is connected to a first weight and an engaging portion of the first gear engages an engaging portion of the first controller gear; and (2) a second gear, where the second gear is located in the upper portion of the tower section and is connected to a second weight and an engaging portion of the second gear engages an engaging portion of the second controller gear; and (3) where the first gear is located within a central opening of the second gear and the first gear turns independently of the second gear.

Yet other aspects of this disclosure may relate to a wind turbine assembly comprising: (a) a floating platform comprising a truss-like structure with a central mount: (b) a tower section connected to the central mount: (c) a head platform connected to an upper portion of the tower section: (d) a controller mounted on the head platform, where the controller comprises a controller gear: (e) a first blade assembly connected to the controller: (f) a transmission connected to the controller, where the transmission is supported by the head platform: (g) a generator connected to the transmission, where the generator is supported by the head platform; and a ballast weight system. The ballast weight system may comprise: (1) a ballast weight gear comprising a base portion and an engaging portion, where the engaging portion engages the controller gear; and the ballast weight gear is connected by a connection member to a ballast weight tank, where the connection member winds and unwinds around the base portion of the ballast weight gear, wherein the ballast weight tank is positioned underneath the floating platform: (2) a ballast tank supported by the floating platform: (3) a lower tank pipe fluidly connecting the ballast tank to the ballast weight tank; and (4) an upper tank pipe fluidly connecting the ballast tank to the ballast weight tank. When the controller determines a power output of the generator is below a predetermined threshold power level, the controller instructs a valve to open and allow water to flow from the ballast tank into the ballast weight tank, and wherein as the ballast weight tank fills with water, the ballast weight tank sinks such that as the ballast weight tank sinks, the connection member unwinds from the base portion of the ballast weight gear causing the ballast weight gear to rotate which causes the controller gear to rotate, and where rotation of the controller gear causes the transmission to transmit rotational energy to the generator causing the generator to produce electricity to keep the power output of the wind turbine assembly above the predetermined threshold power level.

Still additional aspects of this disclosure may relate to an electricity generating system comprising: (a) a floating platform comprising a truss-like structure: (b) a controller mounted to the floating platform, where the controller comprises a first controller gear and a second controller gear: (c) a transmission connected to the controller: (d) a generator connected to the transmission: (e) and a ballast weight system. The ballast weight system comprising: (1) a first ballast weight gear comprising a first base portion and a first engaging portion, where the first engaging portion engages the first controller gear, and where the first ballast weight gear is connected to a first connection member that winds and unwinds around the first base portion of the first ballast weight gear, and where the first ballast weight gear is connected by the first connection member to a first ballast weight tank, where the first ballast weight tank is positioned underneath the floating platform: (2) a second ballast weight gear comprising a second base portion and a second engaging portion, where the second engaging portion engages the second controller gear, and where the second ballast weight gear is connected to a second connection member that winds and unwinds around the second base portion of the second ballast weight gear, and where the second ballast weight gear is connected by the second connection member to a second ballast weight tank, wherein the second ballast weight tank is positioned underneath the floating platform: (3) a ballast tank supported by the floating platform; and (4) a plurality of tank pipes fluidly connecting the ballast tank to the first ballast weight tank and the second ballast weight tank. In order to generate electricity, the controller may instruct a first valve to open and allow water to flow from the ballast tank into the first ballast weight tank through a first tank pipe of the plurality of tank pipes; and as the first ballast weight tank fills with water, the first ballast weight tank sinks such that as the first ballast weight tank sinks, the first connection member unwinds from the first base portion of the first ballast weight gear causing the first controller gear to rotate. The rotation of the first controller gear may cause the transmission to transmit rotational energy to the generator causing the generator to produce electricity.

BRIEF DESCRIPTION OF THE DRAWINGS

The foregoing Summary, as well as the following Detailed Description, will be better understood when considered in conjunction with the accompanying drawings in which like reference numerals refer to the same or similar elements in all of the various views in which that reference number appears.

4

Figure 1:
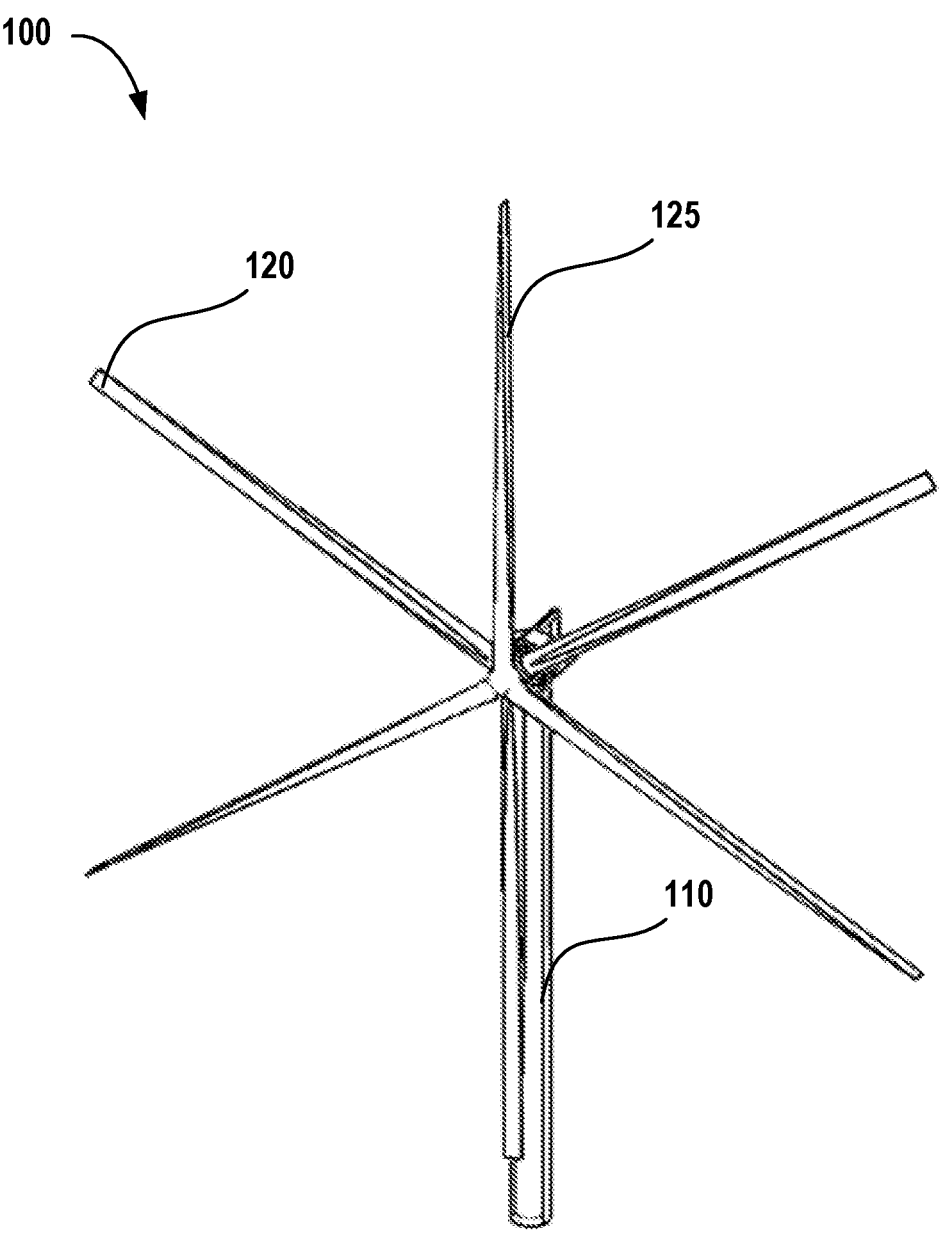
FIG. 1 depicts a front perspective view of an exemplary wind turbine assembly, according to one or more aspects described herein.
Figures 2, 3:
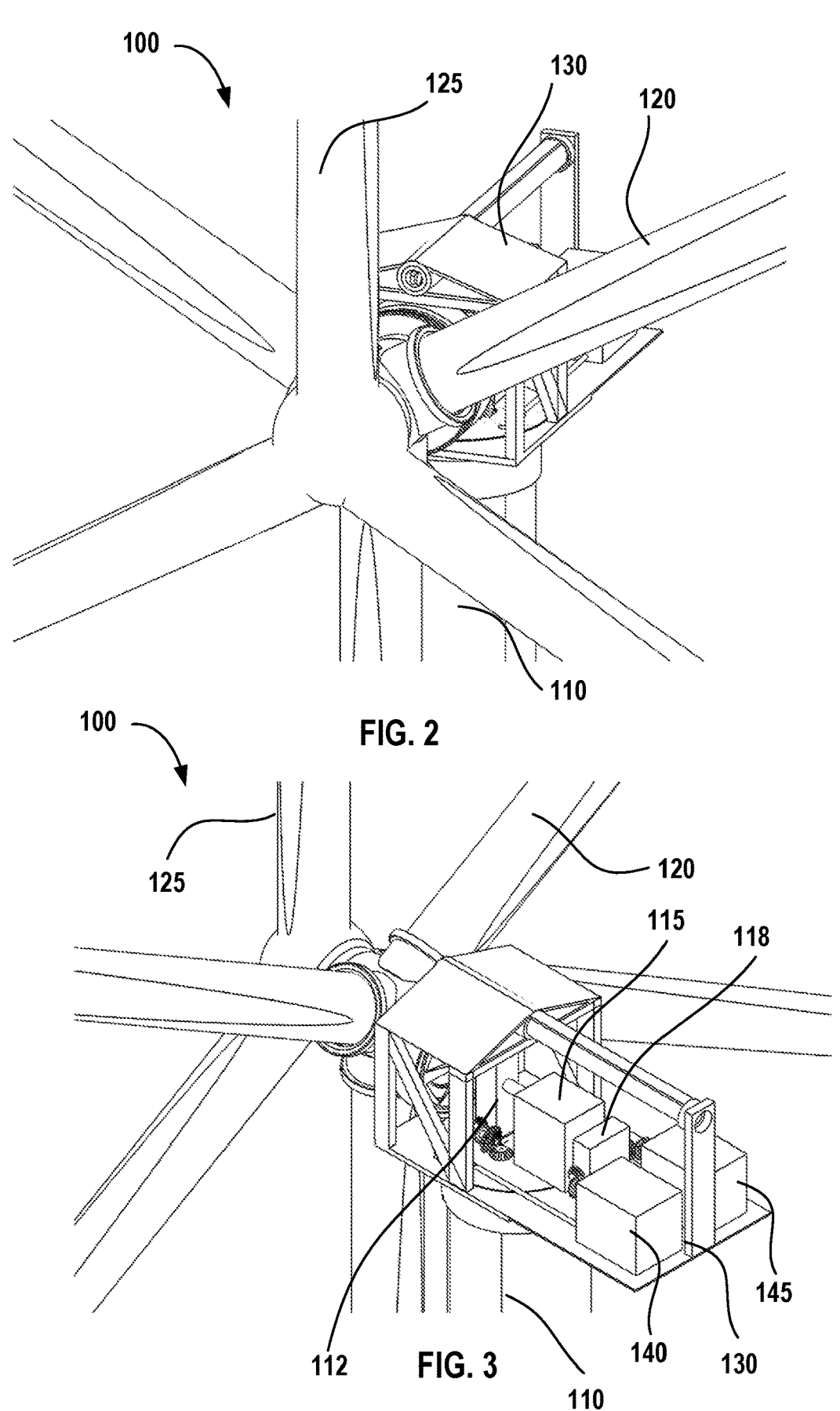

FIG. 2 depicts an enlarged partial view of the front perspective view of the exemplary wind turbine assembly of FIG. 1, according to one or more aspects described herein.

FIG. 3 depicts a partial view of a rear perspective view of the exemplary wind turbine assembly of FIG. 1, according to one or more aspects described herein.

Figure 4:
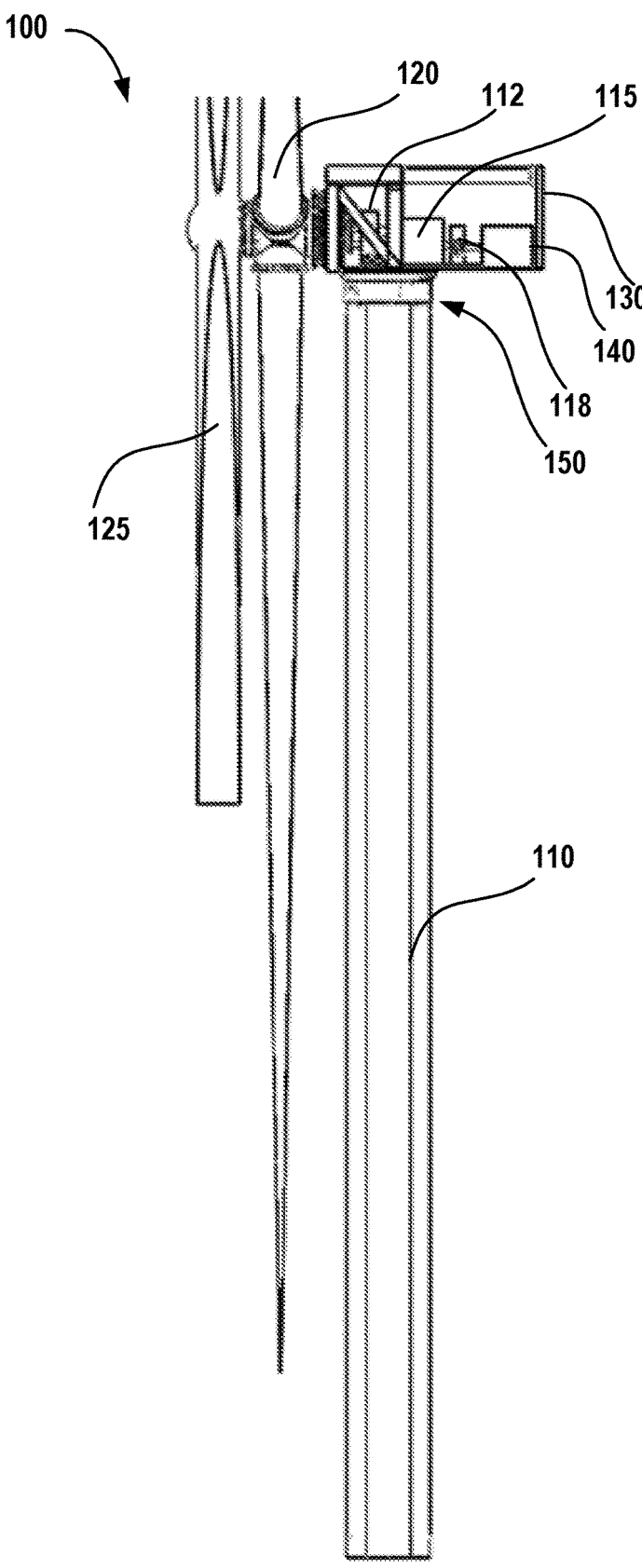

FIG. 4 depicts a side cross-sectional view of the wind turbine assembly of the exemplary wind turbine assembly of FIG. 1, according to one or more aspects described herein.

Figure 5:
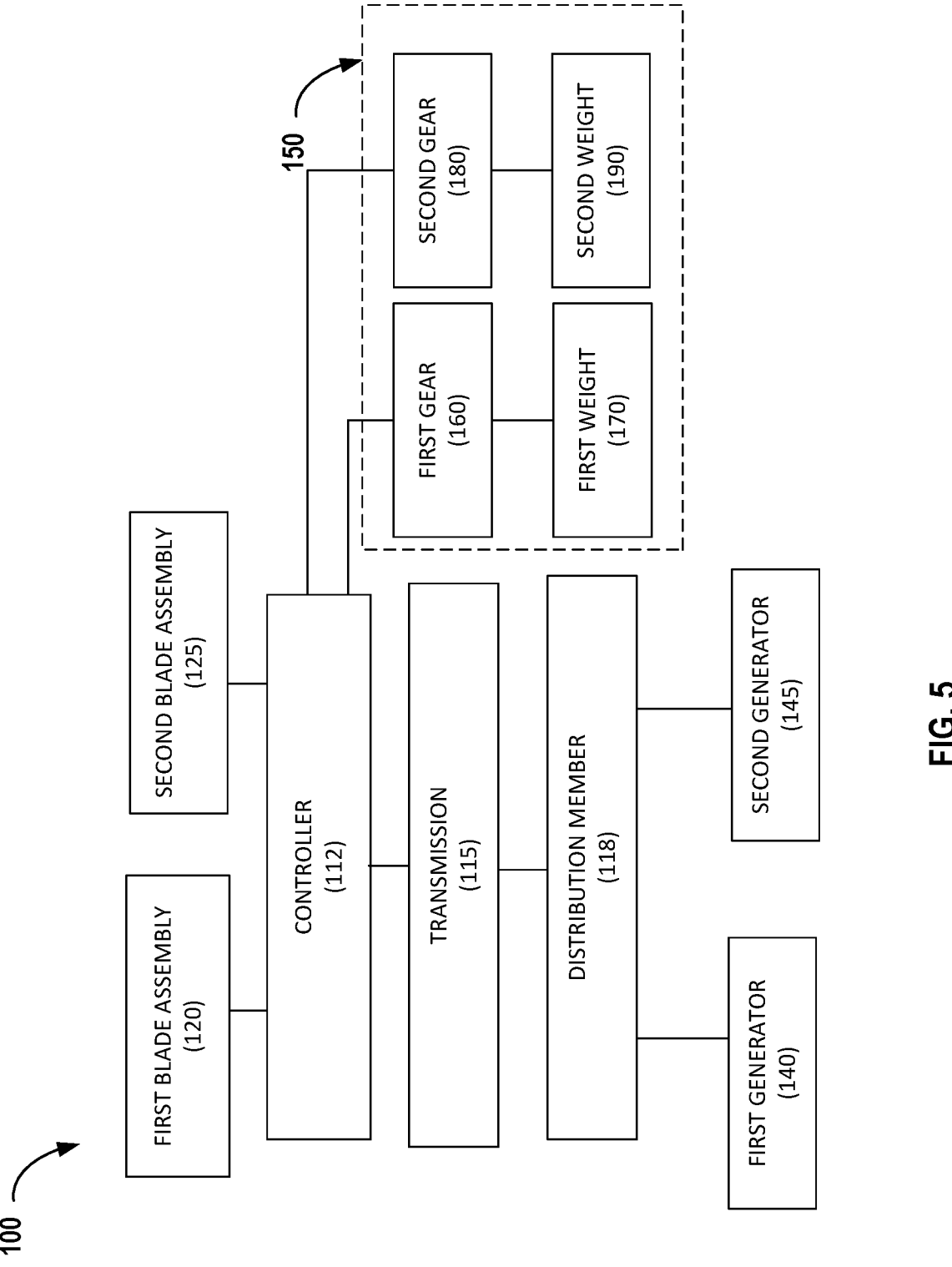

FIG. 5 depicts a schematic view of the exemplary wind turbine assembly of FIG. 1, according to one or more aspects described herein.

Figures 6, 7:
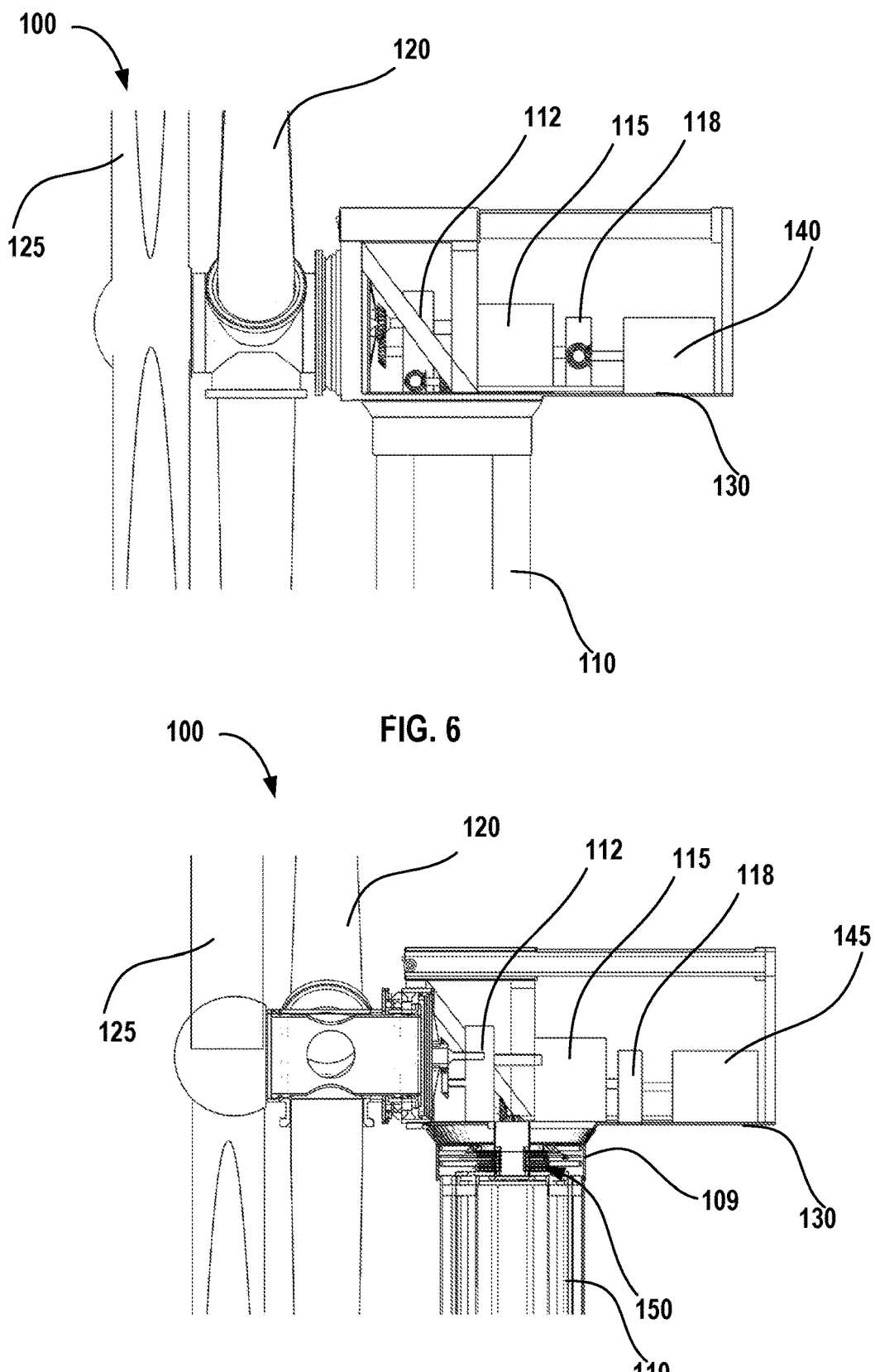

FIG. 6 depicts a partial side view of the exemplary wind turbine assembly of FIG. 1, according to one or more aspects described herein.

FIG. 7 depicts a partial cross-sectional side view of the exemplary wind turbine assembly of FIG. 1, according to one or more aspects described herein.

Figure 8:
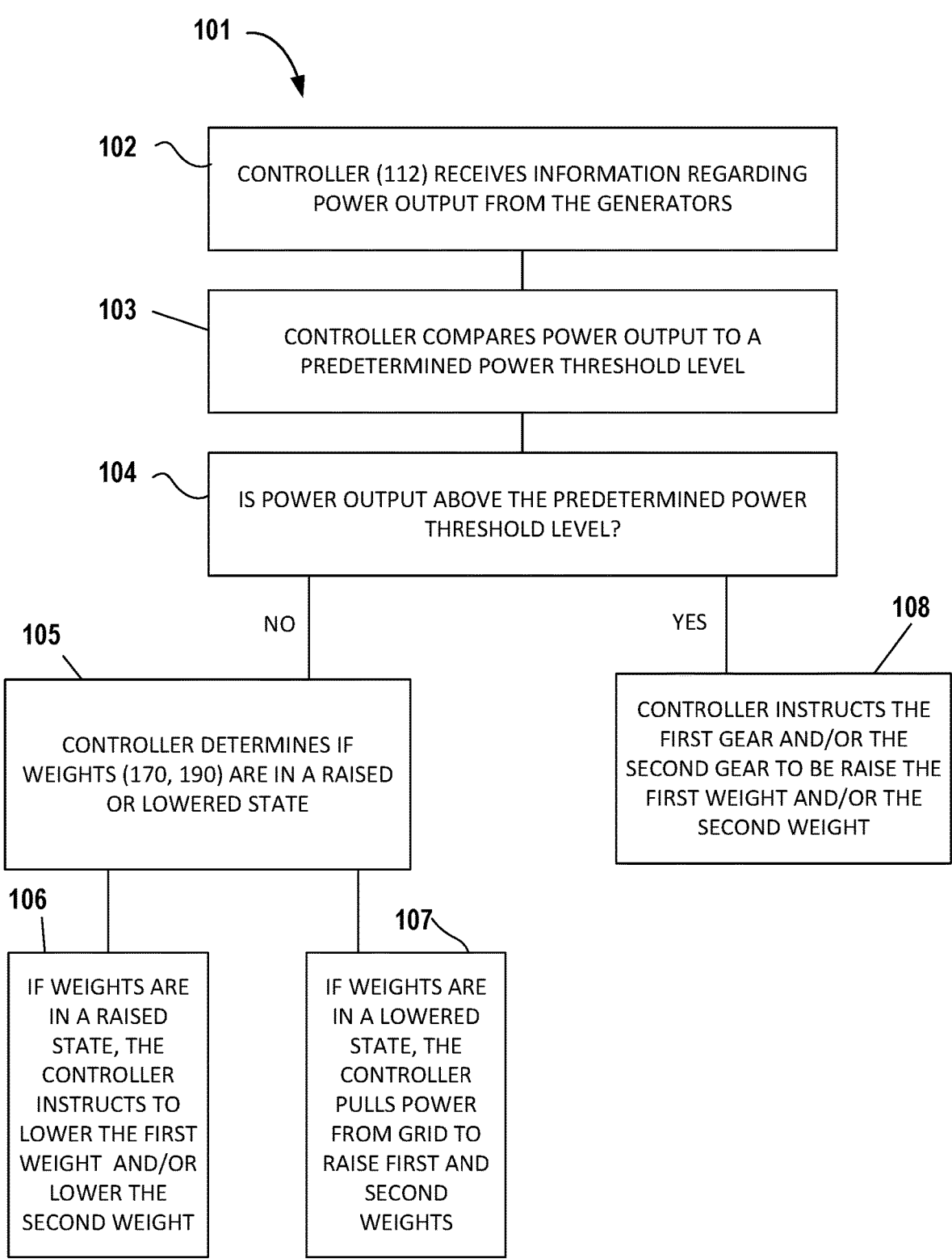

FIG. 8 depicts a flowchart for the control of the operation of the exemplary wind turbine assembly of FIG. 1, according to one or more aspects described herein.

Figure 9:
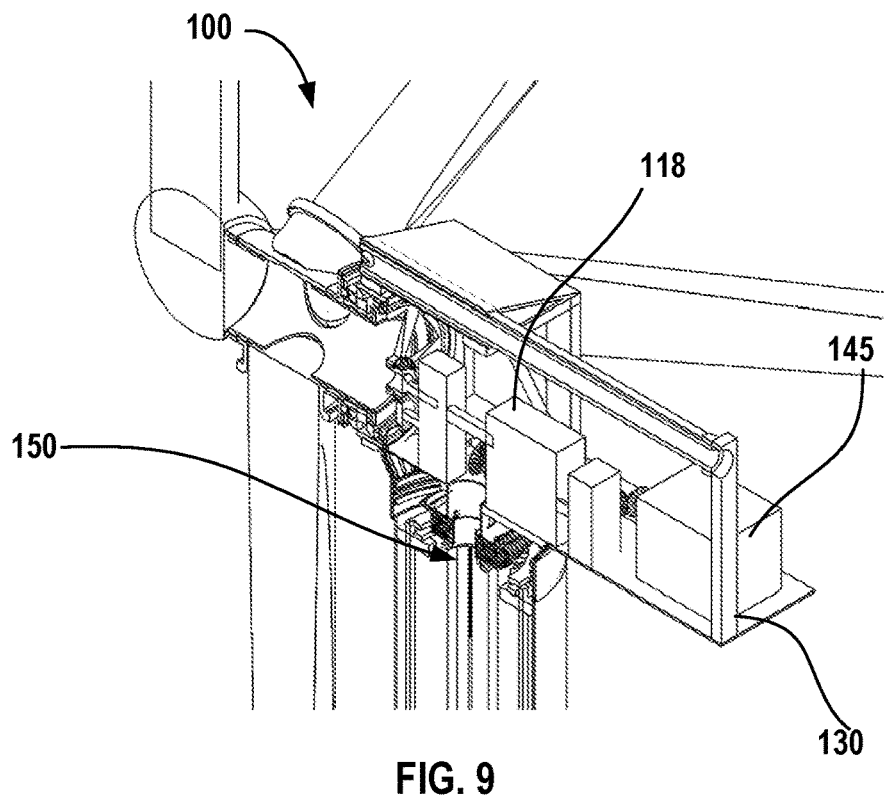

FIG. 9 depicts a partial cross-sectional perspective view of the exemplary wind turbine assembly of FIG. 1, according to one or more aspects described herein.

Figure 10:
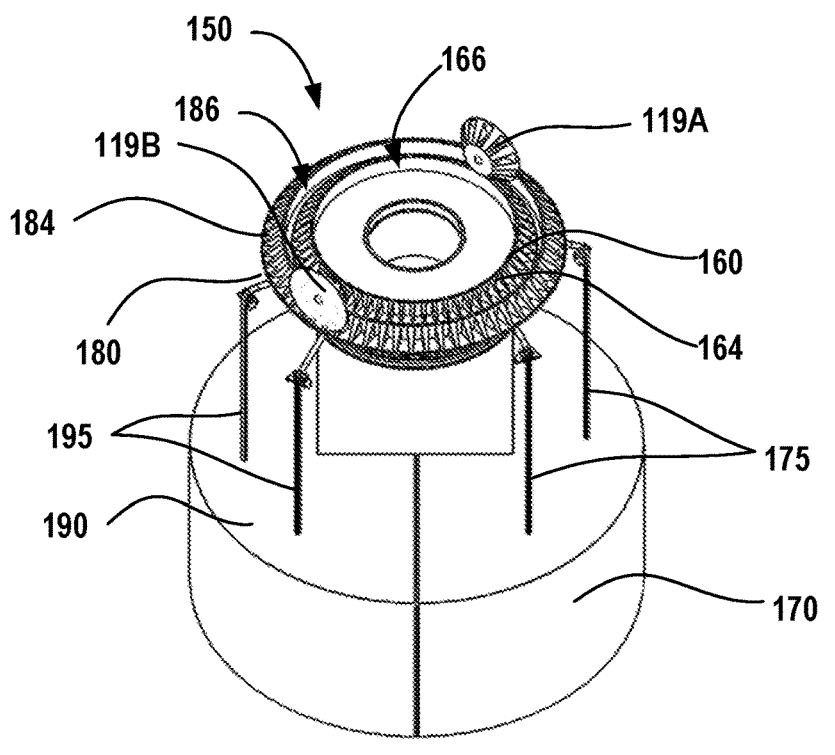

FIG. 10 depicts a perspective view of elements of a falling weight system of the exemplary wind turbine assembly of FIG. 1, according to one or more aspects described herein.

Figures 11, 12:
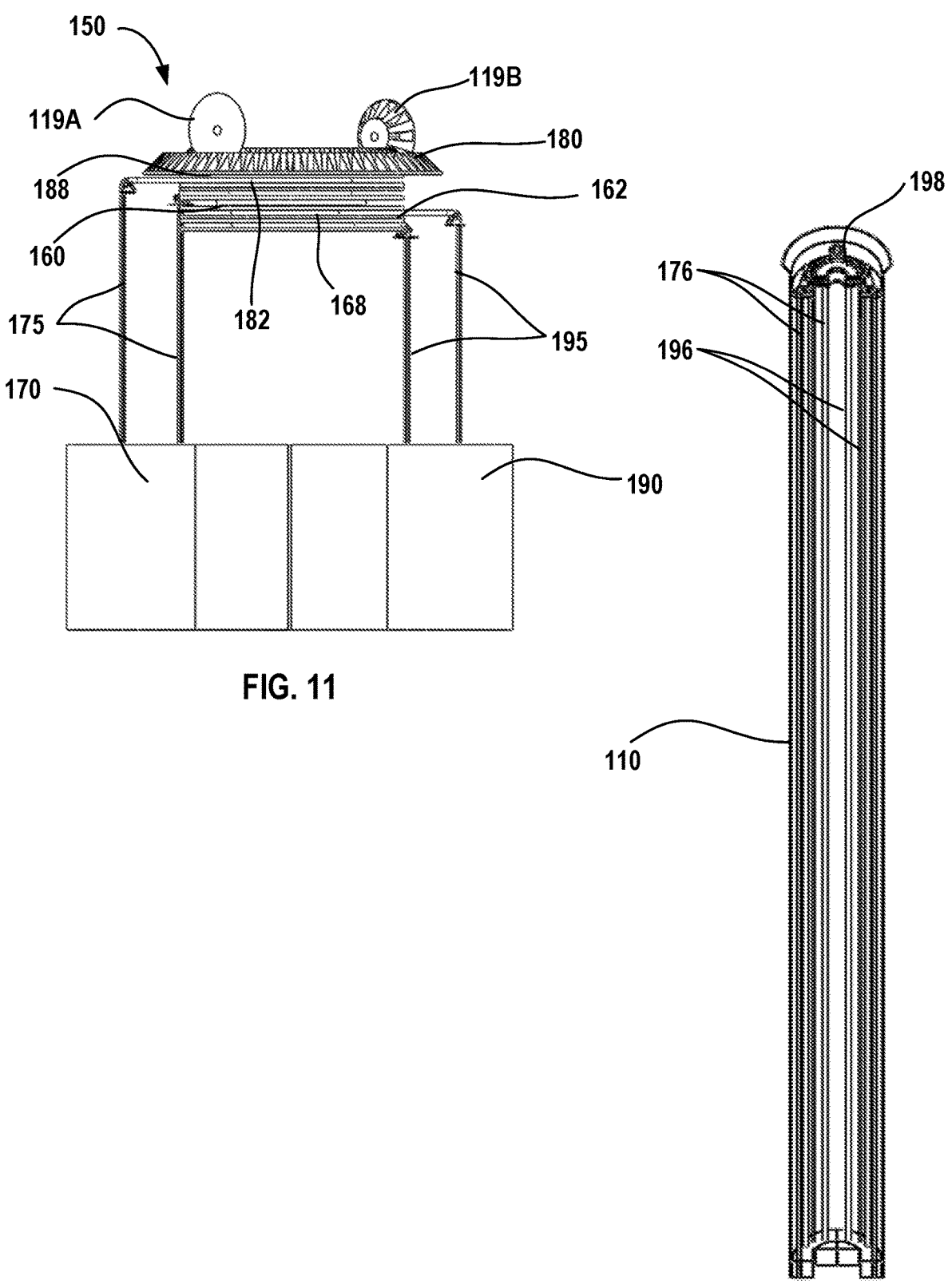

FIG. 11 depicts a side view of elements of a falling weight system of the exemplary wind turbine assembly of FIG. 1, according to one or more aspects described herein.

FIG. 12 depicts a perspective view of elements of a falling weight system of the exemplary wind turbine assembly of FIG. 1, according to one or more aspects described herein.

Figure 13:
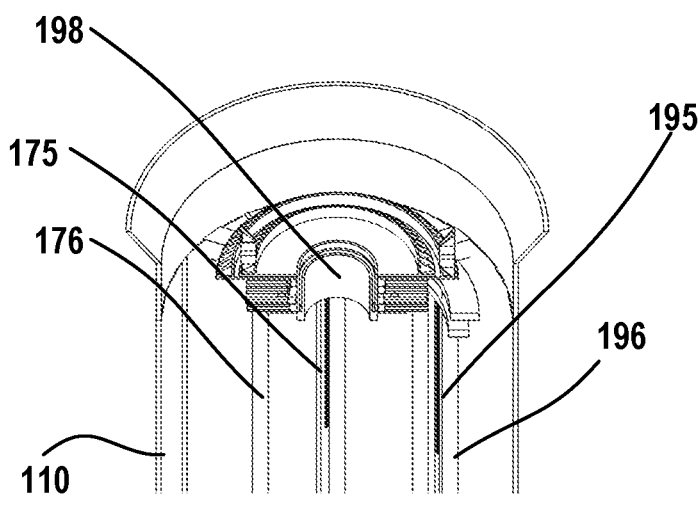

FIG. 13 depicts an enlarged perspective view of elements of a falling weight system of the exemplary wind turbine assembly of FIG. 12, according to one or more aspects described herein.

Figure 14:
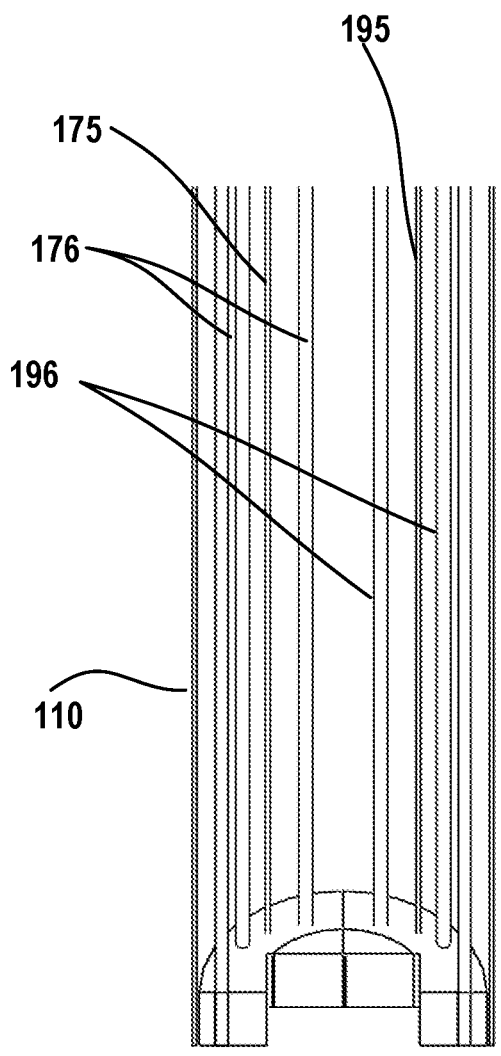

FIG. 14 depicts an enlarged perspective view of elements of a falling weight system of the exemplary wind turbine assembly of FIG. 12, according to one or more aspects described herein.

Figure 15:
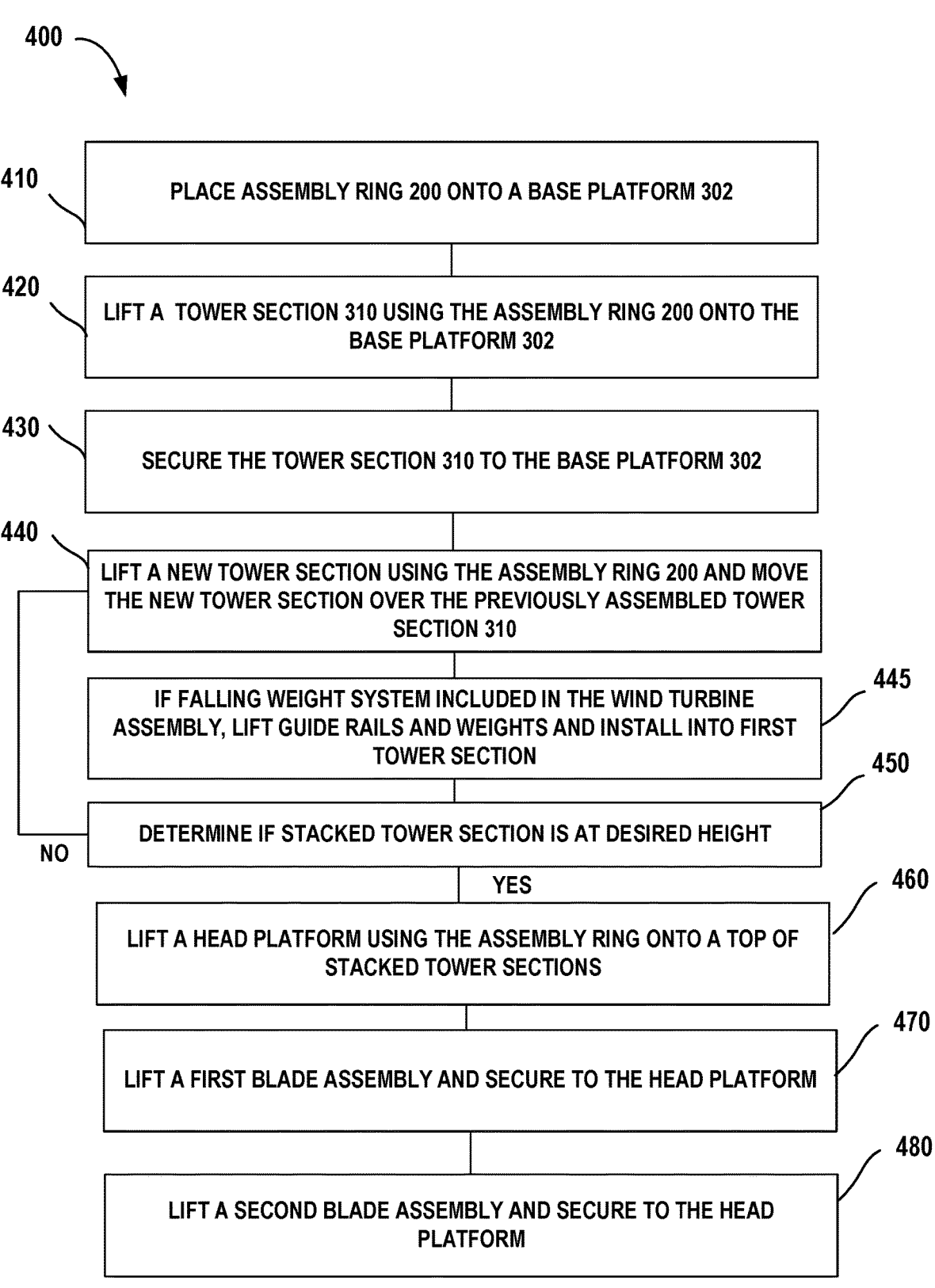

FIG. 15 depicts a flowchart for a method for assembling an exemplary wind turbine assembly, according to one or more aspects described herein.

Figure 16B:
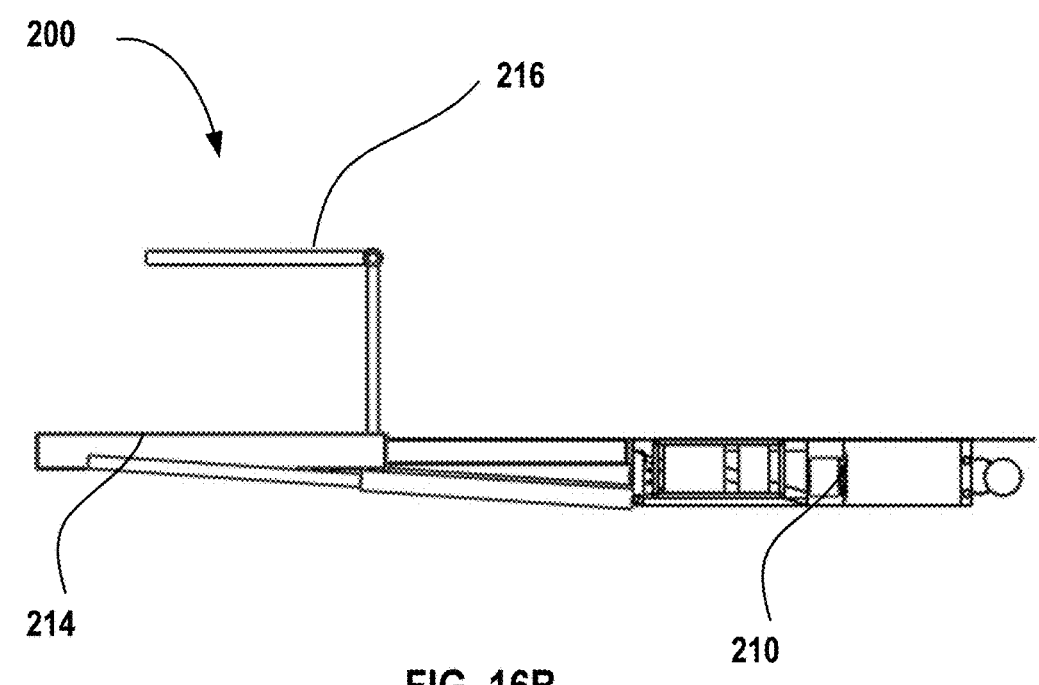
Figure 16A:
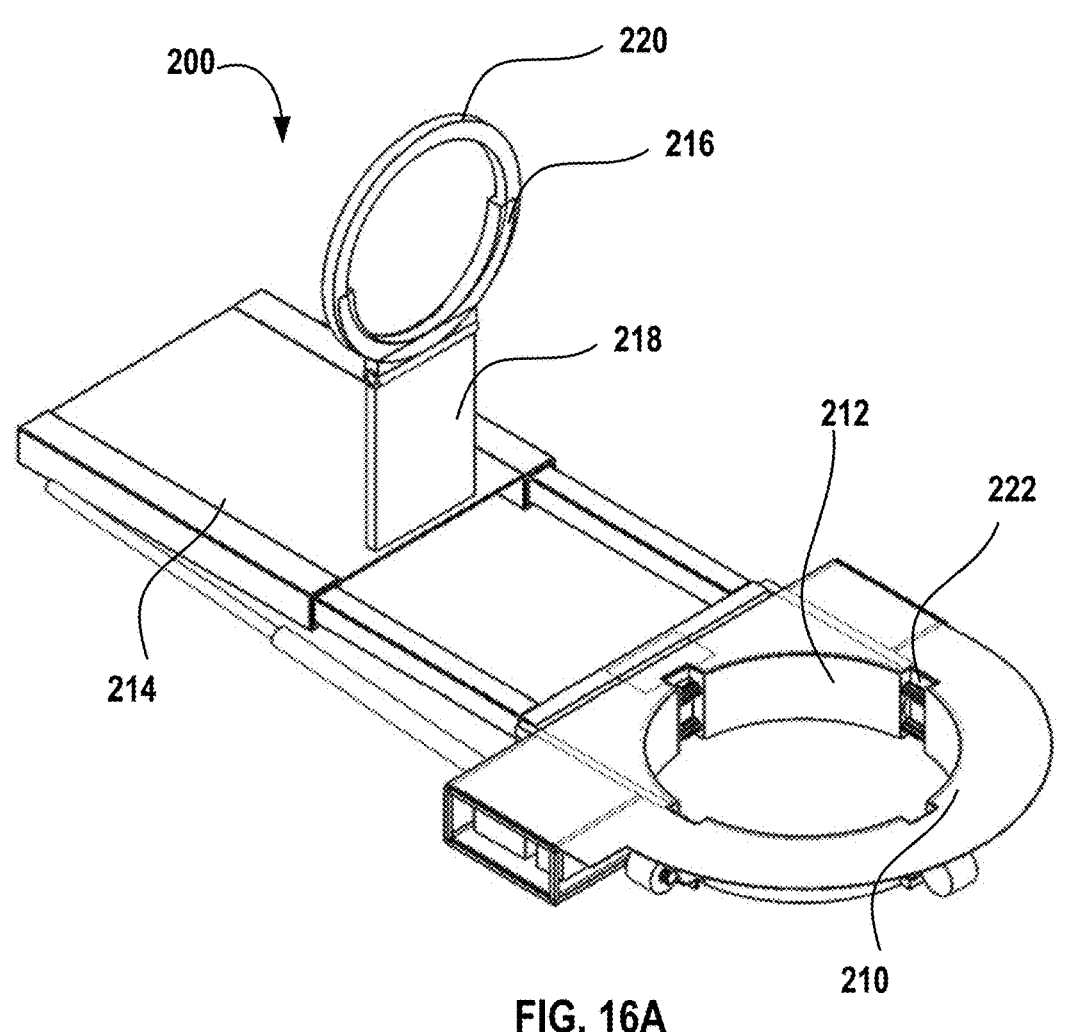

FIG. 16A depicts a perspective view of an exemplary assembly ring to assemble an exemplary wind turbine assembly, according to one or more aspects described herein.

FIG. 16B depicts a side view of the exemplary assembly ring of FIG. 16A with the pivot ring in a horizontal orientation, according to one or more aspects described herein.

Figures 16C, 16D:
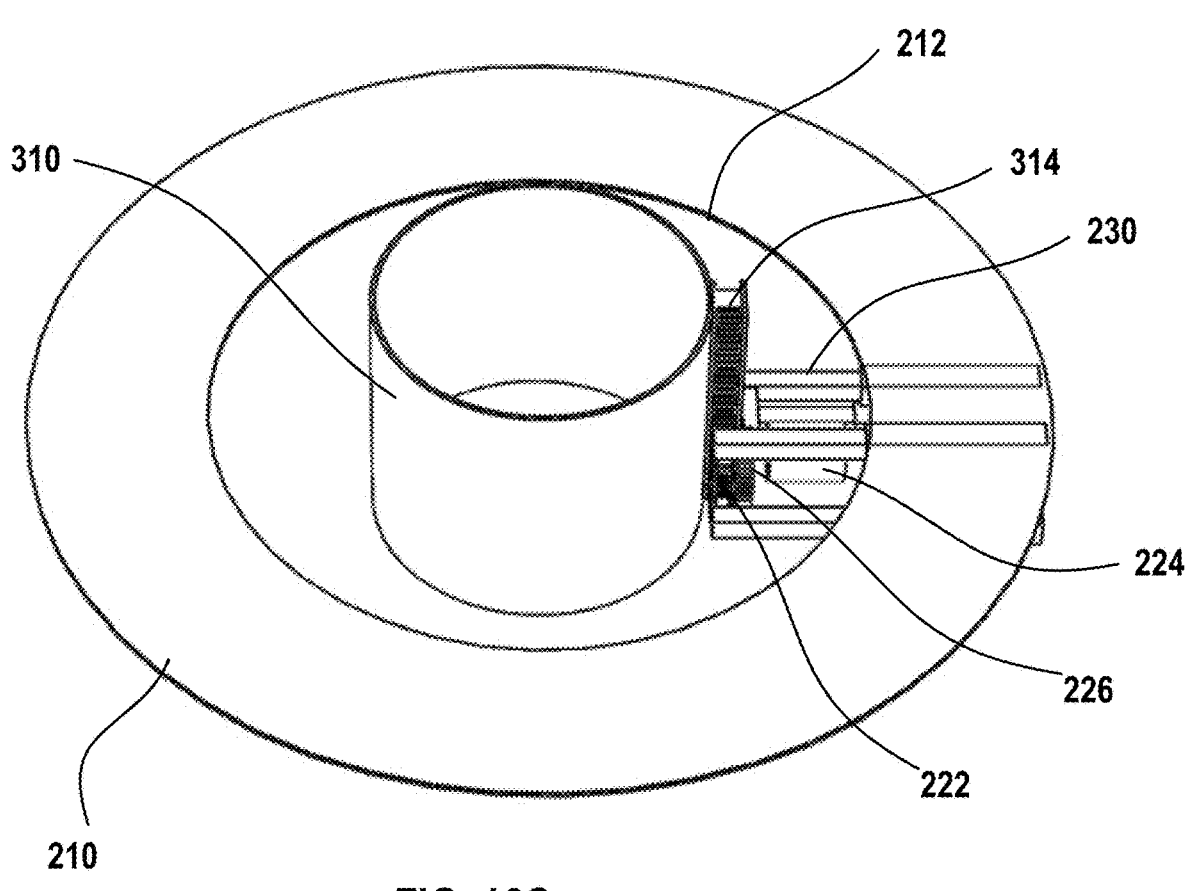

FIG. 16C depicts a perspective view of the exemplary assembly ring of FIG. 16A with some components removed for clarity, according to one or more aspects described herein.

FIG. 16D depicts a perspective view of a portion of the exemplary assembly ring of FIG. 16A with some components removed for clarity, according to one or more aspects described herein.

Figure 16E:
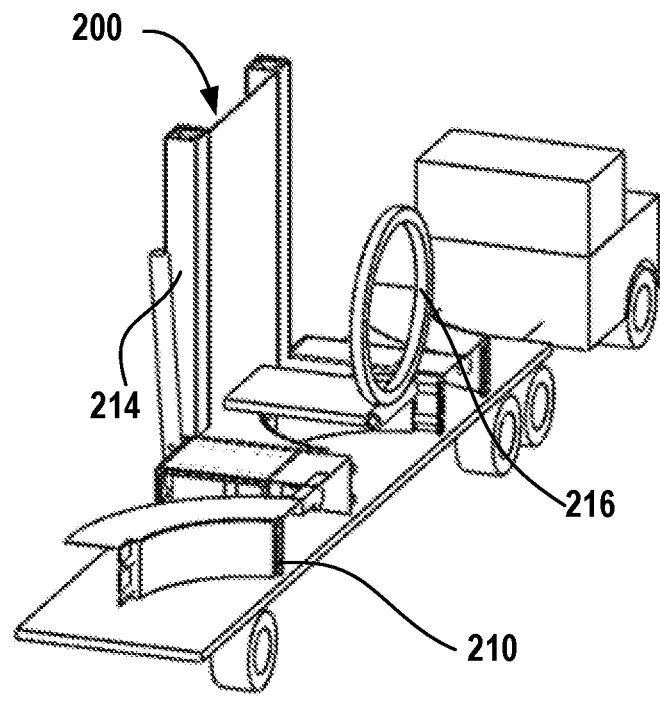

FIG. 16E depicts a perspective view of the exemplary assembly ring of FIG. 16A in a disassembled state, according to one or more aspects described herein.

Figure 17:
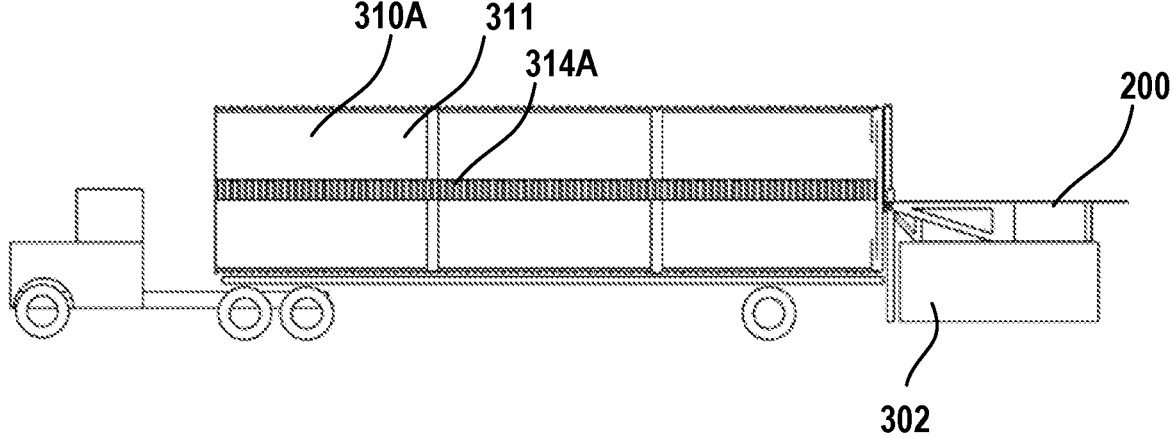

FIG. 17 depicts a side view of a portion of the assembly of an exemplary wind turbine assembly as described in the method of FIG. 15, according to one or more aspects described herein.

Figures 18, 19:
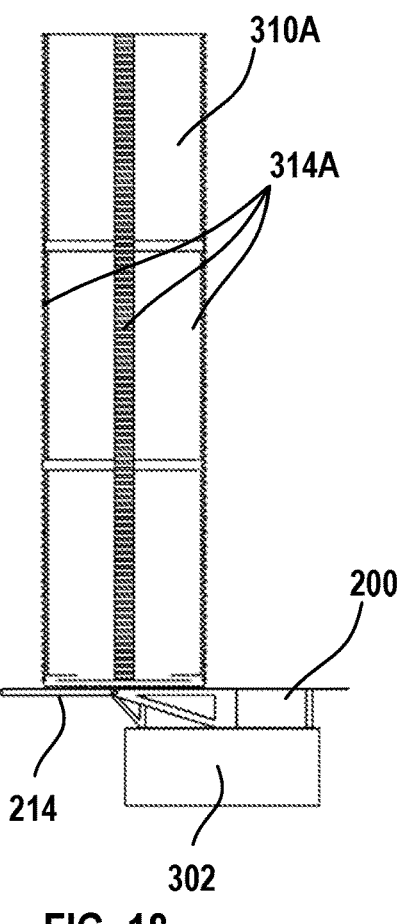

FIG. 18 depicts a side view of a portion of the assembly of an exemplary wind turbine assembly as described in the method of FIG. 15, according to one or more aspects described herein.

FIG. 19 depicts a side view of a portion of the assembly of an exemplary wind turbine assembly as described in the method of FIG. 15, according to one or more aspects described herein.

Figure 20:
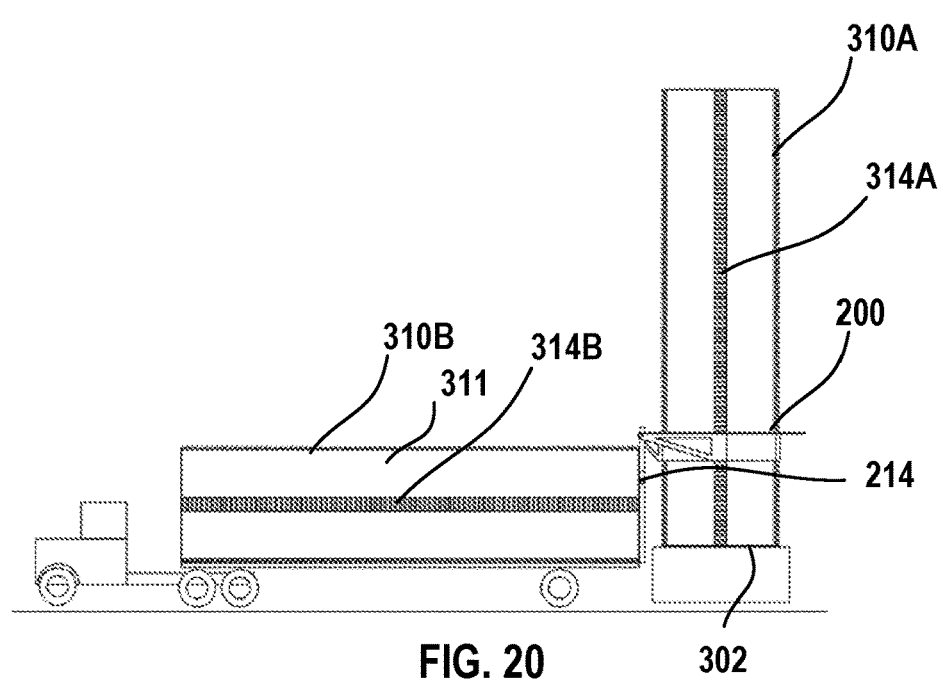

FIG. 20 depicts a side view of a portion of the assembly of an exemplary wind turbine assembly as described in the method of FIG. 15, according to one or more aspects described herein.

Figure 21:
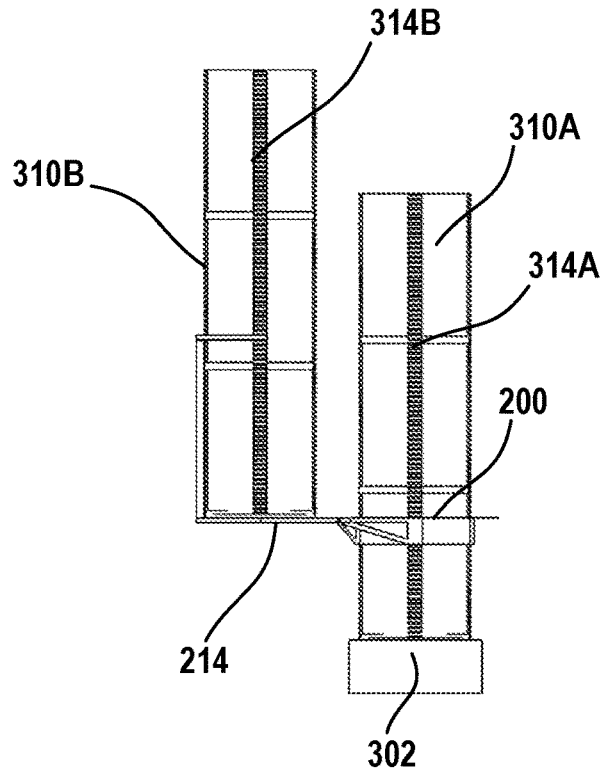

FIG. 21 depicts a side view of a portion of the assembly of an exemplary wind turbine assembly as described in the method of FIG. 15, according to one or more aspects described herein.

Figure 22:
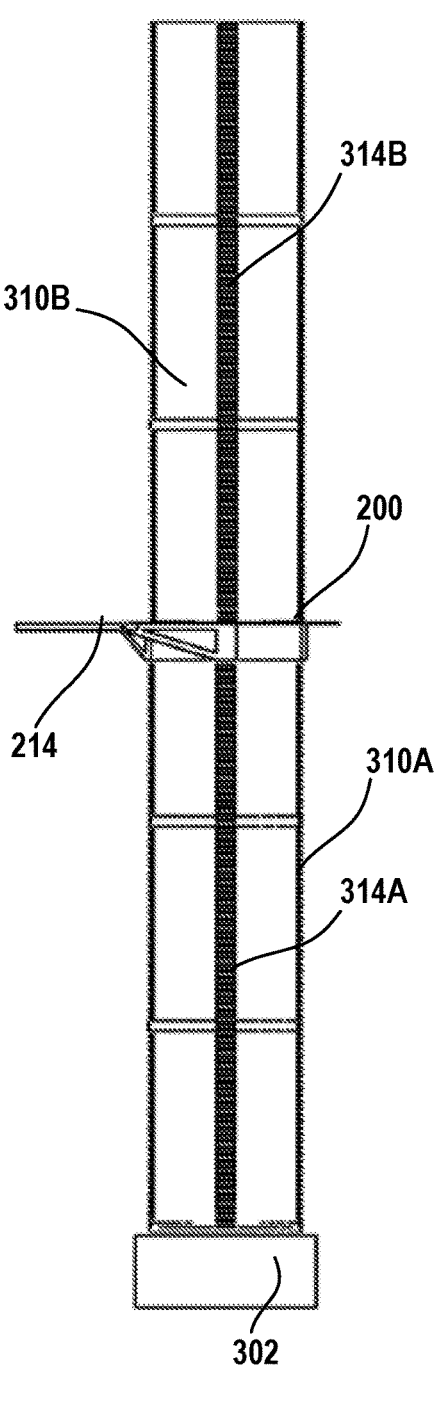

FIG. 22 depicts a side view of a portion of the assembly of an exemplary wind turbine assembly as described in the method of FIG. 15, according to one or more aspects described herein.

Figure 23:
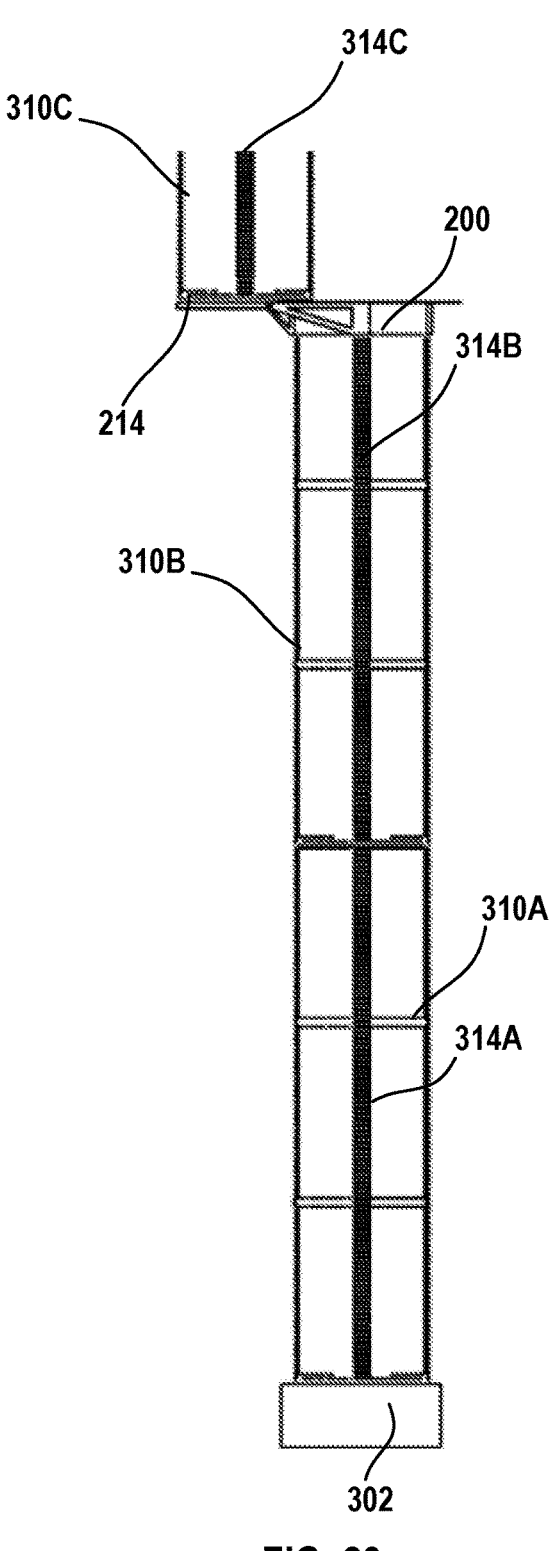

FIG. 23 depicts a side view of a portion of the assembly of an exemplary wind turbine assembly as described in the method of FIG. 15, according to one or more aspects described herein.

Figures 24, 25:
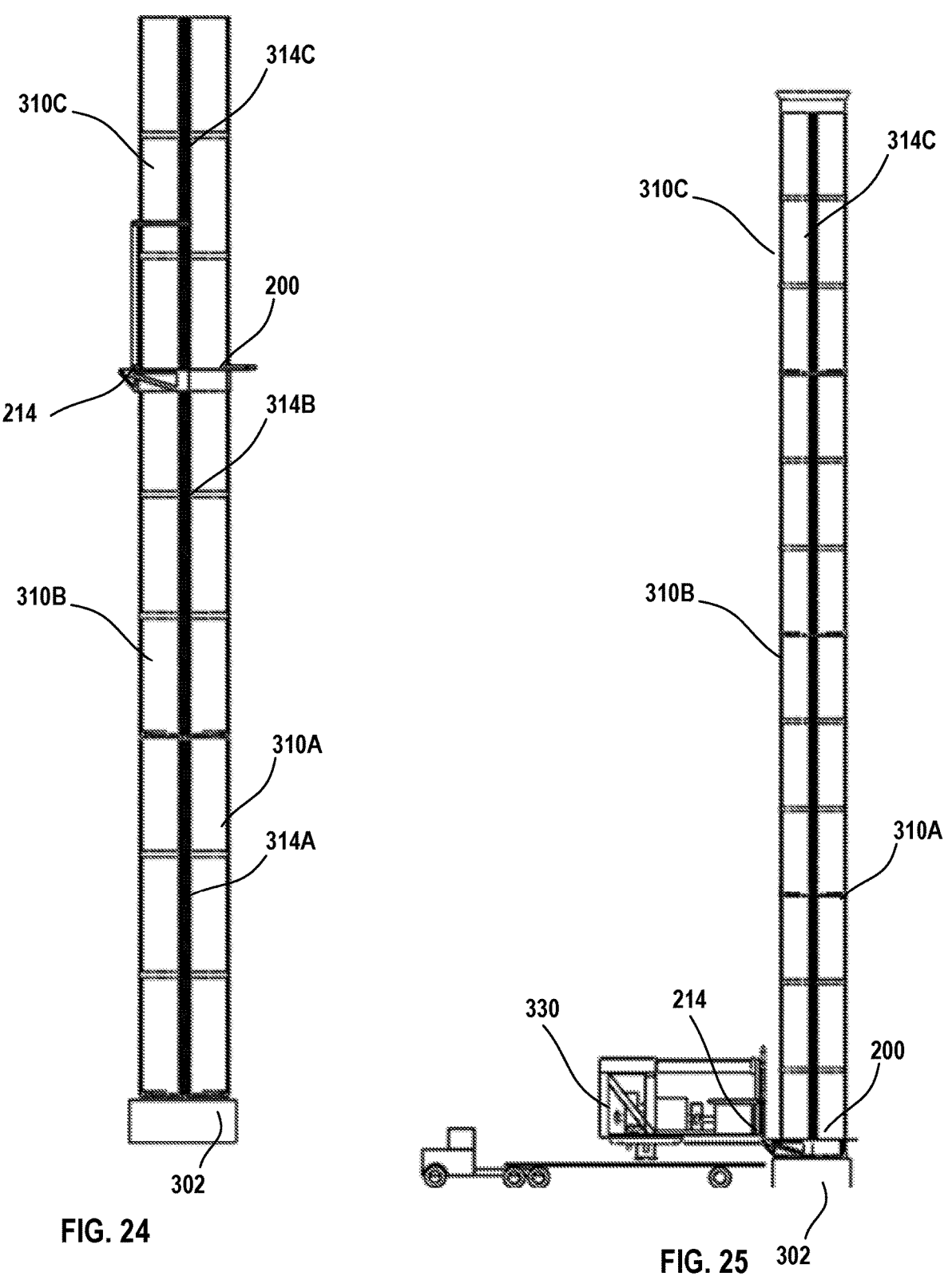

FIG. 24 depicts a side view of a portion of the assembly of an exemplary wind turbine assembly as described in the method of FIG. 15, according to one or more aspects described herein.

FIG. 25 depicts a side view of a portion of the assembly of an exemplary wind turbine assembly as described in the method of FIG. 15, according to one or more aspects described herein.

Figure 26:
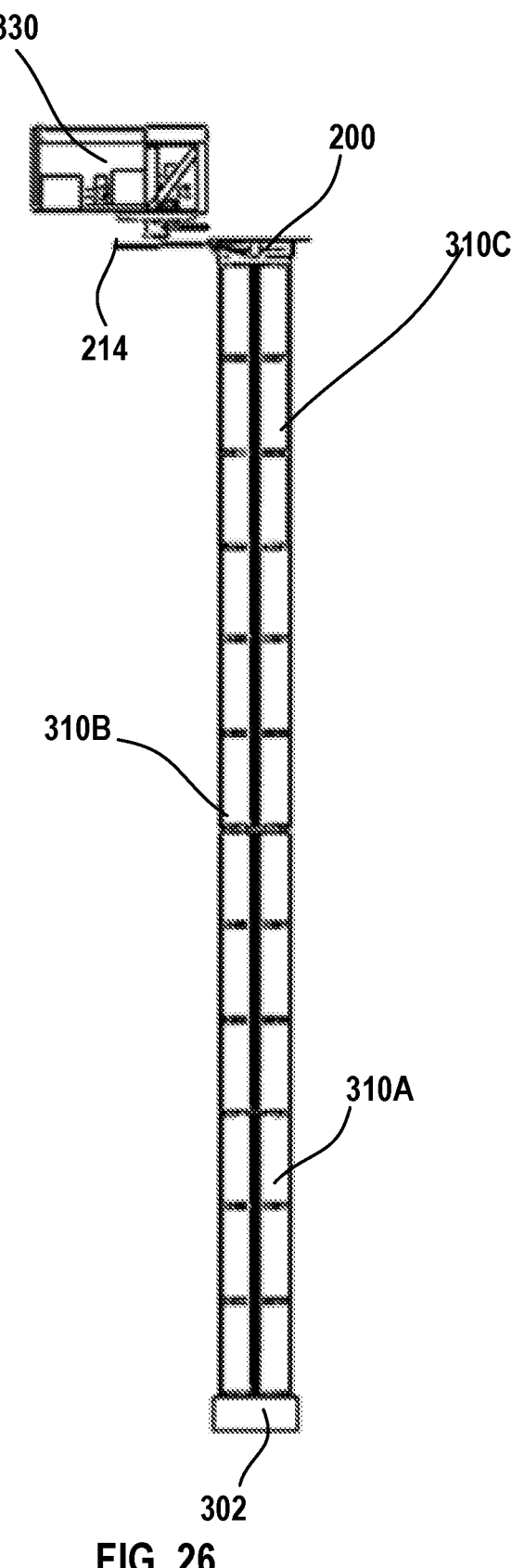

FIG. 26 depicts a side view of a portion of the assembly of an exemplary wind turbine assembly as described in the method of FIG. 15, according to one or more aspects described herein.

Figure 27:
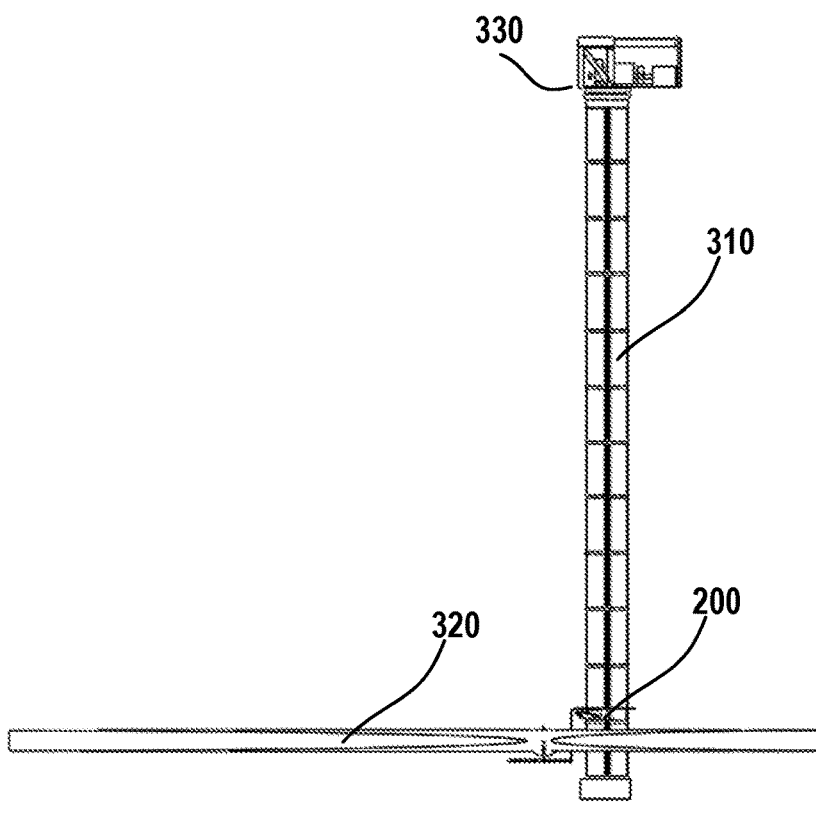

FIG. 27 depicts a side view of a portion of the assembly of an exemplary wind turbine assembly as described in the method of FIG. 15, according to one or more aspects described herein.

Figure 28:
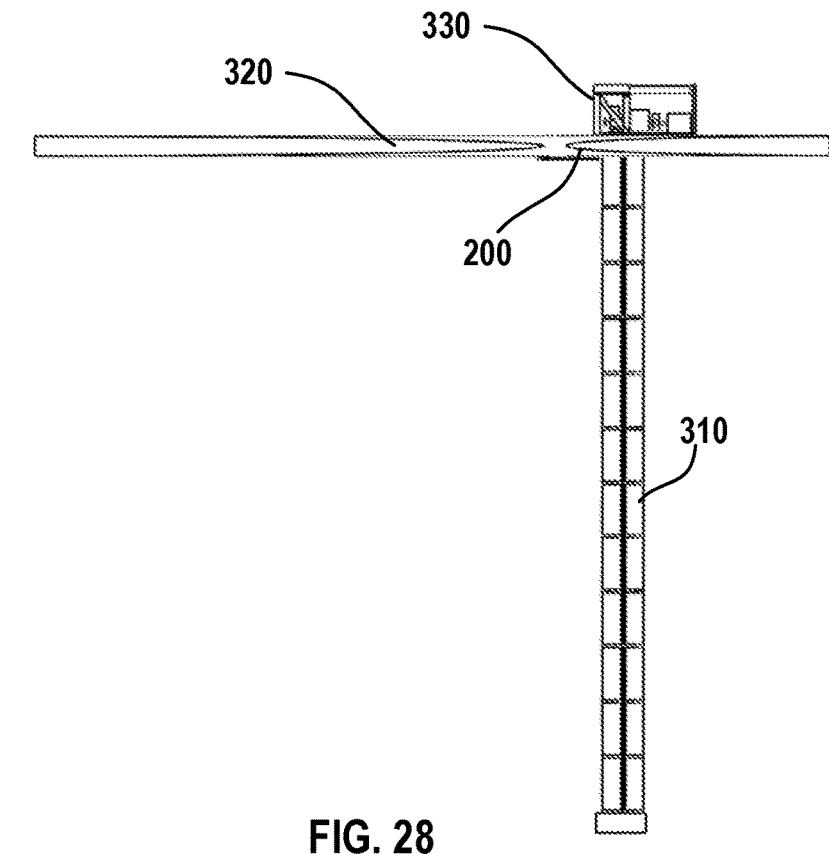

FIG. 28 depicts a side view of a portion of the assembly of an exemplary wind turbine assembly as described in the method of FIG. 15, according to one or more aspects described herein.

Figures 29, 30:
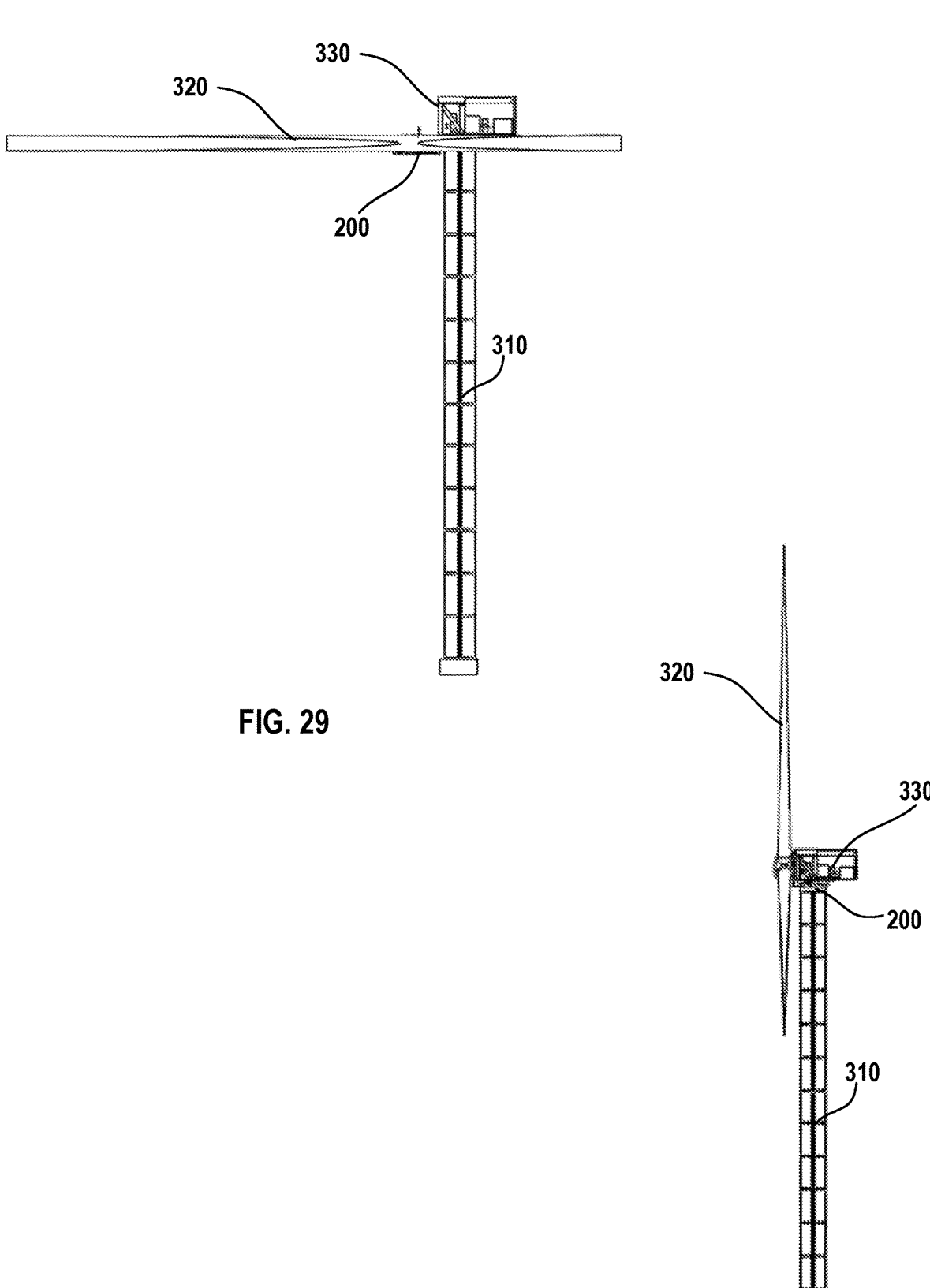

FIG. 29 depicts a side view of a portion of the assembly of an exemplary wind turbine assembly as described in the method of FIG. 15, according to one or more aspects described herein.

FIG. 30 depicts a side view of a portion of the assembly of an exemplary wind turbine assembly as described in the method of FIG. 15, according to one or more aspects described herein.

Figures 31, 32:
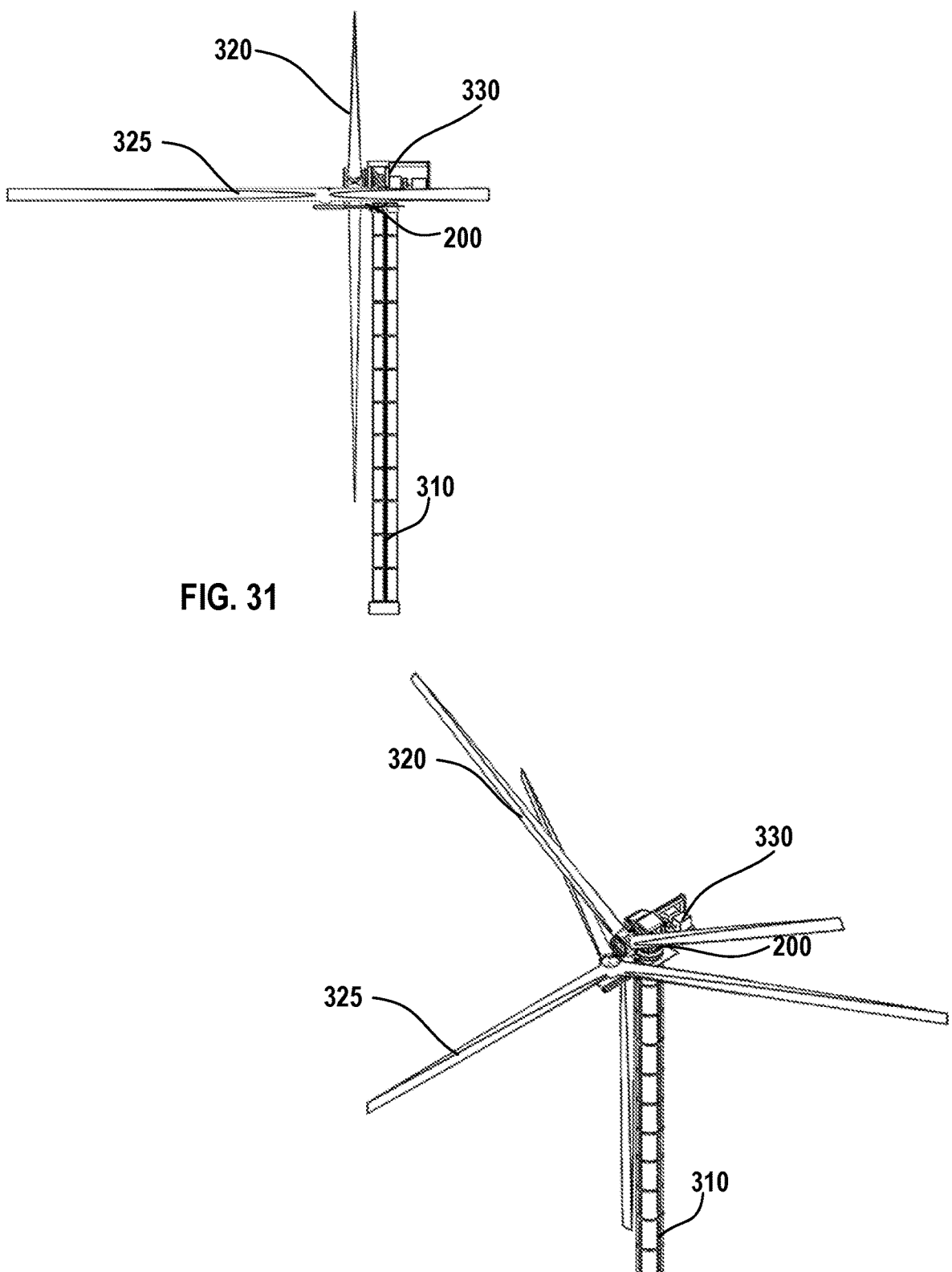

FIG. 31 depicts a side view of a portion of the assembly of an exemplary wind turbine assembly as described in the method of FIG. 15, according to one or more aspects described herein.

FIG. 32 depicts a perspective view of a portion of the assembly of an exemplary wind turbine assembly as described in the method of FIG. 15, according to one or more aspects described herein.

Figures 33, 34:
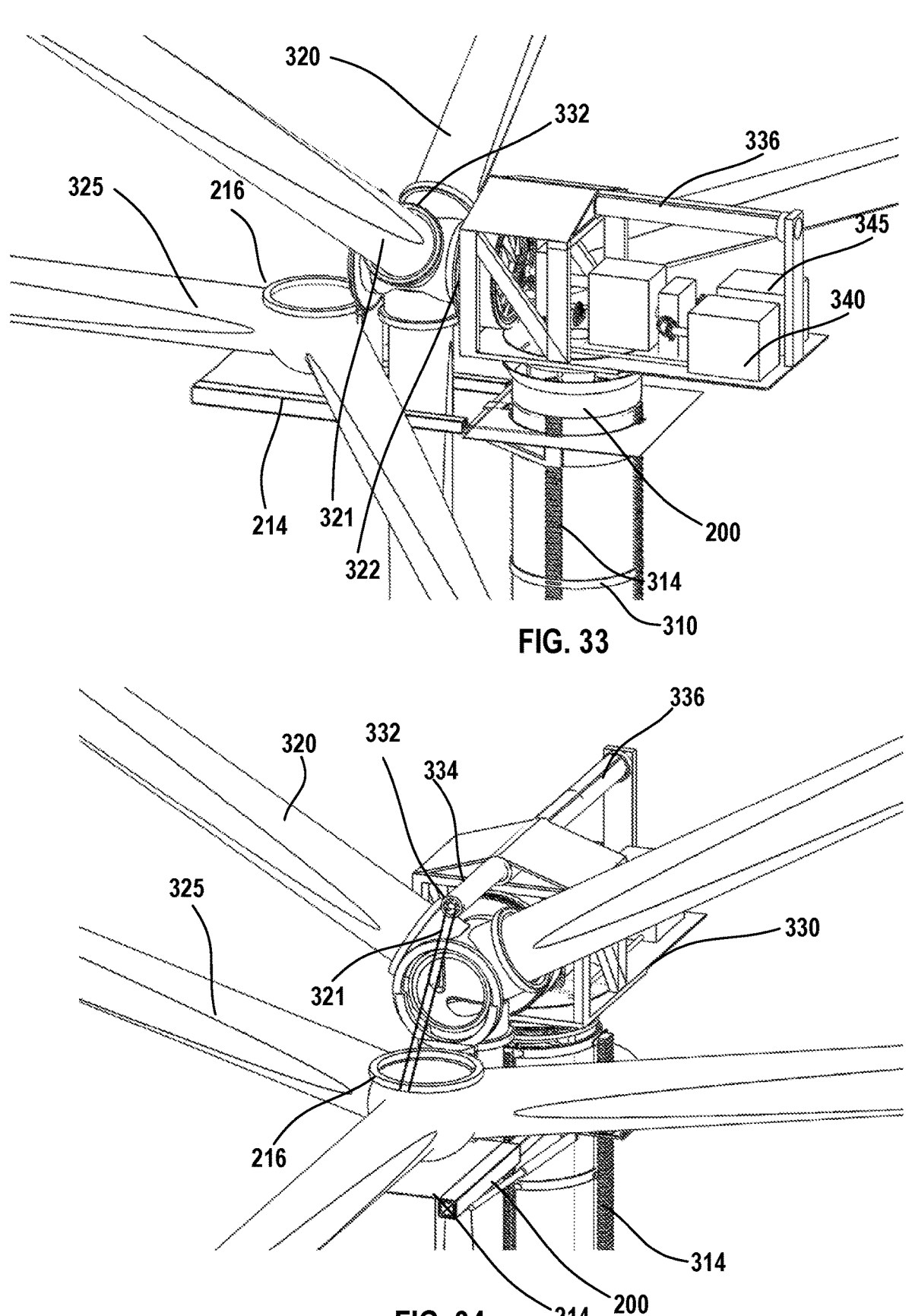

FIG. 33 depicts a portion of a perspective view of a portion of the assembly of an exemplary wind turbine assembly as described in the method of FIG. 15, according to one or more aspects described herein.

FIG. 34 depicts a portion of a perspective view of a portion of the assembly of an exemplary wind turbine assembly as described in the method of FIG. 15, according to one or more aspects described herein.

Figure 35:
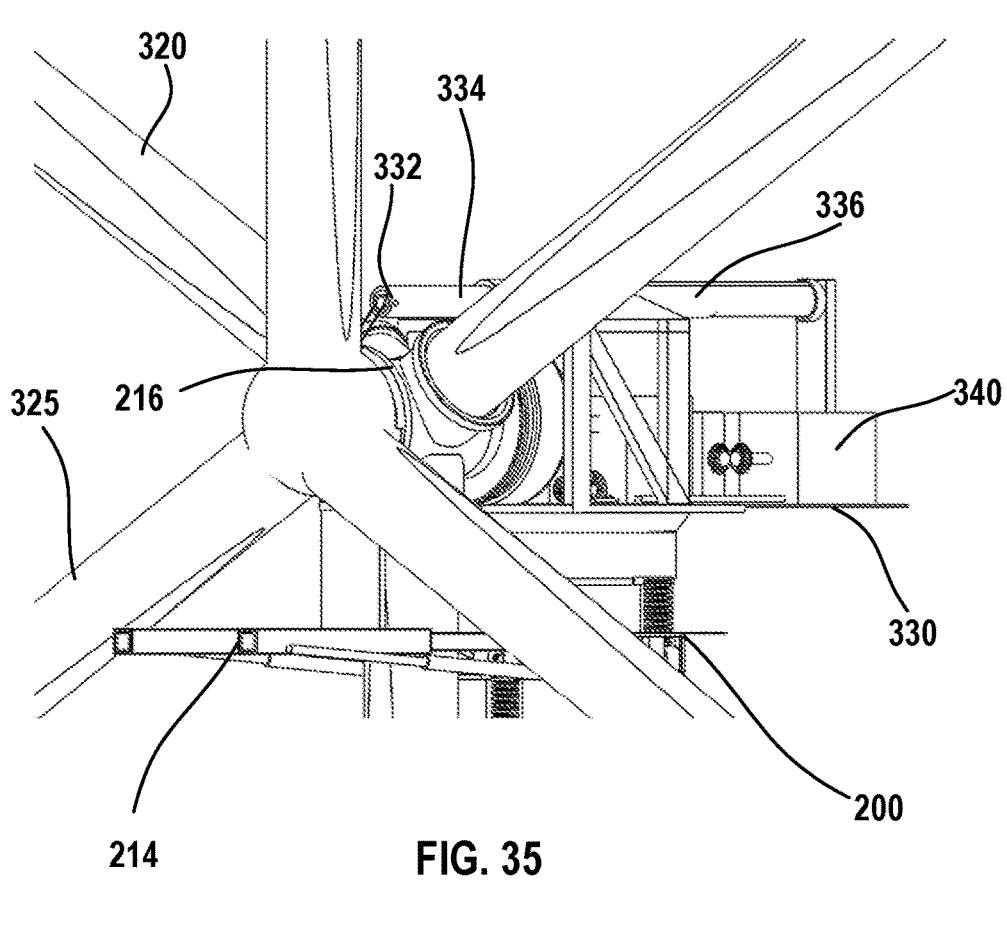

FIG. 35 depicts a portion of a perspective view of a portion of the assembly of an exemplary wind turbine assembly as described in the method of FIG. 15, according to one or more aspects described herein.

Figure 36:
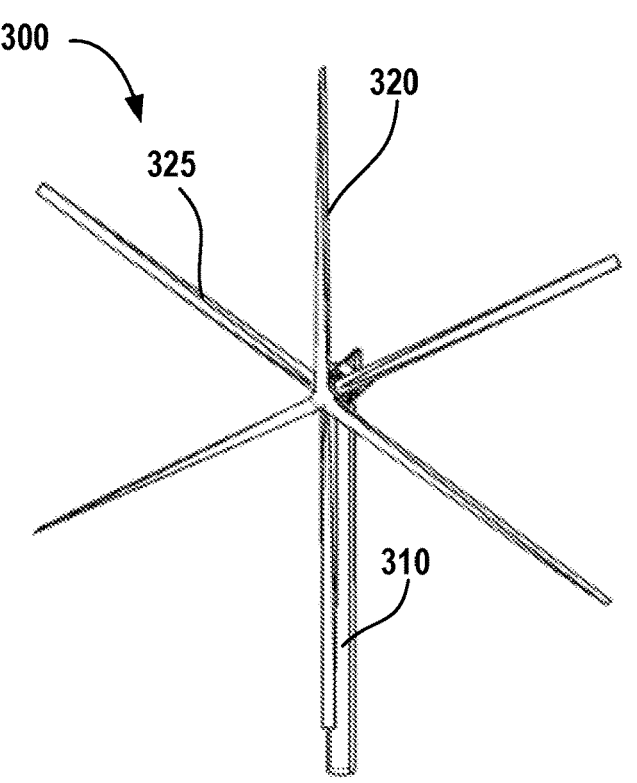

FIG. 36 depicts a portion of a perspective view of a portion of the assembly of an exemplary wind turbine assembly as described in the method of FIG. 15, according to one or more aspects described herein.

Figure 37:
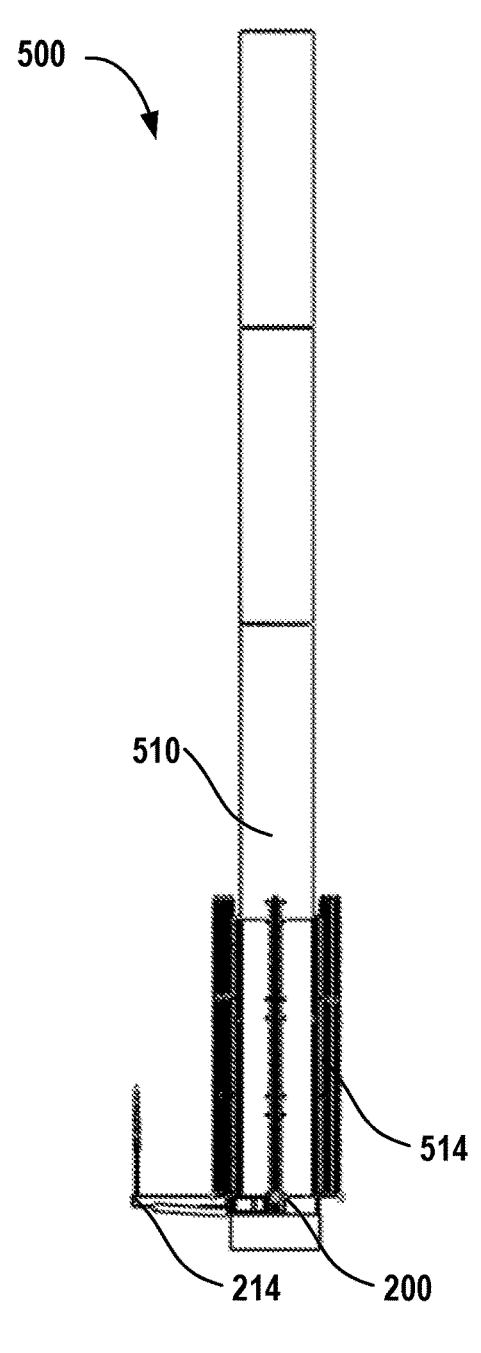
Figure 38:
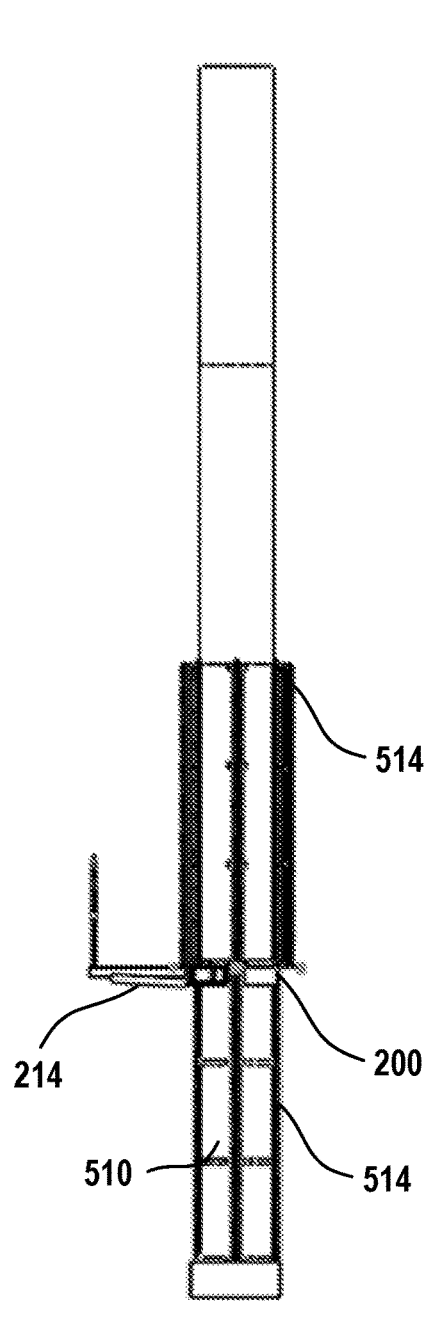

FIGS. 37-38 depict side views of a refurbishment of an existing tower for a wind turbine assembly, according to one or more aspects described herein.

Figure 39:
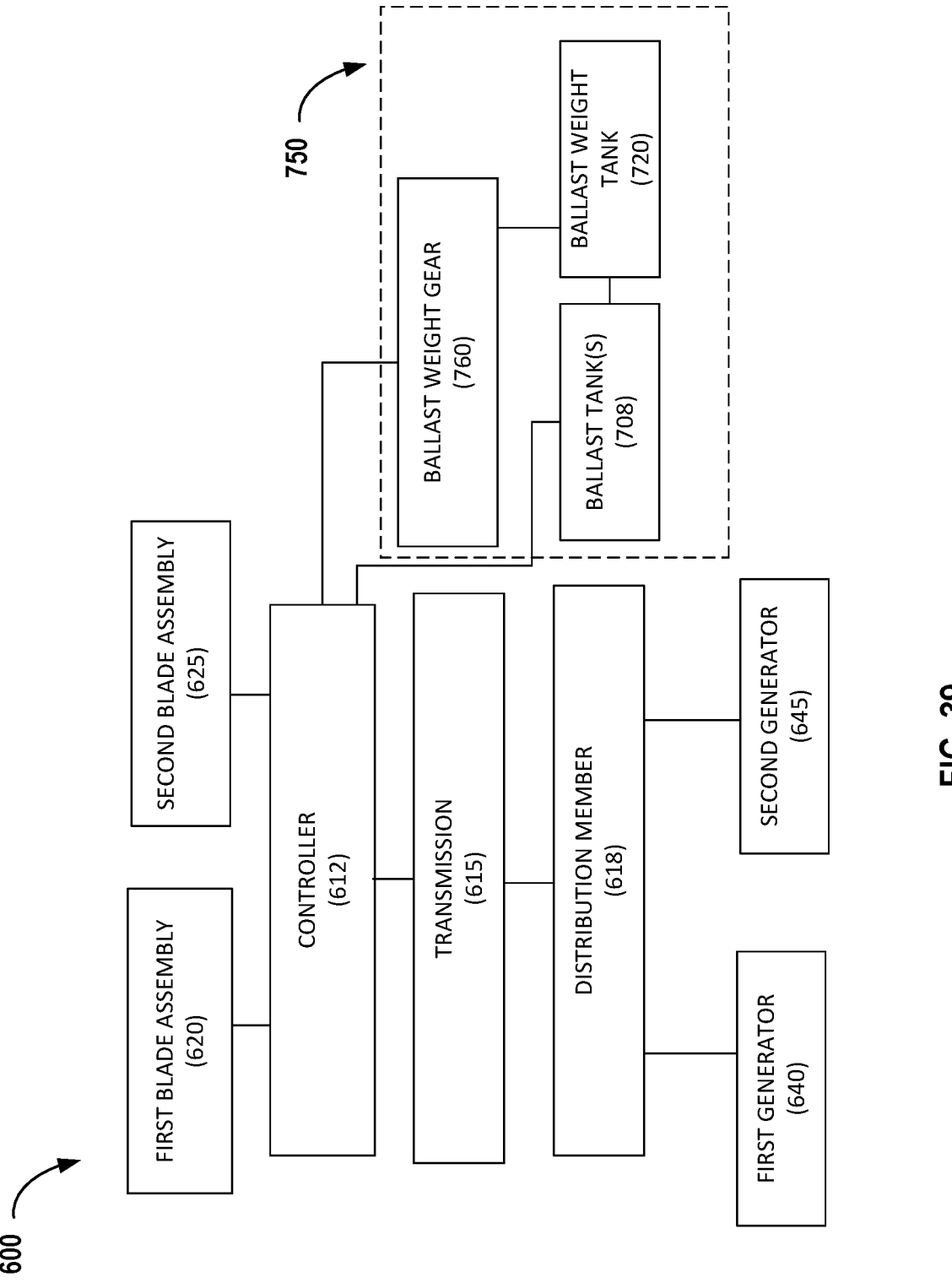

FIG. 39 depicts a schematic view of an alternative exemplary wind turbine assembly in an offshore environment, according to one or more aspects described herein.

Figure 40:
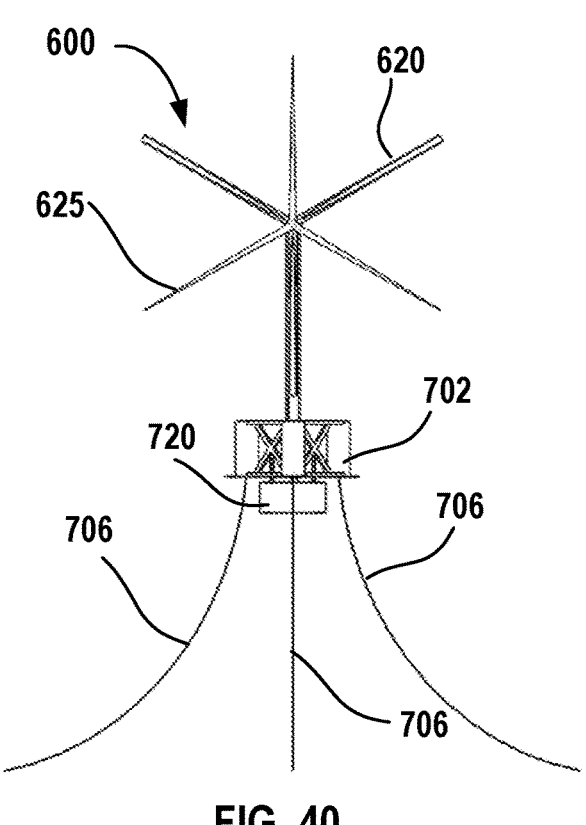

FIG. 40 depicts a front view of an alternate exemplary wind turbine assembly of FIG. 39, according to one or more aspects described herein.

Figure 41:
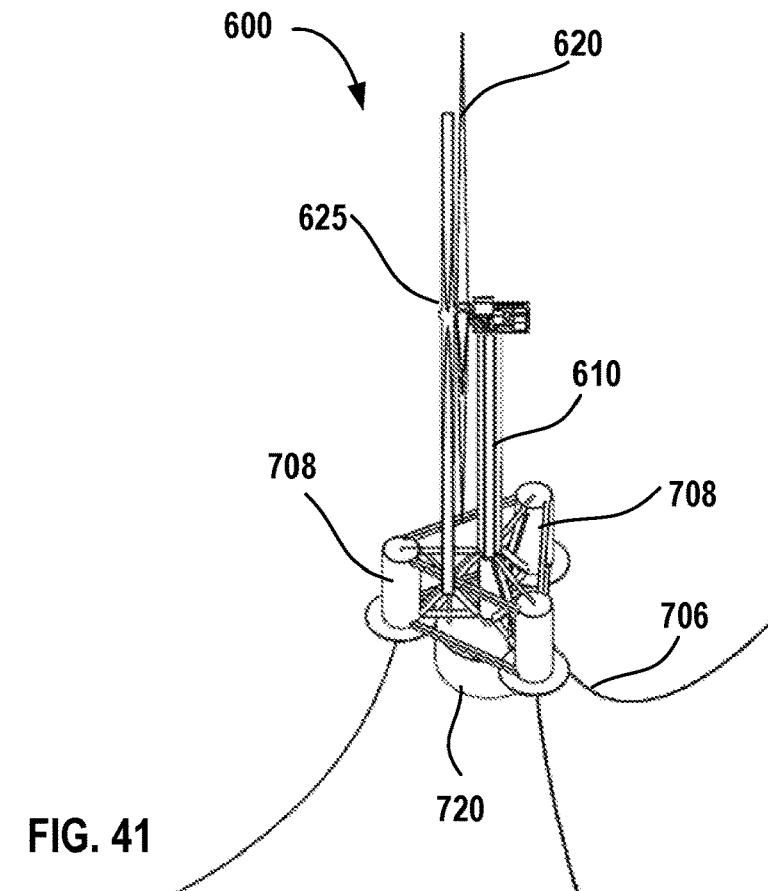

FIG. 41 depicts a side perspective view of the wind turbine assembly of FIG. 39, according to one or more aspects described herein.

Figure 42:
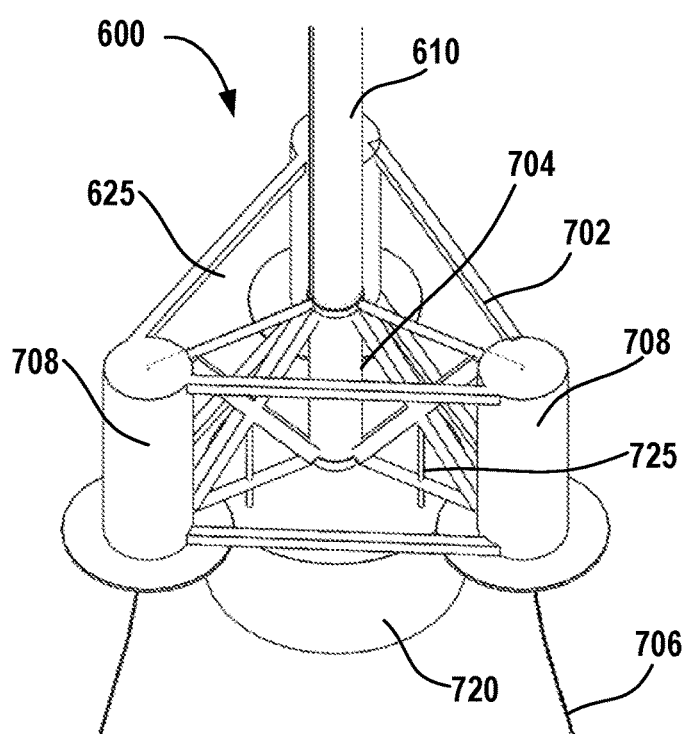

FIG. 42 depicts a perspective view of a portion of the wind turbine assembly of FIG. 39, according to one or more aspects described herein.

Figure 43:
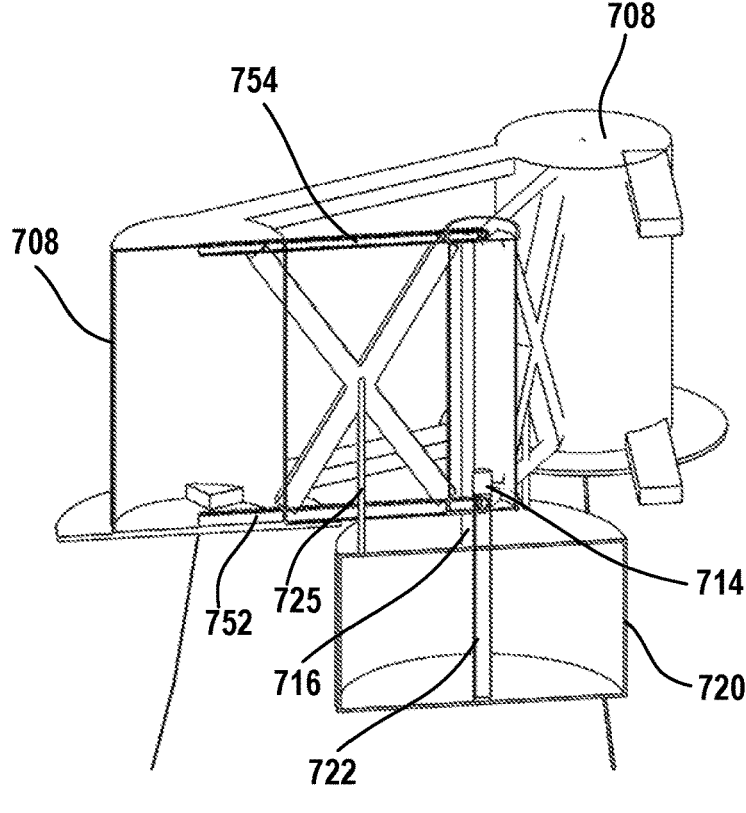

FIG. 43 depicts a perspective cross-sectional view of a portion of the wind turbine assembly of FIG. 39.

Figure 44:
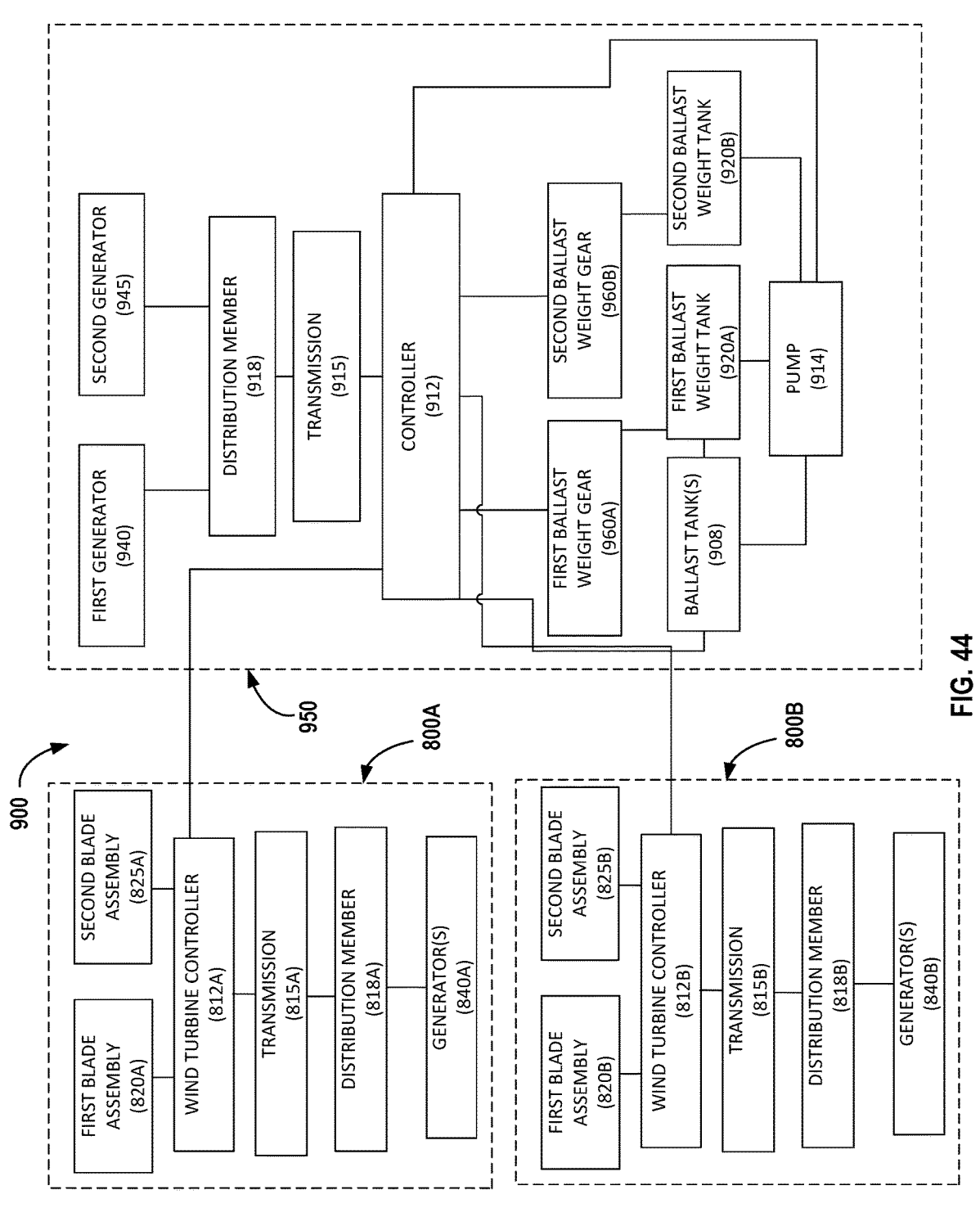

FIG. 44 depicts a schematic view of an alternative exemplary wind turbine assembly in an offshore environment, according to one or more aspects described herein.

Figure 45:
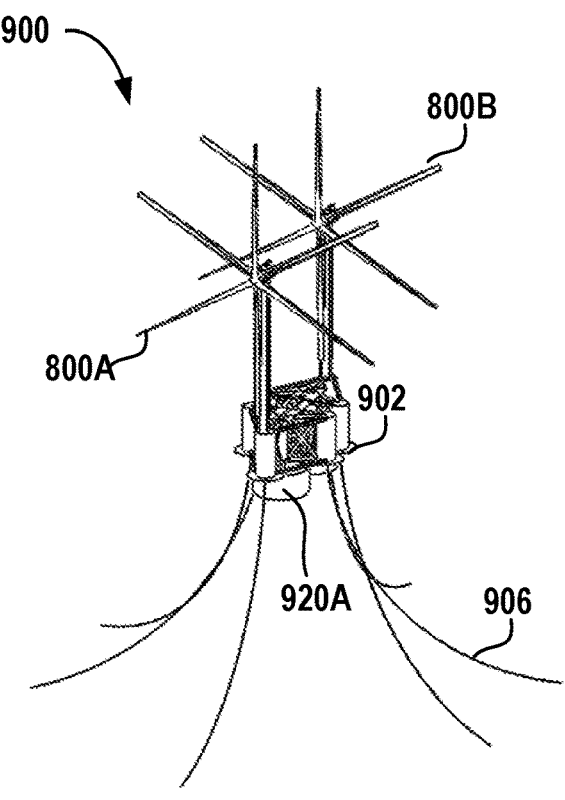

FIG. 45 depicts a perspective view of the wind turbine assembly of FIG. 44, according to one or more aspects described herein.

Figure 46:
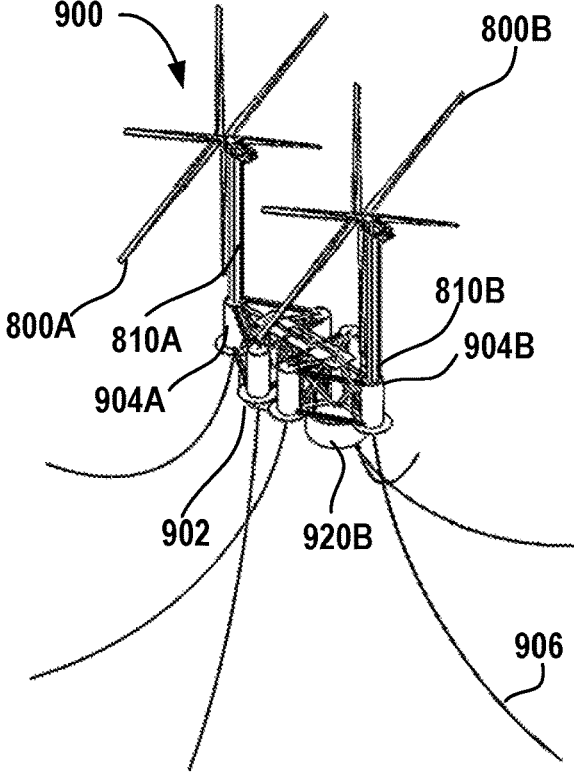

FIG. 46 depicts a perspective view of the wind turbine assembly of FIG. 44, according to one or more aspects described herein.

Figures 47, 48:
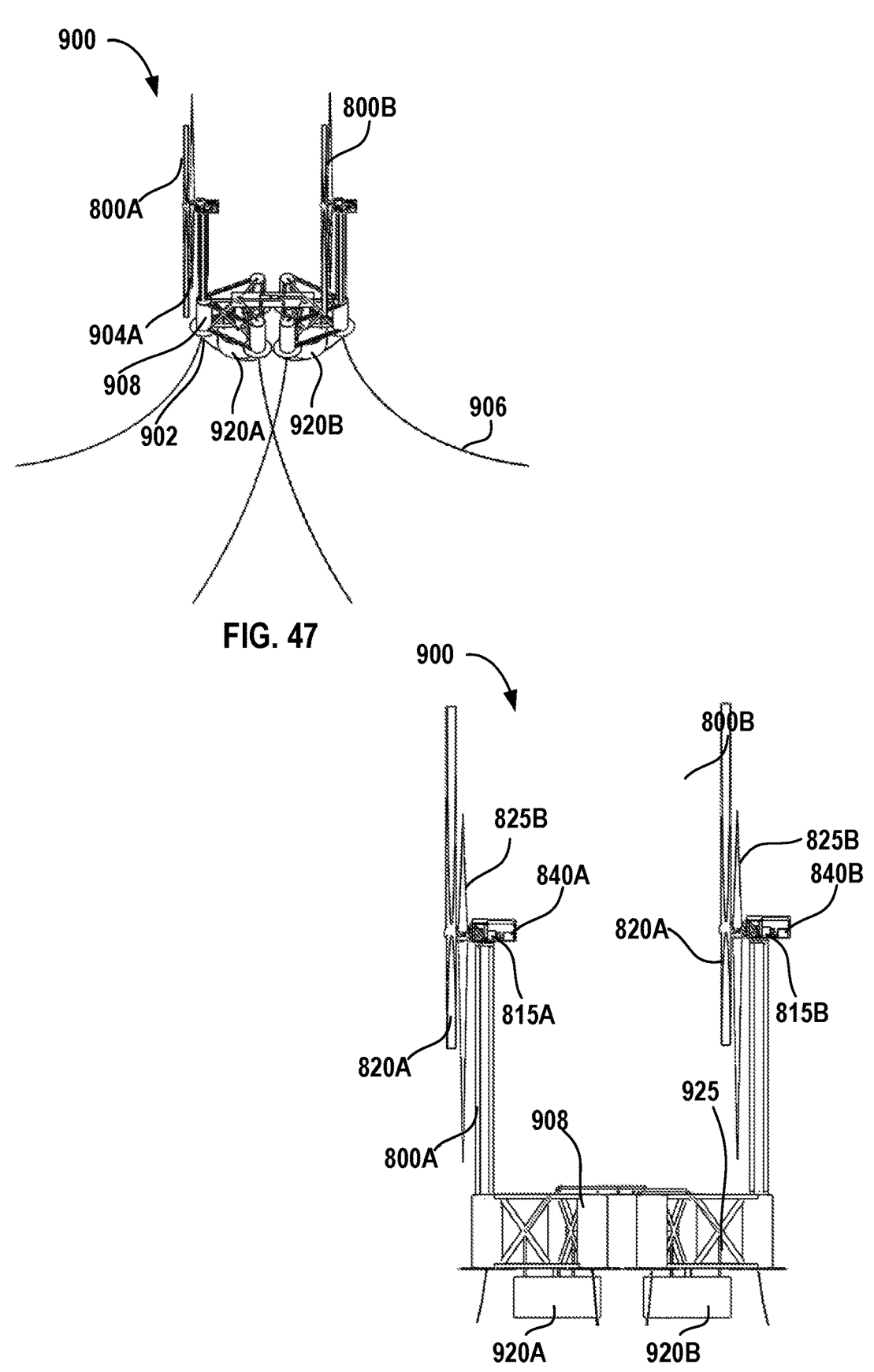

FIG. 47 depicts a perspective view of the wind turbine assembly of FIG. 44, according to one or more aspects described herein.

FIG. 48 depicts a side view of the wind turbine assembly of FIG. 44, according to one or more aspects described herein.

Figures 49, 50:
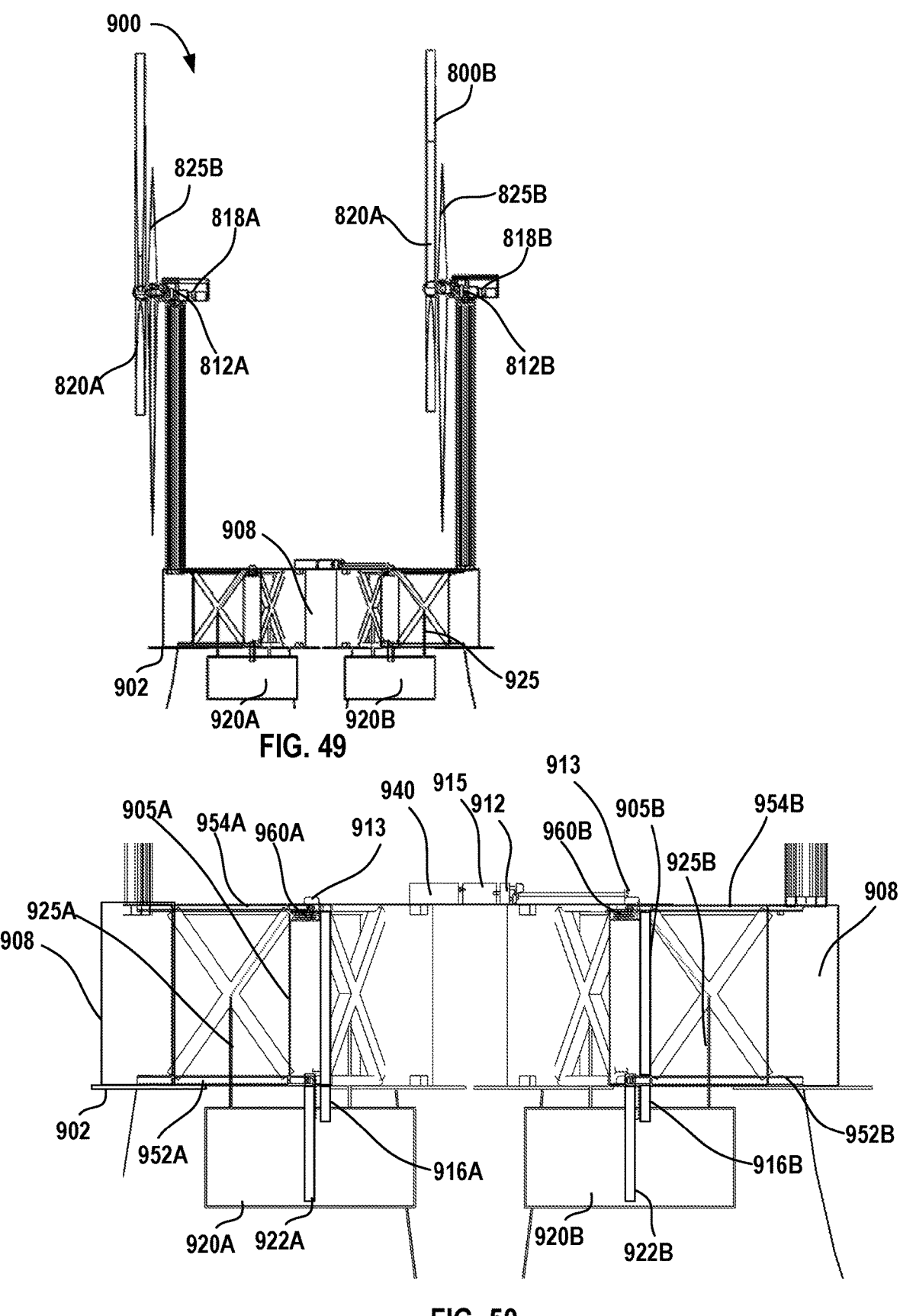

FIG. 49 depicts a side cross-sectional view of the wind turbine assembly of FIG. 44, according to one or more aspects described herein.

FIG. 50 depicts an enlarged side cross-sectional view of FIG. 49, according to one or more aspects described herein.

Figure 51:
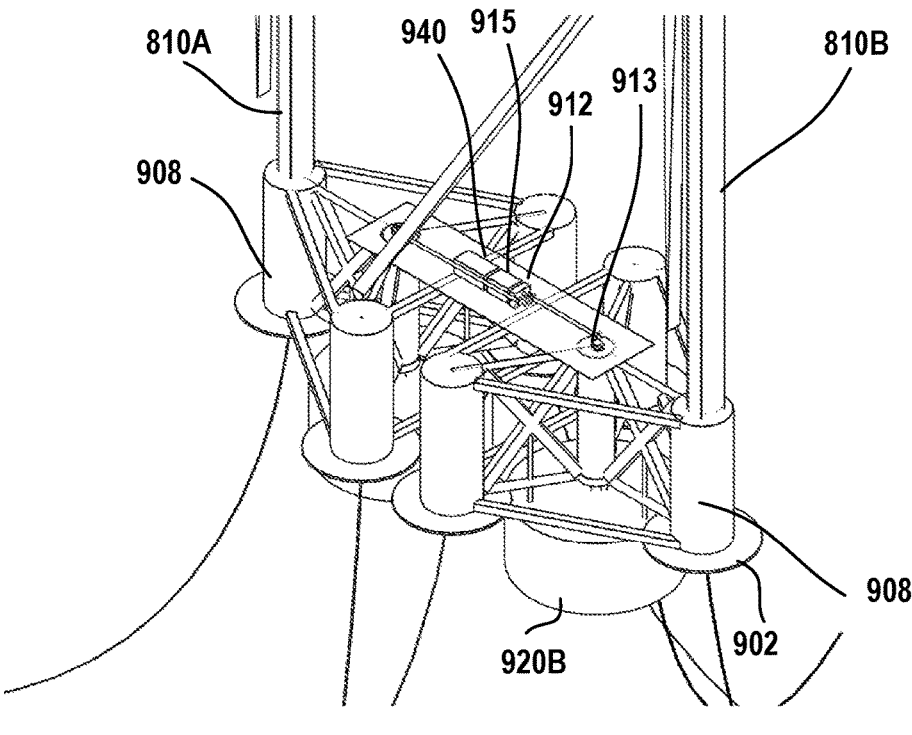

FIG. 51 depicts a partial perspective view of the wind turbine assembly of FIG. 44, according to one or more aspects described herein.

Figure 52:
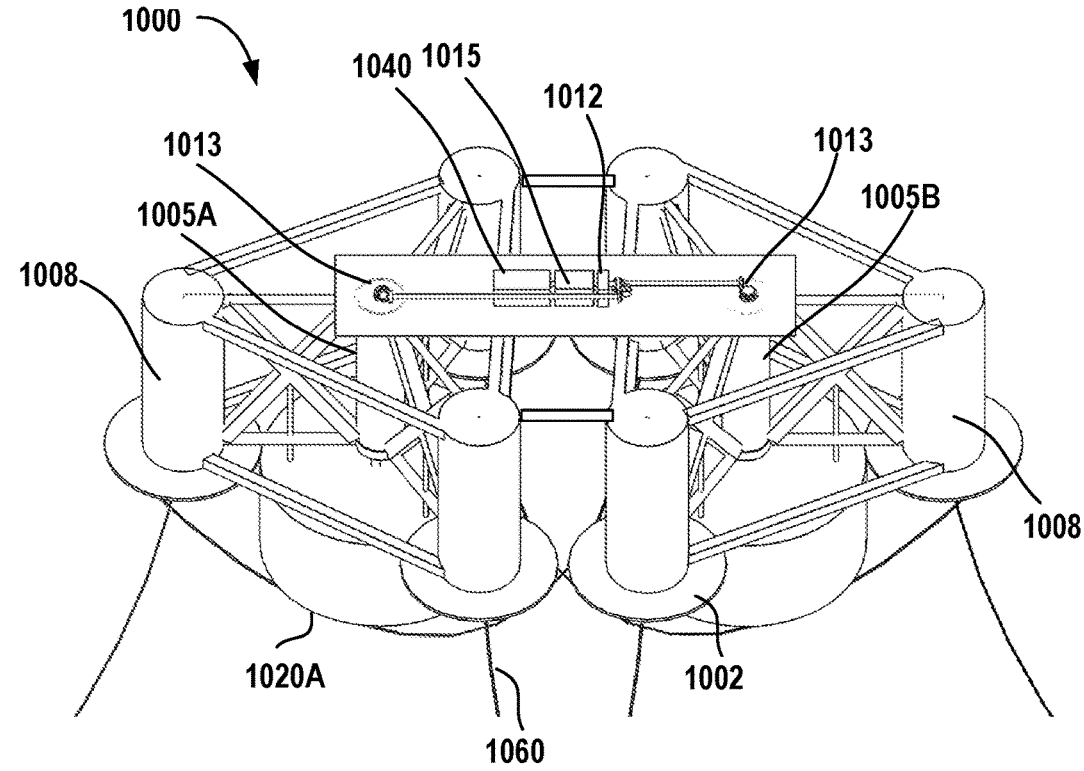

FIG. 52 depicts a perspective view of an alternate energy producing system, according to one or more aspects described herein.

Figure 53:
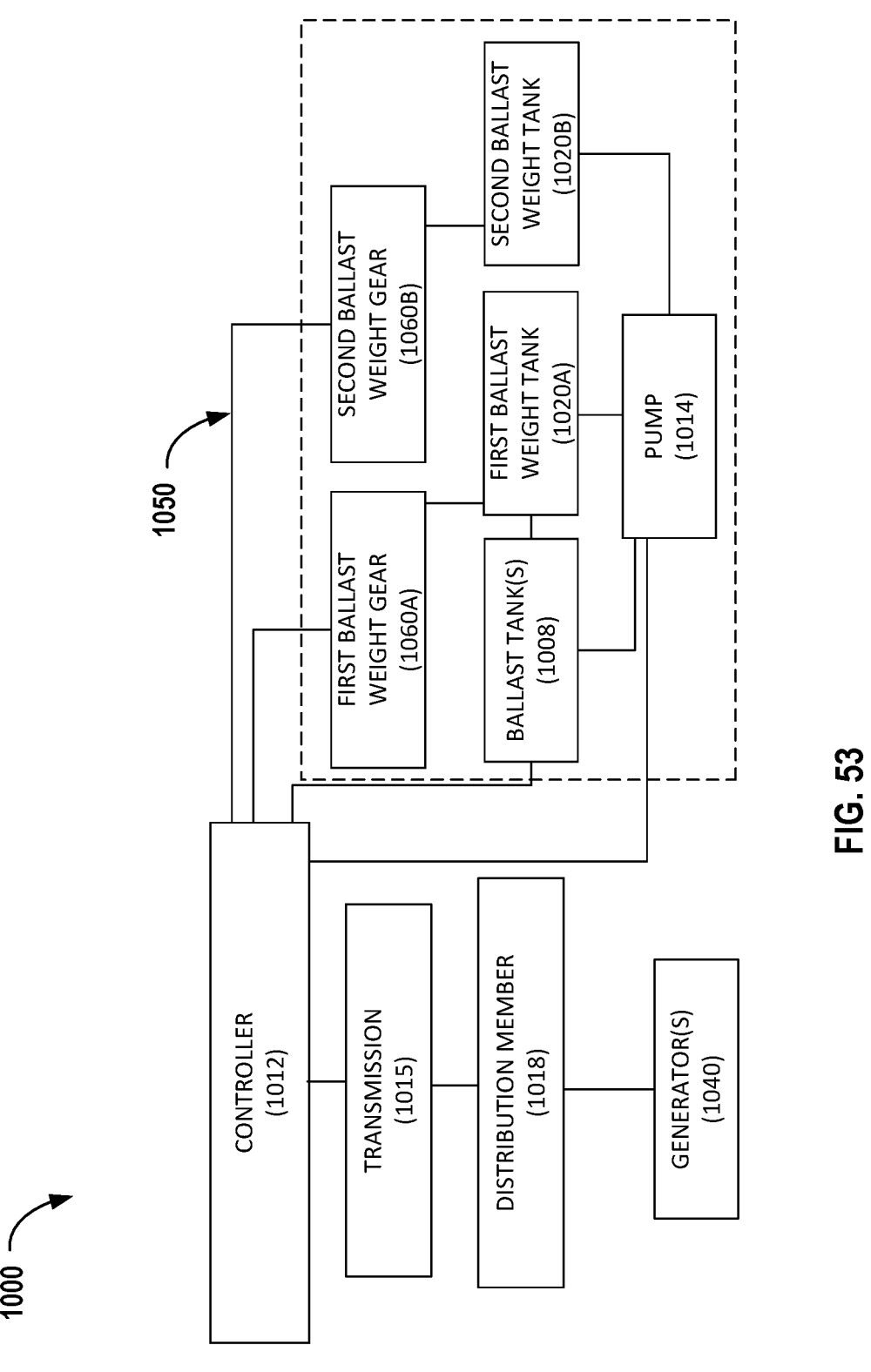

FIG. 53 depicts a schematic view of an alternative exemplary wind turbine assembly in an offshore environment, according to one or more aspects described herein.

Further, it is to be understood that the drawings may represent the scale of different components of various examples: however, the disclosed examples are not limited to that particular scale. Further, the drawings should not be interpreted as requiring a certain scale unless otherwise stated.

DETAILED DESCRIPTION

In the following description of the various examples and components of this disclosure, reference is made to the accompanying drawings, which form a part hereof, and in which are shown by way of illustration various example structures and environments in which aspects of the disclosure may be practiced. It is to be understood that other structures and environments may be utilized and that structural and functional modifications may be made from the specifically described structures and methods without departing from the scope of the present disclosure.

Also, while the terms "top," "base," "bottom," "side," and the like may be used in this specification to describe various example features and elements, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of the claims.

The term "substantially aligned" as used herein may be defined as two items (i.e., edges, surfaces, or centerlines) being within a range of +/−2 degrees of each other. In addition, the term "substantially parallel" as used herein may be defined as two items (i.e., edges, surfaces, or centerlines) being within a range of +/−5 degrees of each other.

The term "connected" as used herein may be defined to encompass components being directly connected where the components contact each other and also encompass components being indirectly connected where the components are connected through one or more intermediary components.

This disclosure generally relates to wind turbine assemblies with a system to store potential energy within the wind turbine assembly and also a method of assembling wind turbine assemblies or performing maintenance or refurbishment of wind turbine assemblies.

As illustrated in FIGS. 1-14, the wind turbine assembly 100 may include a tower section 110 or a plurality of tower sections, a first blade assembly 120, a second blade assembly 125, a first generator 140 connected to the first blade assembly 120, a second generator 145 connected to the second blade assembly 125, a head platform 130 that supports the first generator 140 and the second generator 145. The wind turbine assembly 100 may also include a falling weight system 150 to store potential energy and to provide electrical energy at times when the wind alone does not generate the desired power from the generators 140, 145. In some examples, the falling weight system 150 may help to improve the efficiency of the of the energy created by the wind turbine 100 by supplementing the energy generated by the movement of the blade assemblies 120, 125. The head platform 130 may be rotationally connected to the tower section 110, such that the head platform 130 can rotate 360 degrees around the tower section 110. As shown best in FIG. 7, one or more contact rings 109 may be positioned between the head platform 130 and the uppermost tower section 110. The contact rings 109 may conduct electricity between the generators 140, 145 and the transmission lines the transmit the electricity generated by the generators 140, 145 to the power grid. The contact rings 109 may be arranged with at least one contact ring on a bottom of the head platform 130 and at least one contact ring on the tower section 110 to provide electrical contact between the head platform 130 and the tower section 110 to allow the head platform 130 to rotate 360 degrees relative to the tower section 110. The two blade assemblies 120, 125 may be arranged to contra-rotate (i.e. rotate in opposite directions) relative to each other.

FIG. 5 illustrates a schematic of the wind turbine assembly 100 of the illustrated wind turbine assembly 100. The wind turbine assembly 100 may include a controller 112 to control the operation of the wind turbine assembly 100. The controller 112 may control all aspects of the power generation created by wind turbine assembly 100 such as the operation of the blade assemblies 120, 125, the falling weight system 150, the input to the transmission 115, as well as receiving and communicating information about the operation of the wind turbine assembly 100 to any outside entity. The controller 112 may be connected to both blade assemblies 120, 125, both generators 140, 145, and the transmission 115. In particular, the blade assemblies 120, 125 may be connected via a driveshaft to the controller 112. The controller 112 connect via a set of controller gears 119$a$, 119$b$ to the falling weight gears 160, 180 of the falling weight system 150 and also via a driveshaft to the transmission 115. The transmission 115 may then connect to a distribution member 118. The distribution member 118 may provide the power to operate the generators 140, 145. In the illustrated example, the distribution member 118 has a single input from the transmission 115 and two outputs, where each output connects to drive one of the generators 140, 145. However, it is contemplated that the distribution member 118 may have an equal number or outputs as generators used on the wind turbine assembly 100. As an example, the distribution member 118 may have three outputs to operate three generators. Alternatively, if the wind turbine 100 has only a single generator, the distribution member 118 may be removed with the transmission 115 directly providing power (i.e. provide rotational energy to the generator) to operate the generator. The controller gears 119A, 119B may act to engage the falling weight gears 160, 180 respectively which connect to the first and second weights 170, 190. When the weights 170, 190 are falling, the falling weight gears 160, 180 rotate and drive the controller gears 119A and or 119B depending upon which weight 170, 190 (or both weights) are falling. The controller 112 may include a clutch system that can allow the controller 112 to disengage or engage the controller gears 119A, 119B connected to the falling weight gears 160, 180 or to disengage or engage the driveshaft(s) from the blade assemblies 120 125. The first falling weight gear 160 and the second falling weight gear 180 may be located in an upper portion of the tower section 110. While the illustrated wind turbine assembly 100 depicts two blade assemblies 120, 125, a pair of generators 140, 145, and a pair of falling weights 170, 190, the invention is not limited to this embodiment. The wind turbine assembly 100 may have only a single blade assembly, a single generator, and a single falling weight or may have more than 2 generators or falling weights. It is contemplated that the arrangement of blade assemblies, generators, and falling weights may be increased or decreased from the illustrated examples.

The falling weight system 150 may operate to store potential energy by using the energy from one or both of the blade assemblies 120, 125 to raise one or both of the weights 170, 190. As shown in FIGS. 9 and 10, the falling weight system 150 may include a first falling weight gear 160 connected to a first weight 170 via a first cable or first set of connection members 175, which may be cables, chains, or other flexible support member known to one skilled in the art, that wind and unwind around a base portion 162 of the first falling weight gear 160. The falling weight system 150 may also include a second falling weight gear 180 connected to the second generator 145, where the second falling weight gear 180 is connected to a second weight 190 via a second connection member 195 (or a first set of connection members) that winds and unwinds around a base portion 182 of the second falling weight gear 180. The connection members 175, 195 may be frictionally engaged within the grooves on the corresponding base portion 162, 182 of the falling weight gears 160, 180 such that as the connection members 175, 195 unwind, the movement of the connection members 175, 195 cause falling weight gears 160, 180 to rotate.

FIG. 8 illustrates a flowchart for a control system 101 of the wind turbine assembly 100 to control the power output of the wind turbine assembly 100 and the falling weight system 150. The controller 112 may receive information regarding the power output created by the generators 140, 145 (102). The controller 112 may compare the power output to a predetermined threshold power level (103). The predetermined threshold power level may change depending upon the requirements of the power grid. In addition, the power output of the wind turbine assembly 100 may fall below the predetermined threshold limit for a variety of reasons such as a lack of sufficient wind to turn the blade assemblies to produce the required power, a maximum power requirement from the power grid due to consumer demand, or another event known to one skilled in the art. The falling weight system 150 may allow for the wind turbine assembly 100 to be able to produce energy in low wind conditions or to increase power capacity during peak demand times. If the controller 112 determines that the power output is below the predetermined power threshold level, the controller 112 may then determine the position of the weights 170, 190 (i.e. are the weights 170, 190 in a raised or lowered state) (105). If one or both of the weights 170, 190 are in a raised state (i.e. stored potential energy), the controller 112 may instruct the release of the first weight 170 and/or the release of the second weight 190 (106). As one or both of the weights 170, 190 are lowered down inside the tower section 110, the corresponding gear 160, 180 is rotated, which in turn adds additional power through the controller gear(s) 119A, 119B to supplement the power input to the controller 112 which can add additional power to the transmission 115 and subsequently to the corresponding generator(s) 140, 145 to generate additional electricity such that the power output reaches the predetermined power threshold level. If the controller 112 determines the weights 170, 190 are in a lowered state, the controller 112 may determine to pull power from the power grid to raise the first and second weights 170, 190 (107). If the controller 112 determines pulling power is necessary to pull from the power grid, the controller 112 may communicate with the power grid to determine the proper time to pull power from the power grid (i.e. off-peak demand times). If the controller 112 determines the power output is above the predetermined power threshold level, the controller 112 may instruct the first falling weight gear 160 and/or the second falling weight gear 180 to raise the first weight 170 and/or the second falling weight 190 to hold the weights 170, 190 in a raised state to store as potential energy for future use (108).

The controller 112 may be utilized to process data received from the various components of the wind turbine assembly 100. The controller 112 may include a plurality of gears (such as, but not limited to controller gears 119A, 119B), a clutch system, one or more driveshafts and a processor along with sensors that monitor the overall operation of the wind turbine 100. The processor may be a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. The controller 112 may be used to implement various aspects and features described herein. As such, the controller 112 may be configured to perform any desired operation on the data it receives. Further, it will be appreciated that the controller 112 may execute multiple calculations, in parallel or serial, at a very high throughput frequency using the received data. The controller 112 may include a processing unit and system memory to store and execute software instructions.

FIGS. 10-11 illustrate a portion of the falling weight system 150 with several components of the wind turbine assembly 100 removed for clarity. The first falling weight gear 160 may include a base portion 162, an engagement portion 164 that include the gear teeth may be located above the base portion 162, and a central opening 166. Similarly, second falling weight gear 180 may include a base portion 182, an engagement portion 184 that include the gear teeth may be located above the base portion 182, and a central opening 186. As shown in FIG. 10, the first falling weight gear 160 may be located within a central opening 186 of the second falling weight gear 180, such that the second falling weight gear 180 is nested within the first falling weight gear 160. The base portion 162 of the first falling weight gear 160 may include a plurality of grooves 168 that receive the connection member(s) 175 that support the first weight 170. Similarly, the base portion 182 of the second falling weight gear 180 may include a plurality of grooves 188 that receive the connection member(s) 195 that support the second weight 190. The base portion 162 of the first falling weight gear 160 may extend below the base portion 182 of the second weight gear 180. In addition, the first falling weight gear 160 may have a smaller diameter than the second falling weight gear 180, as such the connection members 175, 195 that connect to the first weight 170 and the second weight 190 respectively may have similar lengths. In some examples, the diameter of the second falling weight gear 180 may be within a range of 50 and 90 percent of a diameter of the tower section 110. For example, the connection members 175, 195 may have substantially the same length and be sized to a predetermined length, where the predetermined length may extend a majority of the overall height of the tower section 110 of the wind turbine assembly 100. In some instances, the predetermined length may be within a range of 50 percent and 95 percent of an overall height of the tower section 110. The engaging portions 164, 184 of both falling weight gears 160, 180 may be bevel gears that engage the engaging portions of the controller gears 119A, 119B.

Additionally, FIGS. 12-14 illustrate a set of guide shafts 176 may extend the height of the tower and may extend through openings in the weights 170, 190 to ensure their movement is controlled as they are raised and lowered inside the tower section 110. For example, the first weight 170 may be slidably engaged with a first guide shaft 176, and the second weight 190 may be slidably engaged with a second guide shaft 196. In some instances, each weight 170, 190 may be slidably engaged with multiple guide shafts 176, 196. These guide shafts 176 may help to keep the vertical movement of the first and second weights 170, 190 controlled as each weight 170, 190 may have a weight of 500,000 pounds (lbs.), or within a range of 200,000 pounds and 700,000 pounds, or within a range of 50,000 pounds and 700,000 pounds. In other examples, the weights 170, 190 may have a weight of approximately 60,000 pounds, which when joined to a transmission 115 with a 170:1 gear ratio may produce approximately 350 foot*pounds of torque at a rate of 20 rpm to produce approximately 24,000 KW for a period of 2-6 hours depending on the height of the tower section(s) 110 for each 60,000 pound weight 170, 190. The power output may vary depending on the weight of the falling weights 170, 190, the height of the tower section(s) 110, and the gear ratio of the controller gears 119A, 119B, the transmission 115, and the falling weight gears 160, 180 among other features. In addition, a plurality of support rods may also extend inside the tower section 110 to help support a spindle assembly 198 that helps to support the first and second falling weight gears 160, 180. Each falling weight gear 160, 180 may have a designated spindle as part of the spindle assembly 198 such that each falling weight gear 160, 180 may turn independently necessary. In addition, the amount of potential energy stored in the falling weight system 150 may depend upon the mass of each weight 170, 190, the rate at which the weights 170, 190 fall, and the overall height they are allowed to fall within the tower section 110. For example, each weight 170, 190 may be configured when falling to fall at a rate of approximately 0.25 inches per minute and may fall for as much as 5 days and provide enough energy to keep a generator 140, 145 producing electricity for 5 days. Thus, with both weights 170, 190 falling, they may produce enough energy to keep the generators 140, 145 producing electricity for as much as 10 days. The connection members 175, 195 may be steel cables, chains, or other flexible support member that has the necessary strength to support the weights 170, 190.

FIG. 15 illustrates a method 400 for constructing an exemplary wind turbine assembly 300 as shown in FIGS. 17-37 and described in more detail below. The wind turbine assembly 300 may be similarly configured as wind turbine assembly 100 and include elements such as one or more blade assemblies 120, 125, a controller 112, a transmission 115, a distribution member 118, one or more generators 340, 345, and a falling weight system 150 discussed above. Wind turbine assembly 300 may be self-erecting, such that the wind turbine assembly 300 may utilize an assembly ring 200 to enable the construction of the tower and installation of the wind turbine without the use of a separate crane or other similar construction equipment.

FIGS. 16A-E illustrate an exemplary assembly ring 200 of the wind turbine assembly 300 that is able to lift tower sections 310 as well as other components of the wind turbine assembly 300. The assembly ring 200 may have a frame member 210, where the frame member 210 may be ring-shaped and have at least two sub-frame members to enable a tower section 310 of the wind turbine assembly 300 to be received within a central opening 212 of the frame member 210. In some examples, the frame member 210 may comprise four sub-frame members that each comprise a semi-circular member. For instance, the sub-frame members may have an interior that has an arcuate shape. When assembled, the frame member 210 may include a central opening 212 that is sized to receive or surround a tower section 310. In addition, the assembly ring 200 may further include a slide out support platform 214 that extends and retracts from the frame member 210. A pivot cradle 216 may be connected to and extend vertically from the slide out support platform 214. The pivot cradle 216 may help to support and guide new components as they are being lifted into the correct location and assembled onto the wind turbine assembly 300. In some instances, the pivot cradle 216 can also be used for servicing the wind turbine assembly 300. The support plat-form 214 may also be pivotally engaged with the frame member 210 to enable the support platform 214 to rotate components from a horizontal orientation to a vertical orientation. Additionally, the pivot cradle 216 may comprise an extension 218 that may be pivotally engaged with the support platform 214 and a pivot member 220 that may be pivotally connected to the extension 218. The pivot member

220 may be ring shaped and may have a portion of the pivot member 220 that may extend and retract into half of the pivot member 220. The pivot member 220 may be sized to have an inner diameter that is sized to surround a tower section 110. Optionally, the pivot member 220 may have any geometric shape with an opening that is large enough to extend around a majority of the tower section 110. The support platform 214 and pivot cradle 216 may be config-ured with a plurality of anchoring points and equipment, such as cables, chains, winches, and the like to secure the various components temporarily to the support platform 214 and pivot cradle 216 to allow the assembly ring 200 to be able to lift the components into their appropriate locations. The assembly ring 200 may also include areas for workers to access the components being lifted to be able to secure and finalize assembly of the components of the wind turbine assembly 300 as needed. FIG. 16E illustrates the assembly ring 200 in a partially disassembled state, which enables the assembly ring 200 to be transported to the location for the wind turbine assembly 300 via a delivery vehicle.

The assembly ring 200 may also include one or more climbing gears 222 that are arranged along an interior of the central opening 212. These climbing gears 222 may engage a rail or plurality of rails 314 that may be arranged along or connected to an outer surface of the tower sections 310. FIGS. 16C-16D illustrate simplified views of the assembly ring 200 and the climbing gears 222 engaging the rails 314. The rails 314 may be arranged on each tower section 310 and are substantially aligned (i.e. substantially collinear) with each other such that when the tower sections 310 are connected to each other the assembly ring 200 may raise and lower itself using the climbing gears 222 of the assembly ring 200. As shown in FIG. 16C, the climbing gears 222 may comprise a set of gears to engage each rail 314 on opposite sides. While FIG. 16C illustrates a set of climbing gears 222, the reader is advised that the exemplary assembly ring 200 includes 4 sets of climbing gears 222 arranged 90 degrees apart. Although, the assembly ring 200 is not limited to 4 sets of climbing gears 222. Each rail 314 may have a set of teeth 316 on opposite sides of each rail 314. Each set of climbing gears 222 may be connected to a hydraulic motor 224 and a central shaft that engages torque converter 226 that connect to and drive each climbing gear 222. The torque converter 226 may be one or more gears to produce the correct torque for each climbing gear 222 to adequately raise and lower the assembly ring 200. In some cases, the torque converter 226 may have a 20:1 gear ratio from the hydraulic motor 224. A set of guide roller 228 may help align the climbing gears 222 with the rail 314. The guide rollers 228 may engage the guides 319 located on an outer edge of the teeth 316 to help keep the climbing gears 222 in the proper position. As shown in FIG. 16A, the plurality of climbing gears may comprise 4 pairs of gears arranged approximately 90 degrees apart from each other along an interior of the central opening 212 of the assembly ring 200. In still other examples, the climbing gears 222 may comprise greater than 4 pairs or less than 4 pair. Each climbing gear 222 may be configured to engage the teeth 316 arranged on each side of a rail 314 that is located along the tower section 310 to enable the assembly ring 200 to climb up and down the tower sections 310. As best shown in FIG. 16D, each set of climbing gears 222 may be supported by a plurality of support beams 230. The support beams 230 may extend into the central opening 212 and may be adjustable such that the support beams 230 may extend and retract into the central opening 212 to ensure that the climbing gears 222 can engage different diameter tower sections 310 (i.e. to accommodate different sized tower sections 310 and also accommodate a tapered tower section 310 that may have a decreased diameter as the tower section 310 increases in height). In some examples, each polarity of 4 climbing gears 222 may have an approximate climbing force of 1.6 million pounds.

The assembly ring 200 may also include a diesel motor and a hydraulic pump to power a plurality of hydraulic motors that supply power to the support platform 214, pivot cradle 216, and to the climbing gears 222. In some examples, the plurality of hydraulic motors each may have a torque of approximately 20,000 foot*pounds. Additionally, each hydraulic motor may be connected to a torque converter to further increase the torque that can be applied by the hydraulic motors.

Method 400 as described in FIG. 15 discloses a method for assembling a wind turbine assembly 300 using an assembly ring 200. The first step may be to place an assembly ring 200 onto a base platform 302 of the wind turbine assembly 300 as shown in FIG. 17 (410). Next, the assembly ring 200 may lift a base tower section 310A onto the base platform 302 as shown in FIGS. 17-19 (420). During this step, the pivot cradle 216 of the assembly ring 200 may engage the base tower section 310A and then rotate the base tower section 310A from a horizontal orientation (e.g. such as laying on the ground or on a delivery vehicle). The base tower section 310A is rotated and then moved into place by the assembly ring 200 and then lowered to the base platform 302, where the base tower section 310A is received within the central opening 212 of the assembly ring 200. Once the base tower section 310A is in the correct location, the base tower section 310A may be secured to the base platform 302 (430). Each tower section 310 may comprise a tower body 311 that is substantially cylindrical, and a rail 314 that is configured with gear teeth 316 or similar engaging members to engage with a complementary gear teeth or engaging members of the climbing gears 222 of the assembly ring 200. In some examples, the rails 314 may be removably attached to each tower section 310, using mechanical fasteners or other means known to one skilled in the art. The rails 314 may be located approximately 90 degrees apart along an exterior surface of each tower section 310 to correspond with the locations of the climbing gears 222 of the assembly ring 200.

Depending on the desired height of the wind turbine assembly 300, the wind turbine assembly 300 may include a plurality of tower sections 310 that are stacked on top of each other. For example, after the base tower section 310A is secured to the base platform 302, an additional tower section 310B may be lifted and moved into position in a similar manner as the base tower section 310A using the assembly ring 200. The assembly ring 200 may engage a second tower section 310B from a delivery vehicle, then rotate the tower section 310B from a horizontal orientation to a vertical orientation. Once in the vertical orientation, the assembly ring 200 may climb the base tower section 310A using the climbing gears 222 that engage the rails 314 positioned along the external surface of the base tower section 310A as shown in FIGS. 19-21. Once the second tower section 310B is in the correct location, the second tower section 310B is aligned with and secured to the base tower section 310A as shown in FIG. 22 (440). The assembly ring 200 may use its climbing gears 222 to engage the corresponding rails 314A on the base tower section 310A when climbing up or down the base tower section 310A and also engage the corresponding rails 314B when climbing up or down the second tower section 310B. If the wind turbine assembly 300 includes the falling weight system 150, the assembly ring 200 may lift and install the guide rails 175, 195 and falling weights 170, 190 and install them into the first tower section 310A prior to installing a second tower section 310B. (445) In addition, the assembly ring 200 may be used to lift the falling weight gears 160, 180 and the spindle assembly 198 into their appropriate location prior to the installation of the head platform 330. Depending upon the desired height of the stacked tower section, this process of the assembly ring 200 engaging, rotating, and lifting additional tower sections 310 may be repeated until the tower sections 310 are stacked to the desired height (450). For example, in FIGS. 23 and 24, an additional tower section 310C is assembled onto the previously assembled tower sections 310A, 310B.

Once the stacked tower sections 310 are assembled to the desired height, the assembly ring 200 may then be used to engage and lift a head platform 330 to a top of an uppermost tower section 310 as shown in FIGS. 25 and 26. The head platform 330 may be secured to uppermost tower section 310, where the head platform 330 may be rotationally connected to the uppermost tower section 310 (460). The head platform 330 may be electrically connected using contact rings 109 as described above for wind turbine assembly 100 to allow the head platform 330 to rotate 360 degrees around the stacked tower sections 310. The head platform 330 may include one or more generators 340, 345, a controller, a transmission, and a distribution member. Once the head platform 330 is secured, the assembly ring 200 may lift the blade assemblies 320, 325 to complete the wind turbine assembly 300 (470,480). As shown in FIG. 27, the assembly ring 200 may lift a blade mount 322 to be assembled and secured to the generators 340, 345. Next, the blade assemblies 320, 325 may be lifted using the assembly ring 200 and then mounted into place as shown in FIGS. 27-35. FIGS. 33-34 illustrate perspective views of the assembly ring 200 holding as the blade assembly 325 being secured to the generators 340, 345. As shown in FIGS. 27-32, each blade assembly 320, 325 may be lifted into position while in a horizontal orientation using the assembly ring 200. FIG. 33 illustrates the outer blade assembly 325 in a lifted position and ready to be rotated and installed into the final position. The support platform 214 may support the blade assembly 325 as it being lifted while the pivot cradle 216 may be pivoted down and secured to the connection section 326 of the blade assembly 325. In some examples, the head platform 330 may include a lift crane 332 that can be connected to pivot cradle 216 via cabling, chains, or other means known to one skilled in the art. The lift crane 332 may then be used to pull the pivot cradle 216 to a vertical orientation, which in turn lifts the blade assembly 325 into a vertical orientation so it can be secured into its final position. In some examples, the lift crane 332 may have an arm 334 such that the arm 334 can translate along the head platform 330 where the arm 334 may move toward or away from the blade assemblies 320, 325. The arm 334 may slidably move within an upper housing 336 of the head platform 330. As shown in FIG. 33, the arm 334 may be positioned over a hub 321 an inner blade assembly 320 when desired and then moved away from the blade assemblies 320, 325 when the wind turbine assembly 300 is in an operational mode. In some cases, the lift crane 332 may a lifting capacity of up to 240,000 pounds. FIG. 35 illustrates a perspective view of the wind turbine assembly 300 with both blade assemblies 320, 325 connected. When operational, the assembly ring 200 will be lowered out of the way to allow the blade assemblies 320, 325 to freely rotate. FIG.

36 illustrates the completed wind turbine assembly 300. As the blade assemblies 320, 325 rotate, they turn the generators 340, 345 to create electricity that is transmitted to a power grid. In some examples, wind turbine assembly 300 may include the falling weight system 150 described above. If the wind turbine assembly 300 includes the falling weight system 150, the guide rails 175, 195 may be lifted into place using the assembly ring 200 after installing the first tower section 310A (or the guide rails 175, 195 may be assembled in separate components such that the guide rails 175, 195 are assembled as the tower sections are stacked). In addition, the assembly ring 200 may lift the falling weights 170, 190 along with the falling weight gears 160, 180 into their appropriate location.

If desired, the assembly ring 200 may be removed from the assembled wind turbine assembly 300 and used to erect another wind turbine assembly 300. And if needed, the assembly ring 200 may be reinstalled onto the wind turbine assembly 300 if any maintenance is desired on the wind turbine assembly 300 as discussed in more detail below. In addition, the rails 314 may be removed from the tower sections 310 for use on another wind turbine assembly.

As another option, assembly ring 200 may be used for maintenance of existing wind turbine assemblies 500 to remove or service the blade assemblies, generators, or other components. As shown in FIGS. 37-38, to utilize the assembly ring 200, the rails 514 may be removably coupled to the exterior of the existing tower structure 510 of the wind turbine assembly 500. The assembly ring 200 is assembled around the existing tower structure 510. As described above, the climbing gears of the assembly ring 200 engage the rails 514 to allow the assembly ring 200 to climb up and down the tower structure 510. The rails 514 may be installed in sections, where once a lower section of rails 514 is installed, the assembly ring 200 may climb the lower section of rails 514 to allow a platform to install an upper section of rails 514.

FIGS. 39-43 illustrate exemplary wind turbine assembly 600 that is located in an offshore environment. The features are referred to using similar reference numerals under the "6xx" series of reference numerals, rather than "1xx" as used in the exemplary wind turbine assembly 100 shown in FIGS. 1-14. Accordingly, certain features of the wind turbine assembly 600 that were already described above with respect to wind turbine assembly 100 of FIGS. 1-14 may be described in lesser detail, or may not be described at all. The wind turbine 600 may be assembled similar to wind turbine 300 using an assembly ring 200 as described in method 400 except the base platform 302 may be a floating platform 702. The floating platform 702 may comprise a truss-like structure with a central mount 704 that engages and secures a tower 610. The floating platform 702 may be connected to multiple anchor lines 706 to help secure the floating platform 702 in a predetermined location.

As illustrated in the schematic of wind turbine 600 in FIG. 39, the wind turbine assembly 600 may include a controller 612 to control the operation of the wind turbine assembly 600. The controller 612 may control all aspects of the power generation created by wind turbine assembly 600 such as the operation of the blade assemblies 620, 625, the input to the transmission 615, as well as receiving and communicating information about the operation of the wind turbine assembly 600 to any outside entity. The controller 612 may be connected to both blade assemblies 620, 625, both generators 640, 645, a transmission 615, and a falling ballast weight system 750. In particular, the blade assemblies 620, 625 may be connected via a driveshaft to the controller 612.

The controller 612 may connect via a controller gear to a ballast weight gear 760 of the ballast weight system 750 and also via a driveshaft to the transmission 615. The transmission 615 may then connect to a distribution member 618. The distribution member 618 may provide the power to operate the generators 640, 645. In the illustrated example, the distribution member 618 has a single input from the transmission 615 and two outputs, where each output connects to drive one of the generators 640, 645. However, it is contemplated that the distribution member 618 may have an equal number or outputs as generators used on the wind turbine assembly 600.

The ballast weight system 750 may operate to store potential energy by using the energy from one or both of the blade assemblies 620, 625 to control the movement of air and water between one or more ballast tanks 708 to raise and lower a ballast weight tank 720. The raising and lowering of the ballast weight tank 720 may act to store potential energy in a similar manner to falling weight system 150 described above such that in times of minimal wind or peak demand, the ballast weight system 750 may provide supplemental power to drive the generators 640, 645. The ballast weight system 750 may utilize a ballast weight gear 760 that is arranged on a spindle in an upper portion of the tower 610. The ballast weight gear 760 may engage a gear from the controller 612 in a similar manner as the falling weight gears 160, 180 engage the controller 112 with respect to the wind turbine assembly 100 described above. The ballast weight gear 760 may include a base portion that has one or more connection members 725 wound around the base portion that connect to the ballast weight tank 720.

The ballast tank(s) 708 may be connected via a lower tank pipe(s) 752 and an upper tank pipe(s) 754 to the ballast weight tank 720. In addition, each ballast tank(s) 708 may be connected to each other using a lower tank pipe(s) 752 and an upper tank pipe(s) 754. In addition, the tank pipe(s) 752, 754 may fluidly connect to a vertically oriented ballast weight pipe 722 that extends downward into the ballast weight tank 720. The ballast weight pipe 722 may extend to within a predetermined distance from a bottom interior surface of the tank. In some examples, the predetermined distance may be a range of 2 to 5 inches from a bottom interior surface of the ballast weight tank 720 to prevent air from being extracted from the ballast weight tank 720. Additionally, a pump 714 may be connected to pump water between the ballast tank(s) 708 and the ballast weight tank 720 via the ballast weight pipe 722. The impeller pump 714 may also be used to pump water from the ballast weight tank 720 to the ballast tank(s) 708. The pump 714 may be powered from the power generated by the wind turbine 600 or the ballast weight system 750. An upper tank pipe(s) 712 may be used to transmit water and air from the ballast weight tank 720 to the ballast tank(s) 708, while the lower tank pipe(s) may be used to transmit water from the ballast tank(s) 708 to the ballast weight tank 720. An air fill pipe 716 may be connected to the ballast weight tank 720 to allow the flow of air to and from the ballast weight tank 720. The controller 612 may operate multiple valves located within the upper and lower tank pipes and the air fill pipes to control the flow of water and air between the ballast weight tank 720 and the ballast tanks 708. In some examples, a tank or tanks holding compressed air may be mounted to the platform 702. The compressed air from the tank may be injected into the air fill pipe 716 to expedite the flow of water from the ballast weight tank 720. The tank holding the compressed air may be connected to one or more air compressors to refill the tank or tanks. The air compressors may be powered by the power created by the generators 640, 645. The ballast weight pipe 722 and the air fill pipe 716 may be a flexible pipe and may be formed from a reinforced collapse resistant flexible pipe.

The operation of the ballast weight system 750 may operate in a similar manner as falling weight system 150 except that water is moved between the ballast tank(s) 708 and the ballast weight tank 720 instead of a falling weight(s) 170, 190 that moves upward and downward within a tower section of a wind turbine assembly. The controller 612 may receive information regarding the power output created by the generators 640, 645. The controller 612 may compare the power output to a predetermined threshold power level. The predetermined threshold power level may change depending upon the requirements of the power grid. In addition, the power output of the wind turbine assembly 600 may fall below the predetermined threshold limit for a variety of reasons such as a lack of sufficient wind to turn the blade assemblies 620, 625 to produce the required power, a maximum power requirement from the power grid due to consumer demand, or another event known to one skilled in the art. The ballast weight system 750 may allow for the wind turbine assembly 600 to be able to produce energy in low wind conditions or to increase power capacity during peak demand times. If the controller 612 determines that the power output is below the predetermined power threshold level, the controller 612 may then determine the position of the ballast weight tank 720 (i.e. is the ballast weight tank 720 in a lowered position (i.e. full of water) or a raised position (i.e. full of air and or an air and water mixture to keep the ballast weight tank 720 at a predetermined raised position). If the ballast weight tank 720 is in a raised state (i.e. full of air and or air and water mixture), the controller 612 may instruct a valve to open and may also instruct the pump 714 to fill the ballast weight tank 720 with water causing the ballast weight tank 720 to move downward (i.e. sink in the water), which causes the connection members 725 to unwind from the ballast weight gear 760 which engages a controller gear, which in turn adds supplemental power to the generators 640, 645 to increase the electricity produced by the generators. A clutch or other release mechanism may be engaged to the connection members 725 or the ballast weight gear 760 to allow the ballast weight tank 720 to lower in a controlled manner to provide a sustained input of energy into the controller 612. If the controller 612 determines the power output is above the predetermined power threshold level, the controller 612 may instruct the pump 714 to pump water out of the ballast weight tank 720 to allow air to enter the ballast weight tank 720 such that the ballast weight tank 720 becomes more buoyant. As the ballast weight tank 720 is emptied of water and fills with air, the ballast weight tank 720 will raise to the predetermined raised location. The predetermined raised location may be below the waterline and below a bottom surface of the floating platform 702.

FIGS. 44-51 illustrate an energy creation system 900 that comprises a pair of exemplary wind turbine assemblies 800A, 800B that are located in an offshore environment. The features are referred to using similar reference numerals under the "8xx" series of reference numerals, rather than "1xx" as used in the exemplary wind turbine assembly 100 shown in FIGS. 1-14. Accordingly, certain features of the wind turbine assemblies 800A, 800B that were already described above with respect to wind turbine assembly 100 of FIGS. 1-14 may be described in lesser detail, or may not be described at all. The wind turbines 800A, 800B may be assembled similar to wind turbine 300 using an assembly ring 200 as described in method 400 except the base platform 302 may be a floating platform 902. The floating platform 902 may comprise truss-like structures with a pair of mounts 904A, 904B that engage and secure corresponding tower sections 810A, 810B. The floating platform 902 may be connected to multiple anchor lines 906 to help secure the floating platform 902 in a predetermined location. While the illustrated examples, in FIGS. 44-51 show a pair of wind turbine assemblies 800A, 800B, it is contemplated that the number of wind turbines may not be limited to two and may be expanded to more than two wind turbines and the platform 902 may be created to be large enough to support the corresponding number of wind turbines.

As illustrated in the schematic of energy creation system 900 in FIG. 44, the wind turbine assembly 800A may include a controller 812A to control the operation of the wind turbine assembly 800A. The controller 812A may control all aspects of the power generation created by wind turbine assembly 800A such as the operation of the blade assemblies 820A, 825A, the input to the transmission 815A, as well as receiving and communicating information about the operation of the wind turbine assembly 800A to any outside entity. The controller 812A may be connected to both blade assemblies 820A, 825A via a driveshaft, both generators 840A, 845A, a transmission 815A, and to a controller 912 for a falling ballast weight system 950. Similarly, the wind turbine assembly 800B may include a controller 812B to control the operation of the wind turbine assembly 800B. The controller 812B may control all aspects of the power generation created by wind turbine assembly 800B such as the operation of the blade assemblies 820B, 825B, the input to the transmission 815B, as well as receiving and communicating information about the operation of the wind turbine assembly 800B to any outside entity. The controller 812B may be connected to both blade assemblies 820B, 825B via a driveshaft, both generators 840B, 845B, a transmission 815B, and to a controller 912 for a falling ballast weight system 950.

The controller 912 may connect via a set of controller gears 913 to a pair of ballast weight gears 960A, 960B of the ballast weight system 950. The controller 912 may also connect to a transmission 915 via a driveshaft, and the transmission 915 may then connect to a distribution member 918. The distribution member 918 may provide the power to operate one or more generators 940. In the illustrated example, the distribution member 918 may have a single input from the transmission 915 and have an equal number of outputs that matches the number of generators 940. The one of more generators 940 may be similar to the other generators described herein.

The ballast weight system 950 may operate to store potential energy by using the energy from one or both of the wind turbines 800A, 800B to help control the movement of air and water between one or more ballast tanks 908 to raise and lower the ballast weight tanks 920A, 920B. The raising and lowering of the ballast weight tanks 920 may act to store potential energy in a similar manner to falling weight system 150 described above such that in times of minimal wind or peak demand, the ballast weight system 950 may provide supplemental power to drive the generators 840A, 840 or drive the generators 940, 945. The ballast weight system 950 may utilize ballast weight gears 960A, 960B that may be connected to a support member 905A, 905B of the truss system that are located above the ballast weight tanks 920A, 920B. Each ballast weight gear 960A, 960B may be arranged on a spindle located inside or on a corresponding support member 905A, 905B. Each ballast weight gear 960A, 960B may engage a controller gear 913 from the controller 912 in a similar manner as the falling weight gears 160, 180 engage the controller 112 with respect to the wind turbine assembly 100 described above. The ballast weight gears 960A, 960B may include a base that has one or more corresponding connection members 925A, 925B wound around the base that connect to the corresponding ballast weight tank 920A, 920B.

The ballast tank(s) 908 may be connected via lower tank pipes 952A, 952B and an upper tank pipes 954A, 954B to the ballast weight tanks 920A, 920B. In addition, each ballast tank(s) 908 may be connected to each other using lower tank pipes 952A, 952B and upper tank pipes 954A, 954B. In addition, the tank pipes 952A, 952B, 954A, 954B may fluidly connect to vertically oriented ballast weight pipes 922A, 922B that extends downward into their corresponding ballast weight tanks 920A, 920B. The ballast weight pipes 922A, 922B may extend to within a predetermined distance from a bottom interior surface of the tank. In some examples, the predetermined distance may be a range of 2 to 5 inches from a bottom interior surface of the ballast weight tank 920A, 920B to prevent air from being extracted from the ballast weight tanks 920A, 920B. Additionally, a pump 914 may be connected to pump water between the ballast tanks 908 and the ballast weight tank 920A, 920B via the ballast weight pipes 922A, 922B. The impeller pump 914 may also be used to pump water from the ballast weight tanks 920A, 920B to the ballast tanks 908. The pump 914 may be powered from the power generated by the wind turbines 800A, 800B or the ballast weight system 950. Upper tank pipes 954A, 954B may be used to transmit water and air from the ballast weight tank 920A, 920B to the ballast tanks 908, while the lower tank pipes 952A, 952B may be used to transmit water from the ballast tanks 908 to the ballast weight tanks 920A, 920B. An air fill pipe 916A, 916B may be connected to a corresponding the ballast weight tanks 920A, 920B to allow the flow of air to and from the ballast weight tanks 920A, 920B. In some examples, a tank or tanks holding compressed air may be mounted to the platform 902. The compressed air from the tank may be injected into the air fill pipe 916 to expedite the flow of water from the ballast weight tanks 920A, 920B. The tank holding the compressed air may be connected to one or more air compressors to refill the tank or tanks. The air compressors may be powered by the power created by the generators 840A, 840B, 940. The ballast weight pipe 922A, 922B and the air fill pipes 916A, 916B may be flexible pipes and may be formed from reinforced collapse resistant flexible pipes.

The operation of the ballast weight system 950 may operate in a similar manner as falling weight system 150 except that water is moved between the ballast tank(s) 908 and the ballast weight tanks 920A, 920B instead of a falling weight(s) 170, 190 that moves upward and downward within a tower section of a wind turbine assembly. The controller 912 may receive information regarding the power output created by the generators 840, 845. The controller 912 may compare the power output to a predetermined threshold power level. The predetermined threshold power level may change depending upon the requirements of the power grid. In addition, the power output of the wind turbine assemblies 800A, 800B may fall below the predetermined threshold limit for reasons such as those described herein. The ballast weight system 950 may allow for the energy creation system 900 to be able to produce energy in low wind conditions or to increase power capacity during peak demand times. If the controller 912 determines that the power output is below the predetermined power threshold level, the controller 912 may then determine the position of the ballast weight tanks 920A, 920B (i.e. are the ballast weight tanks 920A, 920B in a lowered position (i.e. full or water) or raised position (i.e. full of air and or an air and water mixture to keep the ballast weight tank 720 at a predetermined raised position). If one of the ballast weight tanks 920A, 920B is in a raised state (i.e. full of air and or air and water mixture), the controller 912 may instruct the pump 914 to fill the appropriate ballast weight tank 920A, 920B with water (i.e. the air in the tank flows out as the water fills the appropriate ballast weight tank 920A, 920B) causing the ballast weight tank 920A, 920B receiving the water to move downward (i.e. sink in the water), which causes the connection members 925A, 925B of the sinking ballast weight tank 920A, 920B to unwind from its corresponding ballast gear 960A, 960B which engages one of the controller gears 913, which in turn adds supplemental power to the generators 940 to increase the electricity produced by the generators. The controller 912 may provide an input to a transmission 915, which may then provide an input to a distribution member 918 that connects to and drives the generators 940. In some examples, the transmission 915 may connect directly to a generator 940 without a distribution member 918. A clutch or other release mechanism may be engaged to the connection members 925A, 925B or the ballast weight gears 960A, 960B to allow the ballast weight tanks 920A, 920B to lower in a controlled manner to provide a sustained input of energy into the controller 912. If the controller 912 determines the power output is above the predetermined power threshold level, the controller 912 may instruct the pump 914 to pump water out of the ballast weight tank 920 such that the ballast weight tank 920A, 920B becomes more buoyant. As the ballast weight tank 920A, 920B is emptied of water and fills with air through the air fill pipes 916A, 916B, appropriate ballast weight tank 920A, 920B will raise to the predetermined raised location. The predetermined raised location may be below the waterline and below a bottom surface of the floating platform 902. In some examples, air from the compressed air tank may be injected into the appropriate air fill pipe 916A, 916B to expedite the flow of water from the ballast weight tanks 920A, 920B to the ballast tanks 908.

FIGS. 52-53 illustrate an energy generation system 1000 that comprises a ballast weight system 1050 that is located on a floating platform 1002. The ballast weight system 1050 may arranged in a similar manner to the ballast weight system 950. The features are referred to using similar reference numerals under the "10xx" series of reference numerals, rather than "9xx" as used in the exemplary ballast weight system 950 shown in FIGS. 44-51. Accordingly, certain features of the ballast weight system 1050 that were already described above with respect to ballast weight system 950 of FIGS. 44-51 may be described in lesser detail, or may not be described at all. In addition, the ballast weight system 1050 may be similar in operation to the falling weight system 150 and ballast weight system 750 described above. The floating platform 1002 may comprise truss-like structures with a pair of support members 1005A, 1005B that support corresponding ballast weight gears 1060A, 1060B. The floating platform 1002 may be connected to multiple anchor lines 1006 to help secure the floating platform 1002 in a predetermined location.

As illustrated in the schematic of energy generation system 1000 in FIG. 53, a controller 1012 may be configured to control the pair of ballast weight tanks 1020A, 1020B. The controller 1012 may be mounted or connected to the floating platform 1002. The controller 1012 may connect via a set of gears 1013 to a pair of ballast weight gears 1060A, 1060B of the ballast weight system 1050. The controller 1012 may also connect to a transmission 1015 via a driveshaft, and the transmission 1015 may then connect to a distribution member 1018. The distribution member 1018 may provide the power to operate one or more generators 1040. In the illustrated example, the distribution member 1018 may have a single input from the transmission 1015 and have an equal number of outputs that matches the number of generators 1040. The one of more generators 1040 may be similar to the other generators described herein.

The ballast weight system 1050 may operate to generate energy by utilizing the energy created as the ballast weight tanks 1020A, 1020B using the energy from the ballast weight tanks 1020A, 1020B as they sink when filled with water. The controller 1012 may control the movement of air and water between one or more ballast tanks 908 to raise and lower the ballast weight tanks 1020A, 1020B. The raising and lowering of the ballast weight tanks 1020A, 1020B may act to generate energy and store potential energy in a similar manner to the falling weight system 150 and the ballast weight systems 750, 950 described herein. The ballast weight system 1050 may utilize ballast weight gears 1060A, 1060B that may be connected to a support member 1005A, 1005B of the truss system that are located above the ballast weight tanks 1020A, 1020B. Each ballast weight gear 1060A, 1060B may be arranged on a spindle located inside or connected to a corresponding support member 1005A, 1005B. Each ballast weight gear 960A, 960B may engage a gear 1013 from the controller 1012 in a similar manner as the falling weight gears 160, 180 engage the controller 112 with respect to the falling weight system 150 described herein. The ballast weight gears 1060A, 1060B may include a base that has one or more corresponding connection members 1025A, 1025B wound around the base that connect to the corresponding ballast weight tank 1020A, 1020B.

The ballast tank(s) 1008 may be connected via lower tank pipes and an upper tank pipes to the ballast weight tanks 1020A, 1020B. In addition, each ballast tank(s) 1008 may be connected to each other using lower tank pipes and upper tank pipes. In addition, the tank pipes may fluidly connect to vertically oriented ballast weight pipes that extends downward into their corresponding weight ballast tanks. The ballast weight pipes may extend to within a predetermined distance from a bottom interior surface of the ballast weight tank 1020A, 1020B. In some examples, the predetermined distance may be a range of 2 to 5 inches from a bottom interior surface of the ballast weight tank 1020A, 1020B to prevent air from being extracted from the ballast weight tanks 1020A, 1020B. The ballast weight pipes and the air fill pipes may be flexible pipes and may be formed from reinforced collapse resistant flexible pipes. Additionally, a pump may be connected to pump water between the ballast tanks 1008 and the ballast weight tank 1020A, 1020B via the ballast weight pipes. The impeller pump may also be used to pump water from the ballast weight tanks 1020A, 1020B to the ballast tanks 1008. The pump may be powered from the power generated by the generators 1040 or in some cases from an external source. Upper tank pipes may be used to transmit water and air from the ballast weight tank 1020A, 1020B to the ballast tanks 1008, while the lower tank pipes may be used to transmit water from the ballast tanks 1008 to the ballast weight tanks 1020A, 1020B. An air fill pipe may be connected to a corresponding the ballast weight tanks 1020A, 1020B to allow the flow of air to and from the ballast weight tanks 1020A, 1020B. In some examples, a tank or tanks holding compressed air may be mounted to the platform 1002. The compressed air from the tank may be injected into the air fill pipes to expedite the flow of water from the ballast weight tanks 1020A, 1020B. The tank holding the compressed air may be connected to one or more air compressors to refill the tank or tanks. The air compressors may be powered by the power created by the generators 1040 or in some cases from an external source.

The operation of the ballast weight system 1050 may operate in a similar manner as falling weight system 150 except that water is moved between the ballast tanks 1008 and the ballast weight tanks 1020A, 1020B instead of a falling weight(s) 170, 190 that moves upward and downward within a tower section of a wind turbine assembly. The controller 1012 may control the movement of the water and air in and out of the ballast weight tanks 1020A, 1020B. The energy generation system 1000 may operate by keeping one tank of the pair of ballast weight tanks 1020A, 1020B in a sinking or falling condition (i.e. water is being added), while the other tank of the pair of ballast weight tanks 1020A, 1020B is rising (i.e. water is being removed and/or air is being injected). For example, if the ballast weight tank 1020A is receiving water and sinking, the connection member(s) 1025A may unwind from the ballast weight gear 1060A causing the ballast weight gear 1060A begins rotating, which engages the gear 1013 of the controller 1012. The controller 1012 then connects to and drives the transmission 1015 that is connected to a generator 1040. If multiple generators 1040 are present, the transmission 1015 may connect to a distribution member 1018 to allow the distribution member 1018 to drive multiple generators 1040. In some examples, each ballast weight tank 1020A, 1020B may have a weight of approximately 50,000 tons when fully loaded with water. The combination of the transmission 1015 and the controller 1012 may have a 3000:1 gear ratio (e.g., the transmission may have a 100:1 gear ratio and the controller may have a 30:1 gear ratio, leading to a total of 3000:1 gear ratio) such that the transmission 1015 produces 33,333 foot*pounds of torque at a rate of 20 rpm. This torque input will produce 8 megawatts of power from the generator 1040 for a period of 52 hours with the ballast weight tank 1020A, 1020B designed to fall to a maximum depth of approximately 500 feet. This torque input may be similar for the ballast weight systems 750, 950 described above. While ballast weight tank 1020A is sinking, the ballast weight tank 1020B is rising. Ballast weight tank 1020B will have water being pumped or siphoned to the ballast tanks 1008 on the platform and also have air being injected or input into the ballast weight tank 1020B using an air fill pipe. As air is input and water is removed, the ballast weight tank 1020B will rise (i.e. from the increase buoyancy from filling with air) to an initial position just below the platform 1002. The controller 1012 may be able to control the rate the ballast weight tank 1020B rises through the gear 1013 and the ballast weight gear 1060B. When ballast weight tank 1020A reaches its final or lowest position, the controller 1012 may instruct the pump to begin to fill the ballast weight tank 1020B that is in its initial position with water from the ballast tanks 1008 and begin to input air into and pump water out of the ballast weight tank 1020A and into the ballast tanks 1008. The controller 1012 may operate multiple valves located within the upper and lower tank pipes and the air fill pipes to control the flow of water and air between the ballast weight tanks 1020A, 1020B and the ballast tanks 1008. The reversal of the water and air flow will cause the ballast weight tank 1020B to begin sinking and ballast weight tank 1020A to begin rising. The water pumped from the ballast weight tank 1020A will be moved to the ballast tanks 1008. By having one ballast weight tank of the pair of ballast weight tanks 1020A in a sinking condition and the other ballast weight tank of the pair of ballast weight tanks 1020B in a rising condition, the energy generation system 1000 may produce an uninterrupted power production that has to have very little power input and can also be scaled to even larger platform with bigger power production. For instance, the energy generation system 1000 may include more than a pair of ballast weight tanks 1020A, 1020B depending on the size of the platform 1002. It is contemplated that the number of ballast weight tanks may be 3, 4, 5, or even more than 5 ballast weight tanks 1020.

The ballast weight tanks 720, 920A, 920B, 1020A, 1020B may be generally hollow structures with a rigid outer structure that is capable of withstanding the pressures associated with being within a range of 250 and 600 feet underwater.

The present disclosure is disclosed above and in the accompanying drawings with reference to a variety of examples. The various examples described herein may have features can be combined to form an exemplary wind turbine assembly. The purpose served by the disclosure, however, is to provide examples of the various features and concepts related to the disclosure, not to limit the scope of the disclosure. One skilled in the relevant art will recognize that numerous variations and modifications may be made to the examples described above without departing from the scope of the present disclosure.

For the avoidance of doubt, the present application includes at least the subject matter described in the following numbered Clauses:

Clause 1. A method of assembling a wind turbine assembly, comprising:

placing an assembly ring above a base platform of the wind turbine assembly, wherein the assembly ring comprises a ring-shaped frame member that defines a central opening and a support platform that extends outward from the ring-shaped frame member, wherein the support platform is configured to engage and manipulate a plurality of tower sections;

moving a first tower section of the plurality of tower sections using the support platform of the assembly ring onto the base platform of the wind turbine assembly, wherein the first tower section is received within the central opening of the assembly ring;

securing the first tower section to the base platform of the wind turbine assembly;

moving a second tower section using the support platform of the assembly ring, wherein the assembly ring climbs the first tower section, wherein the assembly ring includes a climbing gear that engages a first rail positioned along an exterior of the first tower section;

aligning the second tower section over the first tower section;

securing the second tower section to the first tower section forming stacked tower sections;

moving a head platform to a top of the stacked tower sections using the assembly ring, wherein the head platform includes a generator and a transmission;

securing the head platform to the stacked tower sections, wherein the head platform is rotationally connected to the stacked tower sections;

moving a blade assembly using the assembly ring; and connecting the blade assembly to the head platform.

Clause 2. The method of assembling the wind turbine assembly of Clause 1, wherein the second tower section includes a second rail positioned along an exterior surface of the second tower section.

Clause 3. The method of assembling the wind turbine assembly of Clause 2, wherein the first rail of the first tower section and the second rail of the second tower section are substantially aligned.

Clause 4. The method of assembling the wind turbine assembly 2 of any one of the Clauses 2 to 3, wherein the assembly ring uses the climbing gear to engage the first rail and the second rail when climbing the first tower section and the second tower section.

Clause 5. The method of assembling the wind turbine assembly of any one of the Clauses 1 to 4, wherein the assembly ring further comprises a hydraulic motor, and where the support platform is also pivotally connected to the ring-shaped frame member.

Clause 6. The method of assembling the wind turbine assembly of Clause 5, wherein the support platform is connected to a pivot cradle, wherein the pivot cradle comprises an extension and a pivot member, wherein the pivot member is pivotally engaged with the extension.

Clause 7. The method of assembling the wind turbine assembly of any one of the Clauses 5 to 6, wherein the support platform is pivotally connected to the frame member.

Clause 8. The method of assembling the wind turbine assembly of any one of the Clauses 5 to 7, wherein the climbing gear comprises a plurality of climbing gears that are arranged at 90 degree intervals along an interior of the central opening of the ring-shaped frame member of the assembly ring.

Clause 9. The method of assembling the wind turbine assembly of Clause 8, wherein the first rail of the first tower section comprises a plurality of rails that are arranged at 90 degree intervals along an exterior of the first tower section.

Clause 10. The method of assembling the wind turbine assembly of any one of the Clauses 1 to 9, wherein the assembly ring lifts the blade assembly along the stacked tower sections with the blade assembly in a horizontal orientation.

Clause 11. The method of assembling the wind turbine assembly of Clause 10, wherein the head platform includes a lift crane with an arm that translates along the head platform.

Clause 12. The method of assembling the wind turbine assembly of Clause 11, wherein the blade assembly is rotated from the horizontal orientation to a vertical orientation using the lift crane, wherein the lift crane is connected to a pivot cradle of the assembly ring.

Clause 13. An assembly ring for assembling a wind turbine assembly comprising:

a ring-shaped frame member comprising a central opening, wherein the central opening is configured to receive a tower section of the wind turbine assembly;

a support platform pivotally engaged to the ring-shaped frame member;

a pivot cradle connected to the support platform, wherein the pivot cradle comprises an extension and a pivot member, wherein the pivot member is pivotally engaged with the extension; and a plurality of climbing gears arranged on an interior of the ring-shaped frame member, wherein each climbing gear of the plurality of climbing gears are configured to engage a rail that is located on the tower section of the wind turbine assembly.

Clause 14. The assembly ring of Clause 13, wherein the frame member is formed from a plurality of sub-frame members, where each sub-frame member has an interior surface with an arcuate shape.

Clause 15. The assembly ring of any one of the Clauses 13 to 14, wherein the central opening is configured to surround the tower section.

Clause 16. The assembly ring of any one of the Clauses 13 to 15, further comprising: a hydraulic pump to power a plurality of hydraulic motors that supply power to the support platform, the pivot cradle, and the plurality of climbing gears.

Clause 17. The assembly ring of any one of the Clauses 13 to 16, wherein the plurality of climbing gears may comprise multiple pairs of climbing gears, wherein the multiple pairs of climbing gears are arranged approximately 90 degrees apart along the interior of the ring-shaped frame member.

Clause 18. The assembly ring of Clause 17, wherein each pair of climbing gears are supported by a plurality of support beams.

Clause 19. The assembly ring of Clause 18, wherein the plurality of support beams extend and retract into the central opening to enable each pair of climbing gears to engage the tower section.

Clause 20. The assembly ring of any one of the Clauses 13 to 19, wherein the support platform that extends and retracts from the ring-shaped frame member.

Clause 21. A wind turbine assembly comprising:
　a first blade assembly;
　a second blade assembly;
　a controller connected to the first blade assembly and the second blade assembly, wherein the controller includes a first controller gear and a second controller gear;
　a transmission connected to the controller;
　a first generator connected to the transmission;
　a second generator connected to the transmission;
　a head platform connected to a tower section, wherein the head platform supports the controller, the transmission, and the first generator; and
　a falling weight system, the falling weight system comprising:
　　a first gear, wherein the first gear is located in an upper portion of the tower section; and wherein the first gear is connected to a first weight and an engaging portion of the first gear engages an engaging portion of the first controller gear; and
　　a second gear, wherein the second gear is located in the upper portion of the tower section; and wherein the second gear is connected to a second weight and an engaging portion of the second gear engages an engaging portion of the second controller gear.

Clause 22. The wind turbine assembly of Clause 21, wherein the first gear includes a base portion, wherein the first weight is connected to a first cable that winds and unwinds around the base portion of the first gear; and
　wherein the second gear includes a base portion, wherein the second weight is connected to a second cable that winds and unwinds around the base portion of the second gear.

Clause 23. The wind turbine assembly of Clause 22, wherein the base portion of the first gear includes a plurality of grooves to receive the first cable.

Clause 24. The wind turbine assembly of any one of the Clauses 21 to 23, wherein the head platform is rotationally connected to the tower section, wherein the head platform is able to rotate 360 degrees around the tower section.

Clause 25. The wind turbine assembly of any one of the Clauses 21 to 24, wherein a plurality of contact rings are positioned between the head platform and the tower section to electrically connect the first generator and the second generator with a power grid.

Clause 26. The wind turbine assembly of any one of the Clauses 21 to 25, wherein when a power output of the wind turbine assembly is below a predetermined threshold power level, the controller instructs the first weight to be lowered; and wherein lowering the first weight rotates the first gear causing the first controller gear to rotate causing one of the first generator or the second generator to produce electricity to keep the power output of the wind turbine assembly above the predetermined threshold power level.

Clause 27. The wind turbine assembly of Clause 26, wherein when the power output of the wind turbine assembly is below the predetermined threshold power level, the controller instructs the second weight to be lowered; and wherein lowering the second weight rotates the second gear causing the second controller gear to rotate causing one of the first generator or the second generator to produce electricity to keep the power output of the wind turbine assembly above the predetermined threshold power level.

Clause 28. The wind turbine assembly of any one of the Clauses 21 to 27, wherein when a power output of the wind turbine assembly is above a predetermined threshold level, the controller instructs the first weight to be raised to store potential energy.

Clause 29. The wind turbine assembly of Clause 28, wherein when the power output of the wind turbine assembly is above the predetermined threshold level, the controller instructs the second weight to be raised to store potential energy.

Clause 30. The wind turbine assembly of any one of the Clauses 21 to 29, wherein the first gear is located within a central opening of the second gear.

Clause 31. The wind turbine assembly of any one of the Clauses 21 to 30, wherein the first gear and the second gear are bevel gears.

Clause 32. The wind turbine assembly of any one of the Clauses 21 to 31, wherein the first weight and the second weight each have a weight within a range of 50,000 pounds and 700,000 pounds.

Clause 33. The wind turbine assembly of any one of the Clauses 21 to 32, wherein the first weight is mounted on a first guide shaft, and the second weight is mounted on a second guide shaft, wherein the first guide shaft and the second guide shaft both extend a majority of a height of the tower section.

Clause 34. The wind turbine assembly of any one of the Clauses 21 to 33, wherein the first gear rotates independently from the second gear.

Clause 35. A wind turbine assembly comprising:
　a blade assembly;
　a controller connected to the blade assembly, wherein the controller includes a first controller gear and a second controller gear;
　a transmission connected to the controller;
　a generator connected to the transmission;
　a head platform connected to a tower section, wherein the head platform supports the controller, the transmission, and the generator; and a falling weight system, the falling weight system comprising:

a first gear, wherein the first gear is located in an upper portion of the tower section; and wherein the first gear is connected to a first weight and an engaging portion of the first gear engages an engaging portion of the first controller gear; and a second gear, wherein the second gear is located in the upper portion of the tower section; and wherein the second gear is connected to a second weight and an engaging portion of the second gear engages an engaging portion of the second controller gear:

wherein the first gear is located within a central opening of the second gear and the first gear turns independently of the second gear.

Clause 36. The wind turbine assembly of Clause 35, wherein the first gear includes a base portion, wherein the first weight is connected to a first cable that winds and unwinds around the base portion of the first gear; and wherein the second gear includes a base portion, wherein the second weight is connected to a second cable that winds and unwinds around the base portion of the second gear.

Clause 37. The wind turbine assembly of any one of the Clauses 35 to 36, wherein the first gear and the second gear are bevel gears.

Clause 38. The wind turbine assembly of any one of the Clauses 35 to 37, wherein when a power output of the wind turbine assembly is below a predetermined threshold power level, the controller instructs the first weight to be lowered; and wherein lowering the first weight rotates the first gear causing the first controller gear to rotate causing the generator to produce electricity to keep the power output of the wind turbine assembly above the predetermined threshold power level.

Clause 39. The wind turbine assembly of Clause 38, wherein when the power output of the wind turbine assembly is below the predetermined threshold power level, the controller instructs the second weight to be lowered; and wherein lowering the second weight rotates the second gear causing the second controller gear to rotate causing the generator to produce electricity to keep the power output of the wind turbine assembly above the predetermined threshold power level.

Clause 40. The wind turbine assembly of any one of the Clauses 35 to 39, wherein when a power output of the wind turbine assembly is above a predetermined threshold power level, the controller instructs the first weight to be raised to store potential energy.

Clause 41. A wind turbine assembly comprising:

a floating platform comprising a truss-like structure with a central mount;

a tower section connected to the central mount;

a head platform connected to an upper portion of the tower section;

a controller mounted on the head platform, wherein the controller comprises a controller gear;

a first blade assembly connected to the controller:

a transmission connected to the controller, wherein the transmission is supported by the head platform;

a generator connected to the transmission, wherein the generator is supported by the head platform;

a ballast weight system, the ballast weight system comprising:

a ballast weight gear comprising a base portion and an engaging portion, wherein the engaging portion engages the controller gear;

wherein the ballast weight gear is connected by a connection member to a ballast weight tank, wherein the connection member winds and unwinds around the base portion of the ballast weight gear, wherein the ballast weight tank is positioned underneath the floating platform:

a ballast tank supported by the floating platform;

a lower tank pipe fluidly connecting the ballast tank to the ballast weight tank;

an upper tank pipe fluidly connecting the ballast tank to the ballast weight tank; and wherein when the controller determines a power output of the generator is below a predetermined threshold power level, the controller instructs a valve to open and allow water to flow from the ballast tank into the ballast weight tank, and wherein as the ballast weight tank fills with water, the ballast weight tank sinks such that as the ballast weight tank sinks, the connection member unwinds from the base portion of the ballast weight gear causing the ballast weight gear to rotate which causes the controller gear to rotate, and wherein rotation of the controller gear causes the transmission to transmit rotational energy to the generator causing the generator to produce electricity to keep the power output of the wind turbine assembly above the predetermined threshold power level.

Clause 42. The wind turbine assembly of Clause 41, further comprising an air fill pipe connected to the ballast weight tank.

Clause 43. The wind turbine assembly of any one of the Clauses 41 to 42, further comprising a ballast weight pipe extending downward into the ballast weight tank, wherein the ballast weight pipe is fluidly connected to the lower tank pipe and also fluidly connected to the upper tank pipe.

Clause 44. The wind turbine assembly of Clause 43, wherein the ballast weight pipe extends into the ballast weight tank to within a predetermined distance from a bottom surface of the ballast weight tank.

Clause 45. The wind turbine assembly of Clause 44, wherein the predetermined distance is within a range of 2 to 5 inches.

Clause 46. The wind turbine assembly of any one of the Clauses 41 to 45, wherein a pump is fluidly connected to the lower tank pipe, wherein the pump is configured to pump water from the weight ballast tank to the ballast tank.

Clause 47. The wind turbine assembly of Clause 46, wherein the pump is also configured to pump water through a ballast weight pipe that extends downward into the ballast weight tank into the ballast tank.

Clause 48. The wind turbine assembly of any one of the Clauses 42 to 47, wherein when the air fill pipe is connected to a compressed air tank.

Clause 49. The wind turbine assembly of Clause 48, wherein when the controller determines the ballast weight tank has sank to a maximum predetermined depth, the controller instructs an air release valve to open to allow compressed air for flow from the compressed air tank into the ballast weight tank.

Clause 50. The wind turbine assembly of any one of the Clauses 42 to 48, wherein when the controller determines the ballast weight tank has sank to a maximum predetermined depth, the controller instructs a pump to begin transmitting water from the ballast weight tank to the ballast tank, wherein as the water is removed from the ballast weight tank and replaced with air, the ballast weight tank begins to raise towards a predetermined raised position.

Clause 51. The wind turbine assembly of Clause 50, wherein when the controller determines the ballast weight tank has sank to the maximum predetermined depth, the controller instructs an air release valve to open to allow air to flow through an air fill pipe into the ballast weight tank.

Clause 52. An electricity generating system comprising:
a floating platform comprising a truss-like structure;
a controller mounted to the floating platform, wherein the controller comprises a first controller gear and a second controller gear;
a transmission connected to the controller;
a generator connected to the transmission;
a ballast weight system, the ballast weight system comprising:
a first ballast weight gear comprising a first base portion and a first engaging portion, wherein the first engaging portion engages the first controller gear, and wherein the first ballast weight gear is connected to a first connection member that winds and unwinds around the first base portion of the first ballast weight gear,
wherein the first ballast weight gear is connected by the first connection member to a first ballast weight tank, wherein the first ballast weight tank is positioned underneath the floating platform;
a second ballast weight gear comprising a second base portion and a second engaging portion, wherein the second engaging portion engages the second controller gear, and wherein the second ballast weight gear is connected to a second connection member that winds and unwinds around the second base portion of the second ballast weight gear,
wherein the second ballast weight gear is connected by the second connection member to a second ballast weight tank, wherein the second ballast weight tank is positioned underneath the floating platform;
a ballast tank supported by the floating platform;
a plurality of tank pipes fluidly connecting the ballast tank to the first ballast weight tank and the second ballast weight tank; and
wherein to generate electricity, the controller instructs a first valve to open and allow water to flow from the ballast tank into the first ballast weight tank through a first tank pipe of the plurality of tank pipes; and
wherein as the first ballast weight tank fills with water, the first ballast weight tank sinks such that as the first ballast weight tank sinks, the first connection member unwinds from the first base portion of the first ballast weight gear causing the first controller gear to rotate, wherein rotation of the first controller gear causes the transmission to transmit rotational energy to the generator causing the generator to produce electricity.

Clause 53. The electricity generating system of Clause 52, further comprising a first air fill pipe connected to the first ballast weight tank.

Clause 54. The electricity generating system of Clause 53, wherein the first air fill pipe is a flexible pipe.

Clause 55. The electricity generating system of Clause 52, further comprising a first ballast weight pipe extending downward into the first ballast weight tank, wherein the first ballast weight pipe is fluidly connected to the plurality of tank pipes.

Clause 56. The electricity generating system of Clause 55, wherein the first ballast weight pipe extends into the first ballast weight tank to within a predetermined distance from a bottom surface of the first ballast weight tank.

Clause 57. The electricity generating system of Clause 56, wherein the predetermined distance is within a range of 2 to 5 inches.

Clause 58. The electricity generating system of any one of the Clauses 52 to 57, wherein a pump is fluidly connected to the first tank pipe of the plurality of tank pipes, the pump is configured to pump water from the first weight ballast tank to the ballast tank.

Clause 59. The electricity generating system of Clause 58, wherein when the controller determines the first ballast weight tank has sunk to a maximum predetermined depth, the controller instructs the pump to begin pumping water from the first ballast weight tank to the ballast tank, wherein as the water is removed from the first ballast weight tank and air begins to fill the first ballast weight tank, the first ballast weight tank begins to raise towards a predetermined raised position, and
wherein as the first ballast weight tank rises, the first connection member winds around the first base portion of the first ballast weight gear.

Clause 60. The electricity generating system of Clause 59, wherein when the first ballast weight tank is moving towards the predetermined raised position, the controller instructs a second valve to open and allow water to flow from the ballast tank into the second ballast weight tank through a second tank pipe of the plurality of tank pipes; and
wherein as the second ballast weight tank fills with water, the second ballast weight tank sinks such that as the second ballast weight tank sinks, the second connection member unwinds from the second base portion of the first ballast weight gear causing the second controller gear to rotate, wherein rotation of the second controller gear causes the transmission to transmit rotational energy to the generator causing the generator to produce electricity.

What is claimed is:
1. An assembly ring for climbing a wind turbine assembly comprising:
a ring-shaped frame member comprising a central opening, wherein the central opening is configured to receive a tower section of the wind turbine assembly;
a support platform pivotally engaged to the ring-shaped frame member;
a pivot cradle connected to the support platform, wherein the pivot cradle comprises an extension and a pivot member, wherein the pivot member is pivotally engaged with the extension; and
a plurality of climbing gears arranged on an interior of the ring-shaped frame member, wherein each climbing gear of the plurality of climbing gears are configured to engage a corresponding rail of a plurality of rails that is connected to the tower section of the wind turbine assembly;

wherein each rail has a first set of teeth on a first side of the rail and a second set of teeth on a second side of the rail, wherein the first side is opposite the second side; and wherein the plurality of climbing gears comprises multiple pairs of climbing gears, wherein a first gear of each pair of climbing gears engages the first set of teeth of the rail and a second gear of each pair of climbing gears engages the second set of teeth of the rail; and wherein the multiple pairs of climbing gears are arranged approximately 90 degrees apart along the interior of the ring-shaped frame member;

wherein each pair of climbing gears is supported by a plurality of support beams; and wherein the plurality of support beams extend and retract into the central opening to enable each pair of climbing gears to engage its corresponding rail on the tower section.

2. The assembly ring of claim 1, wherein the central opening is configured to surround the tower section.

3. The assembly ring of claim 1, further comprising:

a hydraulic pump to power a plurality of hydraulic motors that supply power to the support platform, the pivot cradle, and the plurality of climbing gears.

4. The assembly ring of claim 1, wherein the support platform extends and retracts from the ring-shaped frame member.

5. The assembly ring of claim 1, wherein the support platform and the pivot cradle are configured to secure a blade assembly of the wind turbine assembly when the blade assembly is in a horizontal orientation.

6. The assembly ring of claim 1, wherein the pivot member comprises a ring-shaped portion.

7. The assembly ring of claim 1, wherein the support platform and the pivot cradle are configured to lift a second tower section from a horizontal orientation and place the tower section in a vertical orientation within the central opening of the ring-shaped frame member.

8. The assembly ring of claim 1, wherein the ring-shaped frame member is formed from a plurality of sub-frame members, where each sub-frame member has an interior surface with an arcuate shape.

9. The assembly ring of claim 8, wherein the plurality of sub-frame members comprises four sub-frame members.

10. An assembly ring for assembling a wind turbine assembly comprising:

a ring-shaped frame member comprising a central opening, wherein the central opening is configured to surround a tower section of the wind turbine assembly;

a support platform pivotally engaged to the ring-shaped frame member;

a pivot cradle connected to the support platform, wherein the pivot cradle comprises an extension and a pivot member, wherein the pivot member is pivotally engaged with the extension and the pivot member is ring-shaped and has a portion that extends and retracts; and a plurality of climbing gears arranged on an interior of the ring-shaped frame member, wherein each climbing gear of the plurality of climbing gears are configured to engage a corresponding rail of a plurality of rails that is connected to the tower section of the wind turbine assembly, wherein the plurality of climbing gears comprises multiple pairs of climbing gears, and wherein the multiple pairs of climbing gears are arranged approximately 90 degrees apart along the interior of the ring-shaped frame member;

wherein the plurality of rails are spaced apart along an exterior surface of the tower section to correspond to the locations of the multiple pairs of climbing gears;

wherein each rail of the plurality of rails has a first set of teeth on a first side of the rail and a second set of teeth on a second side opposite the first side; and wherein each pair of climbing gears of the multiple pairs of climbing gears comprises a first gear of each pair of climbing gears engaging the first set of teeth of the rail and a second gear of each pair of climbing gears engaging the second set of teeth of the rail; and wherein each pair of climbing gears are supported by a plurality of support beams; and wherein the plurality of support beams extend and retract into the central opening to enable each pair of climbing gears to engage its corresponding rail on the tower section.

11. The assembly ring of claim 10, wherein a guide roller engages a guide on a corresponding rail of the plurality of rails to align one of the climbing gears of the plurality of climbing gears with the corresponding rail on the tower section.

12. The assembly ring of claim 10, wherein the support platform extends and retracts from the ring-shaped frame member.

13. The assembly ring of claim 10, wherein the ring-shaped frame member is formed from a plurality of sub-frame members, where each sub-frame member has an interior surface with an arcuate shape.

14. The assembly ring of claim 10, wherein the support platform and the pivot cradle are configured to secure a blade assembly of the wind turbine assembly when the blade assembly is in a horizontal orientation.

15. The assembly ring of claim 10, wherein the support platform and the pivot cradle are configured to lift a second tower section from a horizontal orientation and place the tower section in a vertical orientation within the central opening of the ring-shaped frame member.

* * * * *